(12) United States Patent
Lomasney

(10) Patent No.: US 11,293,272 B2
(45) Date of Patent: Apr. 5, 2022

(54) LIFT PLUNGERS WITH ELECTRODEPOSITED COATINGS, AND SYSTEMS AND METHODS FOR PRODUCING THE SAME

(71) Applicant: MODUMETAL, INC., Seattle, WA (US)

(72) Inventor: Samuel Lomasney, Woodinville, WA (US)

(73) Assignee: MODUMETAL, INC., Snohomish, WA (US)

( * ) Notice: Subject to any disclaimer, the term of this patent is extended or adjusted under 35 U.S.C. 154(b) by 250 days.

(21) Appl. No.: 16/496,925

(22) PCT Filed: Mar. 23, 2018

(86) PCT No.: PCT/US2018/024159
§ 371 (c)(1),
(2) Date: Sep. 23, 2019

(87) PCT Pub. No.: WO2018/175975
PCT Pub. Date: Sep. 27, 2018

(65) Prior Publication Data
US 2020/0115998 A1 Apr. 16, 2020

Related U.S. Application Data

(60) Provisional application No. 62/640,525, filed on Mar. 8, 2018, provisional application No. 62/476,621, filed on Mar. 24, 2017.

(51) Int. Cl.
*E21B 43/12* (2006.01)
*C25D 5/10* (2006.01)
(Continued)

(52) U.S. Cl.
CPC .............. *E21B 43/122* (2013.01); *C25D 5/10* (2013.01); *C25D 5/12* (2013.01); *C25D 5/14* (2013.01);
(Continued)

(58) Field of Classification Search
CPC ............................... E21B 43/122; E21B 43/13
See application file for complete search history.

(56) References Cited

U.S. PATENT DOCUMENTS

| | | | |
|---|---|---|---|
| 2,428,033 | A | 9/1947 | Nachtman |
| 2,436,316 | A | 2/1948 | Lum et al. |

(Continued)

FOREIGN PATENT DOCUMENTS

| | | | |
|---|---|---|---|
| CN | 1380446 | A | 11/2002 |
| CN | 1924110 | A | 3/2007 |

(Continued)

OTHER PUBLICATIONS

"Appendix 1: Literature review (Task 1): Literature review concerning the improvement of galvanneal (GA) coating adherence during shear test of adhesively bonded GA steel sheets," 70 pages, no date.

(Continued)

*Primary Examiner* — Kristyn A Hall
(74) *Attorney, Agent, or Firm* — Seed IP Law Group LLP

(57) ABSTRACT

Described herein are coated lift plungers, which have improved hardness, durability, and corrosion resistance, as well as methods of making, reworking, and using the same.

23 Claims, 6 Drawing Sheets

(51) Int. Cl.
  *C25D 5/48* (2006.01)
  *C25D 7/00* (2006.01)
  *C25D 5/00* (2006.01)
  *F04B 47/12* (2006.01)
  *C25D 5/12* (2006.01)
  *C25D 5/14* (2006.01)

(52) U.S. Cl.
  CPC .............. *C25D 5/48* (2013.01); *C25D 5/617* (2020.08); *C25D 7/00* (2013.01); *F04B 47/12* (2013.01)

(56) References Cited

U.S. PATENT DOCUMENTS

| | | |
|---|---|---|
| 2,470,775 A | 5/1949 | Jernstedt et al. |
| 2,558,090 A | 6/1951 | Jernstedt |
| 2,642,654 A | 6/1953 | Ahrens |
| 2,678,909 A | 5/1954 | Jernstedt et al. |
| 2,694,743 A | 11/1954 | Ruskin et al. |
| 2,706,170 A | 4/1955 | Marchese |
| 2,891,309 A | 6/1959 | Fenster |
| 3,090,733 A | 5/1963 | Brown |
| 3,255,781 A | 6/1966 | Gillespie, Jr. |
| 3,282,810 A | 11/1966 | Odekerken |
| 3,359,469 A | 12/1967 | Levy et al. |
| 3,362,851 A | 1/1968 | Dunster |
| 3,483,113 A | 12/1969 | Carter |
| 3,549,505 A | 12/1970 | Hanusa |
| 3,616,286 A | 10/1971 | Aylward et al. |
| 3,633,520 A | 1/1972 | Stiglich, Jr. |
| 3,716,464 A | 2/1973 | Kovac et al. |
| 3,753,664 A | 8/1973 | Klingenmaier et al. |
| 3,759,799 A | 9/1973 | Reinke |
| 3,787,244 A | 1/1974 | Schulmeister et al. |
| 3,866,289 A | 2/1975 | Brown et al. |
| 3,994,694 A | 11/1976 | Clauss et al. |
| 3,996,114 A | 12/1976 | Ehrsam |
| 4,053,371 A | 10/1977 | Towsley |
| 4,105,526 A | 8/1978 | Lewellen, Jr. et al. |
| 4,107,003 A | 8/1978 | Anselrode |
| 4,191,617 A | 3/1980 | Hurley et al. |
| 4,204,918 A | 5/1980 | McIntyre et al. |
| 4,216,272 A | 8/1980 | Clauss |
| 4,246,057 A | 1/1981 | Janowski et al. |
| 4,284,688 A | 8/1981 | Stücheli et al. |
| 4,314,893 A | 2/1982 | Clauss |
| 4,405,427 A | 9/1983 | Byrd |
| 4,422,907 A | 12/1983 | Birkmaier et al. |
| 4,461,680 A | 7/1984 | Lashmore |
| 4,464,232 A | 8/1984 | Wakano et al. |
| 4,510,209 A | 4/1985 | Hada et al. |
| 4,519,878 A | 5/1985 | Hara et al. |
| 4,540,472 A | 9/1985 | Johnson et al. |
| 4,543,300 A | 9/1985 | Hara et al. |
| 4,543,803 A | 10/1985 | Keyasko |
| 4,591,418 A | 5/1986 | Snyder |
| 4,592,808 A | 6/1986 | Doubt |
| 4,597,836 A | 7/1986 | Schaer et al. |
| 4,620,661 A | 11/1986 | Slatterly |
| 4,652,348 A | 3/1987 | Yahalom et al. |
| 4,666,567 A | 5/1987 | Loch |
| 4,670,356 A | 6/1987 | Sato et al. |
| 4,678,552 A | 7/1987 | Chen |
| 4,678,721 A | 7/1987 | den Broeder et al. |
| 4,702,802 A | 10/1987 | Umino et al. |
| H543 H | 11/1988 | Chen et al. |
| 4,795,735 A | 1/1989 | Liu et al. |
| 4,834,845 A | 5/1989 | Muko et al. |
| 4,839,214 A | 6/1989 | Oda et al. |
| 4,869,971 A | 9/1989 | Nee et al. |
| 4,885,215 A | 12/1989 | Yoshioka et al. |
| 4,904,542 A | 2/1990 | Mroczkowski |
| 4,904,543 A | 2/1990 | Sakakima et al. |
| 4,923,574 A | 5/1990 | Cohen |
| 4,975,337 A | 12/1990 | Hyner et al. |
| 5,043,230 A | 8/1991 | Jagannathan et al. |
| 5,045,356 A | 9/1991 | Uemura et al. |
| 5,056,936 A | 10/1991 | Mahrus et al. |
| 5,059,493 A | 10/1991 | Takahata |
| 5,073,237 A | 12/1991 | Bacher et al. |
| 5,079,039 A | 1/1992 | Heraud et al. |
| 5,156,729 A | 10/1992 | Mahrus et al. |
| 5,156,899 A | 10/1992 | Kistrup et al. |
| 5,158,653 A | 10/1992 | Lashmore et al. |
| 5,190,637 A | 3/1993 | Guckel |
| 5,228,967 A | 7/1993 | Crites et al. |
| 5,268,235 A | 12/1993 | Lashmore et al. |
| 5,300,165 A | 4/1994 | Sugikawa |
| 5,320,719 A | 6/1994 | Lasbmore et al. |
| 5,326,454 A | 7/1994 | Engelhaupt |
| 5,352,266 A | 10/1994 | Erb et al. |
| 5,378,583 A | 1/1995 | Guckel et al. |
| 5,413,874 A | 5/1995 | Moysan, III et al. |
| 5,431,800 A | 7/1995 | Kirchhoff et al. |
| 5,461,769 A | 10/1995 | McGregor |
| 5,472,795 A | 12/1995 | Atita |
| 5,489,488 A | 2/1996 | Asai et al. |
| 5,500,600 A | 3/1996 | Moyes |
| 5,547,096 A | 4/1996 | Kleyn |
| 5,527,445 A | 6/1996 | Palumbo |
| 5,545,435 A | 8/1996 | Steffier |
| 5,620,800 A | 4/1997 | De Leeuw et al. |
| 5,660,704 A | 8/1997 | Murase |
| 5,679,232 A | 10/1997 | Fedor et al. |
| 5,738,951 A | 4/1998 | Goujard et al. |
| 5,742,471 A | 4/1998 | Barbee, Jr. et al. |
| 5,783,259 A | 7/1998 | McDonald |
| 5,798,033 A | 8/1998 | Uemiya et al. |
| 5,800,930 A | 9/1998 | Chen et al. |
| 5,828,526 A | 10/1998 | Kagawa et al. |
| 5,912,069 A | 6/1999 | Yializis et al. |
| 5,930,085 A | 7/1999 | Kitade et al. |
| 5,942,096 A | 8/1999 | Ruzicka et al. |
| 5,952,111 A | 9/1999 | Sugg et al. |
| 6,036,832 A | 3/2000 | Knol et al. |
| 6,036,833 A | 3/2000 | Tang et al. |
| 6,071,398 A | 6/2000 | Martin et al. |
| 6,143,424 A | 11/2000 | Jonte et al. |
| 6,143,430 A | 11/2000 | Miyasaka et al. |
| 6,193,858 B1 | 2/2001 | Hradil et al. |
| 6,203,936 B1 | 3/2001 | Cisar et al. |
| 6,212,078 B1 | 4/2001 | Hunt et al. |
| 6,214,473 B1 | 4/2001 | Hunt et al. |
| 6,284,357 B1 | 9/2001 | Lackey et al. |
| 6,312,579 B1 | 11/2001 | Bank et al. |
| 6,344,123 B1 | 2/2002 | Bhatnagar |
| 6,355,153 B1 | 3/2002 | Uzoh et al. |
| 6,409,907 B1 | 6/2002 | Braun et al. |
| 6,415,942 B1 | 7/2002 | Fenton et al. |
| 6,461,678 B1 | 10/2002 | Chen et al. |
| 6,466,417 B1 | 10/2002 | Gill |
| 6,468,672 B1 | 10/2002 | Donovan, III et al. |
| 6,537,683 B1 | 3/2003 | Staschko et al. |
| 6,547,944 B2 | 4/2003 | Schreiber et al. |
| 6,592,739 B1 | 7/2003 | Sonoda et al. |
| 6,739,028 B2 | 5/2004 | Sievenpiper et al. |
| 6,777,831 B2 | 8/2004 | Gutiérrez, Jr. et al. |
| 6,800,121 B2 | 10/2004 | Shahin |
| 6,884,499 B2 | 4/2005 | Penich et al. |
| 6,902,827 B2 | 6/2005 | Kelly et al. |
| 6,908,667 B2 | 6/2005 | Christ et al. |
| 6,979,490 B2 | 12/2005 | Steffier |
| 7,581,933 B2 | 9/2009 | Bruce et al. |
| 7,632,590 B2 | 12/2009 | Punsalan et al. |
| 7,736,753 B2 | 6/2010 | Deligianni et al. |
| 8,152,985 B2 | 4/2012 | Macary |
| 8,192,608 B2 | 6/2012 | Matthews |
| 8,253,035 B2 | 8/2012 | Matsumoto |
| 8,585,875 B2 | 11/2013 | Cummings et al. |
| 8,814,437 B2 | 8/2014 | Braun |
| 9,005,420 B2 | 4/2015 | Tomantschger et al. |
| 9,080,692 B2 | 7/2015 | Tomomori et al. |
| 9,108,506 B2 | 8/2015 | Whitaker et al. |
| 9,115,439 B2 | 8/2015 | Whitaker |

(56) References Cited

U.S. PATENT DOCUMENTS

| | | |
|---|---|---|
| 9,234,294 B2 | 1/2016 | Whitaker et al. |
| 9,273,932 B2 | 3/2016 | Whitaker et al. |
| 9,732,433 B2 | 8/2017 | Caldwell et al. |
| 9,758,891 B2 | 9/2017 | Bao |
| 9,938,629 B2 | 4/2018 | Whitaker et al. |
| 10,041,185 B2 | 8/2018 | Sukenari |
| 10,253,419 B2 | 4/2019 | Lomasney |
| 10,266,957 B2 | 4/2019 | Sugawara et al. |
| 10,472,727 B2 | 11/2019 | Lomasney |
| 10,513,791 B2 | 12/2019 | Lomasney et al. |
| 10,544,510 B2 | 1/2020 | Lomasney |
| 10,662,542 B2 | 5/2020 | Caldwell et al. |
| 2001/0037944 A1 | 11/2001 | Sanada et al. |
| 2002/0100858 A1 | 8/2002 | Weber |
| 2002/0179449 A1 | 12/2002 | Domeier et al. |
| 2003/0134142 A1 | 7/2003 | Ivey et al. |
| 2003/0234181 A1 | 12/2003 | Palumbo |
| 2003/0236163 A1 | 12/2003 | Chaturvedi et al. |
| 2004/0027715 A1 | 2/2004 | Hixson-Goldsmith et al. |
| 2004/0031691 A1 | 2/2004 | Kelly et al. |
| 2004/0067314 A1 | 4/2004 | Joshi et al. |
| 2004/0154925 A1 | 8/2004 | Podlaha et al. |
| 2004/0178076 A1 | 9/2004 | Stonas et al. |
| 2004/0211672 A1 | 10/2004 | Ishigami et al. |
| 2004/0239836 A1 | 12/2004 | Chase |
| 2005/0002228 A1 | 1/2005 | Dieny et al. |
| 2005/0109433 A1 | 5/2005 | Danger et al. |
| 2005/0205425 A1 | 9/2005 | Palumbo et al. |
| 2005/0221100 A1 | 10/2005 | Kirihara et al. |
| 2005/0279640 A1 | 12/2005 | Shimoyama et al. |
| 2006/0135281 A1 | 6/2006 | Palumbo et al. |
| 2006/0135282 A1 | 6/2006 | Palumbo et al. |
| 2006/0185853 A1* | 8/2006 | Bender ............ E21B 43/127 |
| | | 166/372 |
| 2006/0201817 A1 | 9/2006 | Guggemos et al. |
| 2006/0243597 A1 | 11/2006 | Matefi-Tempfli et al. |
| 2006/0269770 A1 | 11/2006 | Cox et al. |
| 2006/0272949 A1 | 12/2006 | Detor et al. |
| 2006/0286348 A1 | 12/2006 | Sauer |
| 2007/0158204 A1 | 7/2007 | Taylor et al. |
| 2007/0269648 A1 | 11/2007 | Schuh et al. |
| 2007/0278105 A1 | 12/2007 | Ettel |
| 2008/0093221 A1 | 4/2008 | Basol |
| 2008/0102360 A1 | 5/2008 | Stimits et al. |
| 2008/0226976 A1 | 9/2008 | Stimits |
| 2008/0245669 A1 | 10/2008 | Yoshioka et al. |
| 2008/0271995 A1 | 11/2008 | Savastiouk et al. |
| 2009/0004465 A1 | 1/2009 | Kano et al. |
| 2009/0101511 A1 | 4/2009 | Lochtman et al. |
| 2009/0130425 A1 | 5/2009 | Whitaker |
| 2009/0155617 A1 | 6/2009 | Kim et al. |
| 2009/0283410 A1 | 11/2009 | Sklar et al. |
| 2010/0187117 A1 | 7/2010 | Lingenfelter et al. |
| 2010/0304063 A1 | 12/2010 | McCrea et al. |
| 2010/0304179 A1 | 12/2010 | Facchini et al. |
| 2010/0319757 A1 | 12/2010 | Oetting |
| 2011/0162970 A1 | 7/2011 | Sato |
| 2011/0180413 A1 | 7/2011 | Whitaker et al. |
| 2011/0186582 A1 | 8/2011 | Whitaker et al. |
| 2011/0256356 A1 | 10/2011 | Tomantschger et al. |
| 2011/0277313 A1 | 11/2011 | Soracco et al. |
| 2012/0118745 A1 | 5/2012 | Bao |
| 2012/0135270 A1 | 5/2012 | Wilbuer et al. |
| 2012/0231574 A1 | 9/2012 | Wang |
| 2012/0282417 A1 | 11/2012 | Garcia et al. |
| 2013/0052343 A1 | 2/2013 | Dieny et al. |
| 2013/0071755 A1 | 3/2013 | Oguro |
| 2013/0075264 A1 | 3/2013 | Cummings et al. |
| 2013/0130057 A1 | 5/2013 | Caldwell et al. |
| 2013/0186852 A1 | 7/2013 | Dietrich et al. |
| 2013/0220831 A1 | 8/2013 | Vidaurre Heiremans et al. |
| 2013/0224008 A1 | 8/2013 | Cheung et al. |
| 2013/0323473 A1 | 12/2013 | Dietsch et al. |
| 2014/0163717 A1 | 6/2014 | Das et al. |
| 2014/0178637 A1* | 6/2014 | Rajagopalan ....... C23C 16/0272 |
| | | 428/141 |
| 2014/0231266 A1 | 8/2014 | Sherrer et al. |
| 2015/0315716 A1 | 11/2015 | Whitaker |
| 2015/0322588 A1 | 11/2015 | Lomasney et al. |
| 2016/0002790 A1 | 1/2016 | Whitaker et al. |
| 2016/0002803 A1 | 1/2016 | Sklar |
| 2016/0002806 A1 | 1/2016 | Lomasney |
| 2016/0002813 A1 | 1/2016 | Lomasney |
| 2016/0024663 A1 | 1/2016 | Lomasney |
| 2016/0145850 A1 | 5/2016 | Cook et al. |
| 2016/0159488 A1 | 6/2016 | Roach et al. |
| 2016/0160863 A1 | 6/2016 | Roach et al. |
| 2017/0191177 A1 | 7/2017 | Whitaker et al. |
| 2017/0191179 A1 | 7/2017 | Sklar |
| 2018/0016694 A1 | 1/2018 | Bao |
| 2018/0066375 A1 | 3/2018 | Morgan et al. |
| 2018/0071980 A1 | 3/2018 | Lomasney et al. |
| 2018/0245229 A1 | 8/2018 | Whitaker et al. |
| 2019/0309430 A1 | 10/2019 | Sklar |
| 2019/0360116 A1 | 11/2019 | Collinson et al. |
| 2020/0131658 A1 | 4/2020 | Lomasney et al. |

FOREIGN PATENT DOCUMENTS

| | | |
|---|---|---|
| CN | 101113527 A | 1/2008 |
| CN | 101195924 A | 6/2008 |
| CN | 102148339 A | 8/2011 |
| DE | 39 02 057 A1 | 7/1990 |
| DE | 10 2004 006 441 A1 | 12/2005 |
| DE | 10 2010 011 087 A1 | 9/2011 |
| JP | 47-2005 A | 2/1972 |
| JP | 52-109439 A | 9/1977 |
| JP | 58-197292 A | 11/1983 |
| JP | 60-97774 A | 5/1985 |
| JP | 61-99692 A | 5/1986 |
| JP | 1-132793 A | 5/1989 |
| JP | 5-251849 A | 9/1993 |
| JP | 6-196324 A | 7/1994 |
| JP | 7-65347 A | 3/1995 |
| JP | 2000-239888 A | 9/2000 |
| JP | 2001-181893 A | 7/2001 |
| JP | 2006-035176 A | 2/2006 |
| JP | 2009-215590 A | 9/2009 |
| KR | 10-2015-0132043 A | 11/2015 |
| SU | 36121 A1 | 4/1934 |
| WO | 83/02784 A1 | 8/1983 |
| WO | 95/14116 A1 | 5/1995 |
| WO | 2004/001100 A1 | 12/2003 |
| WO | 2007/045466 A1 | 4/2007 |
| WO | 2007/138619 A1 | 12/2007 |
| WO | 2009/045433 A1 | 4/2009 |
| WO | 2011/033775 A1 | 3/2011 |
| WO | 2012/145750 A2 | 10/2012 |
| WO | 2013/133762 A1 | 9/2013 |

OTHER PUBLICATIONS

"Low-temperature iron plating," web blog article found at http:blog.sina.com.cn/s/blog_48ed0a9c0100024z.html, published Mar. 22, 2006, 3 pages. (with English translation).

Adams et al., "Controlling strength and toughness of multilayer films: A new multiscalar approach," *J. Appl. Phys.* 74(2):1015-1021, 1993.

Aizenberg et al., "Skeleton of *Euplectella* sp.: Structural Hierarchy from the Nanoscale to the Macroscale," *Science* 309:275-278, 2005.

Alfantazi et al., "Synthesis of nanocrystalline Zn—Ni alloy coatings," *JMSLD5* 15(15):1361-1363, 1996.

Atanassov et al., "Electrodeposition and properties of nickel-manganese layers," *Surface and Coatings Technology* 78:144-149, 1996.

Bakonyi et al., "Electrodeposited multilayer films with giant magnetoresistance (GMR): Progress and problems," *Progress in Materials Science* 55:107-245, 2010.

Bartlett et al., "Electrochemical deposition of macroporous platinum, palladium and cobalt films using polystyrene latex sphere templates," *Chem. Commun.*, pp. 1671-1672, 2000.

(56) References Cited

OTHER PUBLICATIONS

Beattie et al., "Comparison of Electrodeposited Copper-Zinc Alloys Prepared Individually and Combinatorially," *J. Electrochem. Soc.* 150(11):C802-C806, 2003.
Bird et al., "Giant Magnetoresistance in Electrodeposited Ni/Cu and Co/Cu Multilayers," *J. Electrochem. Soc.* 142(4):L65-L66, 1995.
Blum, "The Structure and Properties of Alternately Electrodeposited Metals," presented at the Fortieth General Meeting of the American Electrochemical Society, Lake Placid, New York, Oct. 1, 1921, 14 pages.
Cohen et al., "Electroplating of Cyclic Multilayered Alloy (CMA) Coatings," *J. Electrochem. Soc.* 130(10):1987-1995, 1983.
Cowles, "High cycle fatigue in aircraft gas turbines—an industry perspective," *International Journal of Fracture* 80(2-3):147-163, 1996 (abstract only).
"Designing with Metals: Dissimilar Metals and The Galvanic Series," printed Oct. 5, 2017, 3 pages.
Despic et al., "Electrochemical Formation of Laminar Deposits of Controlled Structure and Composition," *J. Electrochem. Soc.* 136(6):1651-1657, 1989.
Dini et al. "On the High Temperature Ductility Properties of Electrodeposited Sulfamate Nickel," *Plating and Surface Finishing* 65(2):36-40, 1978.
Etminanfar et al., "Corrosion resistance of multilayer coatings of nanolayered Cr/Ni electrodeposited from Cr(III)—Ni(II) bath," *Thin Solid Films* 520:5322-5327, 2012.
Gasser et al., "Materials Design for Acoustic Liners: an Example of Tailored Multifunctional Materials," *Advanced Engineering Materials* 6(1-2):97-102, 2004.
Georgescu et al., "Magnetic Behavior of [Ni/Co—Ni—Mg—N] x n Cylindrical Multilayers prepared by Magnetoelectrolysis," *Phys. Stat. Sol.* (a) 189(3):1051-1055, 2002.
Ghanem et al., "A double templated electrodeposition method for the fabrication of arrays of metal nanodots," *Electrochemistry Communications* 6:447-453, 2004.
Grimmett et al., "Pulsed Electrodeposition of Iron-Nickel Alloys," *J. Electrochem. Soc.* 137(11):3414-3418, 1990.
Hariyanti, "Electroplating of Cu—Sn Alloys and Compositionally Modulated Multilayers of Cu—Sn—Zn—Ni Alloys on Mild Steel Substrate," Master of Science Thesis, University of Science, Malaysia, Penang, Malaysia, 2007.
Harris et al., "Improved Single Crystal Superalloys, CMSX-4® (SLS)[La+Y] and CMSX-486®," *TMS (The Minerals, Metals & Materials Society), Superalloys*, p. 45-52, 2004.
Huang et al., "Hardness variation and annealing behavior of a Cr—Ni multilayer electroplated in a trivalent chromium-based bath," *Surface and Coatings Technology* 203:3320-3324, 2009.
Huang et al., "Characterization of Cr—Ni multilayers electroplated from a chromium(III)-nickel(II) bath using pulse current," *Scripta Materialia*, 57:61-64, 2007.
Igawa et al., "Fabrication of SiC fiber reinforced SiC composite by chemical vapor infiltration for excellent mechanical properties," *Journal of Physics and Chemistry of Solids* 66:551-554, 2005.
Ivanov et al., "Corrosion resistance of compositionally modulated multilayered Zn—Ni alloys deposited from a single bath," *Journal of Applied Electrochemistry* 33:239-244, 2003.
Jeong et al., "The Effect of Grain Size on the Wear Properties of Electrodeposited Nanocrystalline Nickel Coatings," *Scripta Mater.* 44:493-499, 2001.
Jia et al., "LIGA and Micromolding" Chapter 4, *The MEMS Handbook*, 2nd edition, CRC Press, Boca Raton, Florida, Edited by Mohamed Gad-el-Hak, 2006.
Kalu et al., "Cyclic voltammetric studies of the effects of time and temperature on the capacitance of electrochemically deposited nickel hydroxide," *Journal of Power Sources* 92:163-167, 2001.
Kaneko et al., "Vickers hardness and deformation of Ni/Cu nano-multilayers electrodeposited on copper substrates," Eleventh International Conference on Intergranular and Interphase Boundaries 2004, *Journal of Material Science* 40:3231-3236, 2005.
Karimpoor et al., "Tensile Properties of Bulk Nanocrystalline Hexagonal Cobalt Electrodeposits," *Materials Science Forum* 386-388:415-420, 2002.
Keckes et al., "Cell-wall recovery after irreversible deformation of wood," *Nature Materials* 2:810-814, 2003.
Kirilova et al., "Corrosion behaviour of Zn—Co compositionally modulated multilayers electrodeposited from single and dual baths," *Journal of Applied Electrochemistry* 29:1133-1137, 1999.
Kockar et al., "Effect of potantiostatic waveforms on properties of electrodeposited NiFe alloy films," *Eur. Phys. J.* B(42):497-501, 2004.
Kruth et al., "Progress in Additive Manufacturing and Rapid Prototyping" *CIRP Annals* 47(2):525-540, 1998.
Lashmore et al., "Electrodeposited Cu—Ni Textured Superlattices," *J. Electrochem. Soc.* 135(5):1218-1221, 1988.
Lashmore et al., "Electrodeposited Multilayer Metallic Coatings," *Encyclopedia of Materials Science and Engineering*, Supp. vol. 1:136-140, 1988.
Leisner et al., "Methods for electrodepositing composition-modulated alloys," *Journal of Materials Processing Technology* 58:39-44, 1996.
Leith et al., "Characterization of Flow-Induced Compositional Structure in Electrodeposited NiFe Composition-Modulated Alloys," *J. Electrochem. Soc.* 145(8):2821-2833, 1998.
Lekka et al., "Corrosion and wear resistant electrodeposited composite coatings," *Electrochimica Acta* 50:4551-4556, 2005.
Lewis et al., "Stability in thin film multilayers and microlaminates: the role of free energy, structure, and orientation at interfaces and grain boundaries," *Scripta Materialia* 48:1079-1085, 2003.
Low et al., "Electrodeposition of composite coatings containing nanoparticles in a metal deposit," *Surface & Coating Technology* 201:371-383, 2006.
Malone, "New Developments in Electroformed Nickel-Based Structural Alloys," *Plating and Surface Finishing* 74(1):50-56, 1987.
Marchese, "Stress Reduction of Electrodeposited Nickel," *Journal of the Electrochemical Society* 99(2):39-43, 1952.
Meng et al., "Fractography, elastic modulus, and oxidation resistance of Novel metal-intermetallic Ni/$Ni_3$Al multilayer films," *J. Mater. Res.* 17(4):790-796, 2002.
Naslain et al., "Synthesis of highly tailored ceramic matrix composites by pressure-pulsed CVI," *Solid State Ionics* 141-142:541-548, 2001.
Naslain, "The design of the fibre-matrix interfacial zone in ceramic matrix composites," *Composites Part A* 29A:1145-1155, 1998.
Nicholls, "Advances in Coating Design for High-Performance Gas Turbines," *MRS Bulletin*, p. 659-670, 2003.
Onoda et al., "Preparation of Amorphous/Crystalloid Soft Magnetic Multilayer Ni—Co—B Alloy Films by Electrodeposition," *Journal of Magnetism and Magnetic Materials* 126(1-3):595-598, 1993.
Parkin et al., "Oscillations in Exchange Coupling and Magnetoresistance in Metallic Superlattice Structures: Co/Ru, Co/Cr, and Fe/Cr," *Physical Review Letters* 64(19):2304-2307, 1990.
Pilone et al., "Model of Multiple Metal Electrodeposition in Porous Electrodes," *Journal of the Electrochemical Society* 153(5):D85-D90, 2006.
Podlaha et al. "Induced Codeposition: I. An Experimental Investigation of Ni—Mo Alloys," *J. Electrochem. Soc.* 143(3):885-892, 1996.
Ross, "Electrodeposited Multilayer Thin Films," *Annual Review of Materials Science* 24:159-188, 1994.
Rousseau et al., "Single-bath Electrodeposition of Chromium-Nickel Compositionally Modulated Multilayers (CMM) From a Trivalent Chromium Bath," *Plating and Surface Finishing*, p. 106-110, 1999.
Saleh et al., "Effects of electroplating on the mechanical properties of stereolithography and laser sintered parts," *Rapid Prototyping Journal* 10(5)305-315, 2004.
Sanders et al., "Mechanics of hollow sphere foams," *Materials Science and Engineering* A347:70-85, 2003.
Sartwell et al., "Replacement of Chromium Electroplating on Gas Turbine Engine Components Using Thermal Spray Coatings," Report No. NRL/MR/6170-05-8890, Naval Research Laboratory, 2005. (207 pages).

(56) References Cited

OTHER PUBLICATIONS

Schwartz, "Multiple-Layer Alloy Plating," ASM Handbook 5: Surface Engineering, p. 274-276, 1994.
Sherik, "Synthesis, Structure and Properties of Electrodeposited Bulk Nanocrystalline Nickel," Master's Thesis, Queen's University, Ontario, Canada, 1993.
Shishkovski, "Laser synthesis of functionally graded meso structures and bulk products," FIZMATLIT, Moscow, Russia, pp. 30-38, 2009. (with English Abstract).
Simunovich et al., "Electrochemically Layered Copper-Nickel Nanocomposites with Enhanced Hardness," *J. Electrochem. Soc.* 141(1):L10-L11, 1994.
Sperling et al., "Correlation of stress state and nanohardness via heat treatment of nickel-aluminide multilayer thin films," *J. Mater. Res.* 19(11):3374-3381, 2004.
Srivastava et al., "Corrosion resistance and microstructure of electrodeposited nickel-cobalt alloy coatings," *Surface & Coatings Technology* 201:3051-3060, 2006.
Stephenson, Jr., "Development and Utilization of a High Strength Alloy for Electroforming," *Plating* 53(2): 183-192, 1966.
Suresh, "Graded Materials for Resistance to Contact Deformation and Damage," *Science* 292:2447-2451, 2001.
Switzer et al., "Electrodeposited Ceramic Superlattices," *Science* 247(4941):444-446, 1990.
Tench et al., "Considerations in Electrodeposition of Compositionally Modulated Alloys," *J. Electrochem. Soc.* 137(10):3061-3066, 1990.
Tench et al., "Enhanced Tensile Strength for Electrodeposited Nickel-Copper Multilayer Composites," *Metallurgical Transactions A* (15A):2039-2040, 1984.
Thangaraj et al., "Corrosion behavior of composition modulated multilayer Zn—Co electrodeposits produced using a single-bath technique," *J. of Appl. Electrochem.* 39:339-345, 2009.
Thangaraj et al., "Surface Modification by Compositionally Modulated Multilayered Zn—Fe Coatings," *Chinese Journal of Chemistry* 26:2285-2291, 2008.
Tokarz et al., "Preparation, structural and mechanical properties of electrodeposited Co/Cu multilayers," *phys. stat. sol. (c)* 5(11):3526-3529, 2008.
Touchstone Research Laboratory, Ltd., Material Safety Data Sheet, CFOAM Carbon Foams, 2008. (4 pages).
Vill et al., "Mechanical Properties of Tough Multiscalar Microlaminates," *Acta metall. mater.* 43(2):427-437, 1995.
Voevodin et al., "Superhard, functionally gradient, nanolayered and nanocomposite diamond-like carbon coatings for wear protection," *Diamond and Related Materials* 7:463-467, 1998.
Wearmouth et al., "Electroforming with Heat-Resistant, Sulfur-Hardened Nickel," *Plating and Surface Finishing* 66(10):53-57, 1979.
Weil et al., "Pulsed Electrodeposition of Layered Brass Structures," *Metallurgical Transactions A* 194:1569-1573, 1988.
Weil et al., "Properties of Composite Electrodeposits," U.S. Army Research Office, Final Report, Contract No. DAALQ3-87-K-0047, U.S. Army Research Office, 21 pages, 1990.
Wikipedia, "Gold," URL= http://en.wikipedia.org/wiki/Gold, version modified Nov. 3, 12 pages, 2008.
Wikipedia, "Silver," URL= http://en.wikipedia.org/wiki/Silver, version modified Nov. 3, 12 pages, 2008.
Wilcox, "Surface Modification With Compositionally Modulated Multilayer Coatings," *The Journal of Corrosion Science and Engineering* 6(Paper 52): 2004 (5 pages).
Wu et al., "Preparation and characterization of superhard $CN_x$/ZrN multilayers," *J. Vac. Sci. Technol. A* 15(3):946-950, 1997.
Yahalom et al., "Formation of composition-modulated alloys by electrodeposition," *Journal of Materials Science* 22:499-503, 1987.
Yang et al., "Effects of SiC sub-layer on mechanical properties of Tyranno-SA/SiC composites with multiple interlayers," *Ceramics International* 31:525-531, 2005.
Yang et al., "Enhanced elastic modulus in composition-modulated gold-nickel and copper-palladium foils," *Journal of Applied Physics* 48(3):876-879, 1977.
Yogesha et al., "Optimization of deposition conditions for development of high corrosion resistant Zn—Fe multilayer coatings," *Journal of Materials Processing Technology* 211:1409-1415, 2011.
Zabludovsky et al., "The Obtaining of Cobalt Multilayers by Programme-controlled Pulse Current," Transactions of the Institute of Metal Finishing 75(5):203-204, 1997.
U.S. Appl. No. 16/346,843, filed May 1, 2019.
U.S. Appl. No. 16/582,931, filed Sep. 25, 2019.
U.S. Appl. No. 16/671,104, filed Oct. 31, 2019.
U.S. Appl. No. 16/726,079, filed Dec. 23, 2019.

\* cited by examiner

PLUNGER CROSS SECTION
A-A

PLUNGER CROSS SECTION
B-B

US 11,293,272 B2

LIFT PLUNGERS WITH ELECTRODEPOSITED COATINGS, AND SYSTEMS AND METHODS FOR PRODUCING THE SAME

FIELD

Embodiments of the disclosure are generally directed to coated lift plungers, which have improved hardness, durability, and corrosion resistance, as well as methods of making, reworking, and using the same.

BACKGROUND

Lift plungers are used in artificial lift and plunger lift systems in petroleum wells (e.g., a well containing liquid, gaseous, or solid hydrocarbons or combinations thereof) in order to increase production or remove contaminants. A lift plunger is exposed to corrosive conditions, extreme impact, and high wear mechanisms or processes. Currently, coated steel or titanium is used. However, it is difficult to customize the performance of such materials, and, in the case of titanium, costly to machine. Accordingly, there is a need for customizable lift plungers with improved corrosion resistance, hardness, and durability. The present disclosure addresses these issues and provides related improvements with significant advantages.

BRIEF SUMMARY

Aspects of the present disclosure include a method for preparing a coated lift plunger, the method comprising: applying a laminate coating on a surface of a plunger core that is substantially symmetrical about a longitudinal axis and has a first diameter and a plunger body, thereby forming the coated lift plunger. Additional aspects of the present disclosure include a coated lift plunger produced by the methods described herein.

Further aspects of the disclosure include a coated lift plunger comprising: a plunger core that is substantially symmetrical about a longitudinal axis and has a first diameter and a plunger body; and a laminate coating on a surface of the plunger core, the laminate coating having a thickness, the laminate coating comprising a first and a second layer, the first layer having a first composition and a first nanostructure, and the second layer having a second composition and a second nanostructure.

Aspects of the present disclosure further include a method for reworking a lift plunger having mechanical wear, the method comprising: determining, based on a measured dimensional characteristic of the lift plunger, an amount of mechanical wear; identifying a wear surface based on a comparison of the measured dimensional characteristic and an original dimensional characteristic of the lift plunger before use or wear; determining an electroplating rework process to deposit a laminate coating onto the wear surface; and executing the electroplating rework process.

In additional aspects, the present disclosure provides a method for clearing downhole accumulations from a well comprising: positioning a coated lift plunger in a petroleum well tube; and releasing the coated lift plunger into the petroleum well tube, thereby allowing the coated lift plunger to travel in the petroleum well tube carrying liquids and downhole accumulations from a bottom position of a petroleum well to a top position of the petroleum well, and allowing a downhole gas to travel from the bottom position of the petroleum well to the top position of the petroleum well.

BRIEF DESCRIPTION OF THE SEVERAL VIEWS OF THE DRAWINGS

The detailed description is described with reference to the accompanying figures. In the figures, the left-most digit(s) of a reference number identifies the figure in which the reference number appears. The same right-most digits of a reference number in different figures indicate similar or identical components or features.

The sizes and relative positions of elements in the figures are not necessarily drawn to scale. For example, the shapes of various elements and angles are not drawn to scale and some of these elements are arbitrarily enlarged and positioned to improve figure legibility. Further, the particular shapes of the elements as drawn, are not intended to convey any information regarding the actual shape of the particular elements, and have been solely selected for ease of recognition in the figures.

DETAILED DESCRIPTION

Figure 1:
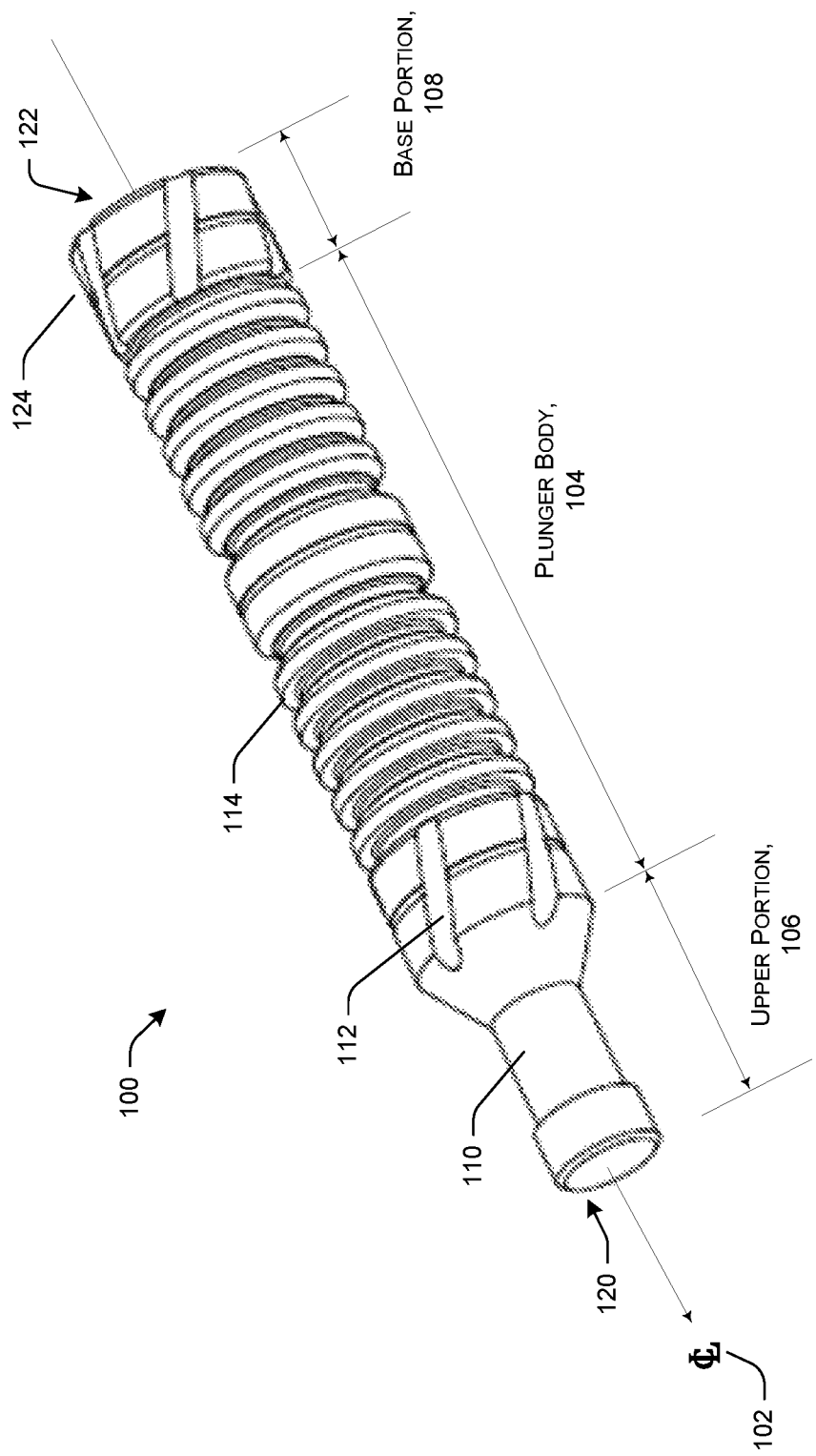
FIG. 1 shows an illustrative embodiment of a lift plunger.

The present disclosure is generally directed to coated lift plungers, which have improved hardness, durability, and corrosion resistance, as well as methods of making, reworking, and using the same.

Prior to setting forth this disclosure in more detail, it may be helpful to an understanding thereof to provide definitions of certain terms to be used herein. Additional definitions are set forth throughout this disclosure.

"Electrodeposition" or "electrodeposited" refers to a process or the resultant product, respectively, in which electrolysis is used to deposit a coating onto a workpiece. In other words, the workpiece is contacted with (e.g., partially immersed in, or fully immersed in) an electrolyte solution containing one or more ions (e.g., metal, ceramic, etc.) while an electric current is passed through the workpiece and the electrolyte solution, resulting in a thin coating being deposited on the surface of the workpiece. Such an electrodeposited coating that includes two or more layers may be referred to as a "laminate" coating.

For the purposes of this disclosure "coatings" include any thin layers that are electrodeposited onto the surface of a workpiece. Therefore "coatings," as used herein, includes claddings, which are made of a series of thin electrodeposited layers on the surface of a mandrel, where the mandrel is removed after the formation of the electrodeposited layers. Claddings are generally fastened to another article as a protective layer after formation.

A "nanolaminate coating" refers to an electrodeposited coating that includes two or more layers in which the individual layers have a thickness of less than 10,000 nanometers (i.e., 10 microns). Although the processes described herein are particularly suited for providing nanolaminate coatings, the same or similar processes can also be used to make similar articles in which the individual layers that are thicker than 10 microns. Such coatings may be referred to as "microlaminate coatings."

The term "plunger core workpiece" (abbreviated as "plunger core") includes any item with a surface onto which a coating is electrodeposited. Plunger cores include substrates, which are objects on which a coating is applied, and mandrels, which are substrates from which the coating is removed after formation.

"Additive manufacturing" refers to the preparation of three-dimensional articles by the sequential addition of materials. The process includes all forms of direct digital manufacturing, including, direct digital deposition, three-dimensional printing (3D-printing), selective laser sintering (SLS), sintering laser melting (SLM), fused deposition modeling (FDM), stereolithography (SLA), continuous liquid interface printing (CLIP), cutting woven fabric, forming woven fabric, cutting non-woven fabric, forming non-woven fabric, cutting foam sheets, or forming of foam sheets.

"Direct digital manufacturing" or "rapid prototyping" refers to the additive manufacturing of a three-dimensional solid article of any shape from a digital model. The process is an additive one, wherein successive layers, ribbons, beads, or areas of material are laid down or solidified in different shapes to form a three-dimensional article.

"Selective laser sintering" (SLS) refers to a process wherein a bed of powder is locally bonded by the action of a laser to form one cross section of an article at a time.

"Fused Deposition Modeling" (FDM) refers to a process wherein molten material (e.g., thermoplastic) is used to sequentially build up an article of a desired shape.

"Stereolithography" (SLA) refers to a process wherein a liquid polymer is locally solidified by photo-initiated cross-linking. In the process, light is focused onto the surface of a container of uncured photopolymer, and the desired 2D cross-sectional shape is 'drawn,' producing a solidified 2D pattern. Repeating this process produces 3D geometries of the desired shape.

"Laminated Object Manufacturing" (LOM) means the use of thin layers cut to shape and joined together (e.g., paper, polymer, metal) to form a desired three-dimensional article.

"Polymeric materials" refers to any material comprising a polymer (i.e., a macromolecule composed of repeated subunits) that is sufficiently malleable, but also sufficiently rigid, so as to form a solid article. Polymeric materials may be natural, semi-synthetic, or synthetic. Polymeric materials include plastics.

"Plastic" refers to a subset of moldable polymeric materials comprising synthetic or semi-synthetic organic compounds. Plastic can be molded into solid objects using a variety of methods. Examples of plastics include arylamides, acrylamides, polybenzimidazole (PBI), polyetherimide, polyetherketoneketone (PEKK), polyether ether ketone (PEEK), polyamide, polyimide, polyamide-imides, polyphenylene oxide (PPO), polystyrene (PS), PPO and PS, polyphthalamide (PPA), polyvinyl alcohol (PVA), acrylonitrile butadiene styrene (ABS), polycarbonate (PC), polylactic acid (PLA), PC/ABS, cellulose fiber, polyphenylsulfone (PPSU), thermosets, PBI-PEEK, urea, epoxies, cyanate esters, and polyurethanes.

"Petroleum well" includes liquid or gas wells designed to bring petroleum hydrocarbons to the earth's surface. Examples include oil and natural gas.

The terms "about" has the meaning reasonably ascribed to it by a person of ordinary skill in the art when used in conjunction with a stated numerical value or range, i.e. denoting somewhat more or somewhat less than the stated value or range, to within a range of ±20% of the stated value; ±19% of the stated value; ±18% of the stated value; ±17% of the stated value; ±16% of the stated value; ±15% of the stated value; ±14% of the stated value; ±13% of the stated value; ±12% of the stated value; ±11% of the stated value; ±10% of the stated value; ±9% of the stated value; ±8% of the stated value; ±7% of the stated value; ±6% of the stated value; ±5% of the stated value; ±4% of the stated value; ±3% of the stated value; ±2% of the stated value; or ±1% of the stated value.

The term "substantially" has the meaning reasonably ascribed to it by a person of ordinary skill in the art when used to describe a physical characteristic of an item, i.e., indicating that the item possesses the referenced characteristic to a significant extent, e.g., to within a range of ±20% of the referenced characteristic; ±19% of the referenced characteristic; ±18% of the referenced characteristic; ±17% of the referenced characteristic; ±16% of the referenced characteristic; ±15% of the referenced characteristic; ±14% of the referenced characteristic; ±13% of the referenced characteristic; ±12% of the referenced characteristic; ±11% of the referenced characteristic; ±10% of the referenced characteristic; ±9% of the referenced characteristic; ±8% of the referenced characteristic; ±7% of the referenced characteristic; ±6% of the referenced characteristic; ±5% of the referenced characteristic; ±4% of the referenced characteristic; ±3% of the referenced characteristic; ±2% of the referenced characteristic; or ±1% of the referenced characteristic. For example, an item may be considered substantially circular if any two measurements of a diameter of the item are within a range of ±20%, ±19%; ±18%; ±17%; ±16%; ±15%; ±14%; ±13%; ±12%; ±11%; ±10%; ±9%; ±8%; ±7%; ±6%; ±5%; ±4%; ±3%; ±2%; or ±1% of each other. When used in conjunction with a comparator (e.g., a first coating is substantially thicker than a second coating) substantially is used to mean that the difference is at least ±20% of the referenced characteristic; ±19% of the referenced characteristic; ±18% of the referenced characteristic; ±17% of the referenced characteristic; ±16% of the referenced characteristic; ±15% of the referenced characteristic; ±14% of the referenced characteristic; ±13% of the referenced characteristic; ±12% of the referenced characteristic; ±11% of the referenced characteristic; ±10% of the referenced characteristic; ±9% of the referenced characteristic; ±8% of the referenced characteristic; ±7% of the referenced characteristic; ±6% of the referenced characteristic; ±5% of the referenced characteristic; ±4% of the referenced characteristic; ±3% of the referenced characteristic; ±2% of the referenced characteristic; or ±1% of the referenced characteristic.

"Substantially uniform," as used herein, for example "substantially uniform thickness" means an overall thickness variation of less than ±30% from the average thickness. Stricter tolerances may be specified including, variations of less than ±25%, ±20%, ±15%, ±10%, or ±5% from the average surface thickness.

The terms "a," "an," "the," and similar articles or terms used in the context of describing the disclosure (especially in the context of the following claims) are to be construed to cover both the singular and the plural (i.e., "one or more"), unless otherwise indicated herein or clearly contradicted by context. Ranges of values recited herein are intended to serve as a shorthand method of referring individually to each separate value falling within the range. In the present description, any concentration range, percentage range, ratio range, or integer range is to be understood to include the value of any integer within the recited range and, when appropriate, fractions thereof (such as one tenth and one hundredth of an integer), unless otherwise indicated. Also, any number range recited herein relating to any physical feature, such as size or thickness, are to be understood to include any integer within the recited range, unless otherwise indicated. Unless otherwise indicated herein, each individual value is incorporated into the specification as if it were individually recited herein.

The use of the alternative (e.g., "or") should be understood to mean one, both, or any combination thereof of the alternatives. The various embodiments described above can be combined to provide further embodiments. Groupings of alternative elements or embodiments of the disclosure described herein should not be construed as limitations. Each member of a group may be referred to and claimed individually, or in any combination with other members of the group or other elements found herein.

Each embodiment disclosed herein can comprise, consist essentially of, or consist of a particular stated element, step, ingredient, or component. The term "comprise" or "comprises" means "includes, but is not limited to," and allows for the inclusion of unspecified elements, steps, ingredients, or components, even in major amounts. The phrase "consisting of" excludes any element, step, ingredient, or component that is not specified. The phrase "consisting essentially of" limits the scope of the embodiment to the specified elements, steps, ingredients, or components, and to those that do not materially affect the basic and novel characteristics of the claimed disclosure.

Coated Lift Plungers

As noted above, the present disclosure provides for coated lift plungers. As used herein, "lift plunger" includes any substantially cylindrical structure that is suitable for use in an artificial lift or a plunger lift system. In some embodiments, a lift plunger of the present disclosure is a conventional, continuous flow, shifting ring, pad, brush, solid-ring, sleeve and ball, or snake plunger.

In order to describe particular embodiments of the apparatuses and systems of the disclosure, reference is made to the appended figures. This discussion should not be construed as limiting, as the particular details of the embodiments described herein are by way of example and are for purposes of illustrative discussion of embodiments of the present disclosure.

Referring to FIG. 1, a lift plunger 100 has three portions, an upper portion 106, a plunger body 104, and a base portion 108. An upper portion further includes a fishing neck portion 110. A plunger body may comprise a top end 120; a bottom end 122; a lubricator catch portion at the top end of the plunger body; and a bumper portion 124 at the bottom end of the plunger body.

A lift plunger of the present disclosure is substantially symmetrical around a longitudinal axis 102, which runs from a center of an upper face to a center of a bottom face of the plunger core, as shown in FIG. 1. In some embodiments, at least a portion of a lift plunger is substantially cylindrical. In further embodiments, ridges, fins, grooves, and/or other such features are present on a surface of a plunger core. Examples of grooves 112 and ridges 114 are shown in FIG. 1.

Figure 2:
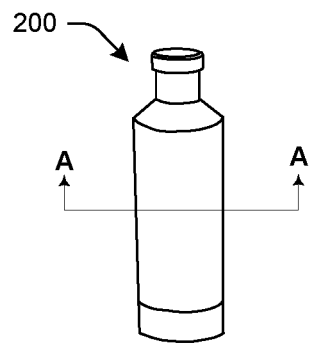
FIG. 2 shows an illustrative coated lift plunger of the present disclosure, and two cross sections of the same.
Figure 2:
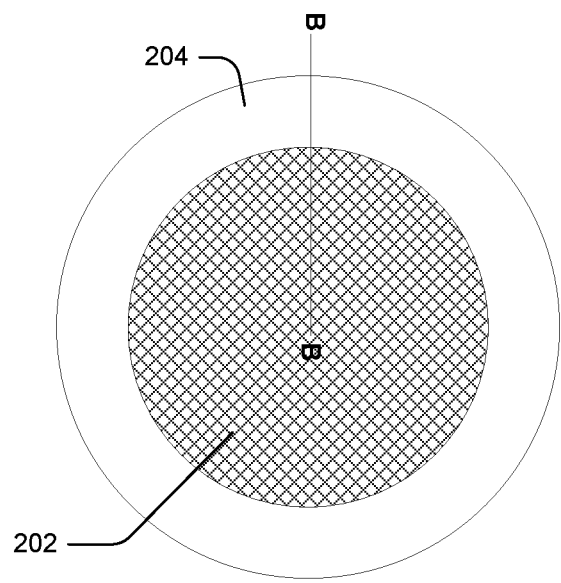
Figure 2:
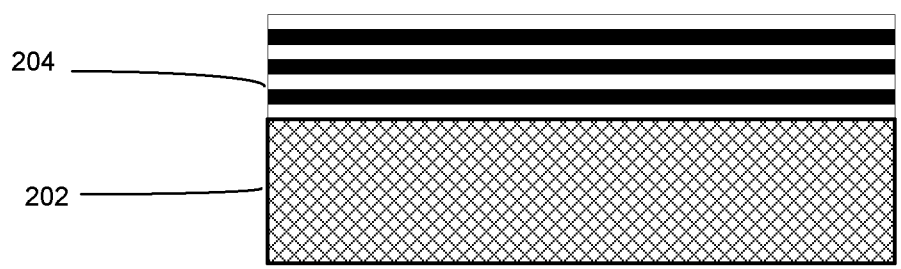

A coated lift plunger of the present disclosure comprises a plunger core 202 and a coating 204, as shown in FIG. 2. A plunger core is substantially symmetrical around a longitudinal axis, which runs from a center of an upper face to a center of a bottom face of the plunger core. In some embodiments, at least a portion of a plunger core is substantially cylindrical. In further embodiments, ridges, fins, grooves, and/or other such features are present on a surface of a plunger core. A plunger core of the present disclosure further has at least one diameter. In embodiments, length or a weight of a plunger core is chosen based at least on a property of a petroleum well. Properties of a petroleum well include liquid to gas ratio, casing pressure, tubing pressure, line pressure, plunger fall velocity, or well depth.

A plunger core employed in embodiments of the present disclosure may be any suitable plunger core. In embodiments, a plunger core is made of a metal or metal alloy. In some embodiments, a plunger core comprises titanium (Ti), steel, aluminum (Al), copper (Cu), carbon-steel, iron (Fe), stainless steel, or a combination thereof. In some embodiments, a plunger core is made of a steel alloy. In certain embodiments, a steel alloy includes: carbon (C) and Fe; C, Fe, and molybdenum (Mo); or C, Fe, Mo, and cobalt (Co).

In embodiments, a metal is formed into a plunger core using any suitable method. In embodiments, a plunger core of the present disclosure is formed by an additive manufacturing process. In some embodiments, a plunger core of the present disclosure is formed by a process comprising mechanically removing material, for example by cutting, machining, grinding, polishing, or a combination thereof.

In embodiments, a plunger core of the present disclosure is formed of a polymeric material (e.g., a plastic). In some embodiments, a plunger core comprises a thermoset or a thermoplastic material. In various embodiments, a plunger core comprises a plastic material. In some embodiments, a plunger core comprises one or more arylamides, acrylamides, polybenzimidazole (PBI), polyetherimide, polyetherketoneketone (PEKK), polyether ether ketone (PEEK), polyamide, polyimide, polyamide-imides, polyphenylene oxide (PPO), polystyrene (PS), PPO and PS, polyphthalamide (PPA), polyvinyl alcohol (PVA), acrylonitrile butadiene styrene (ABS), polycarbonate (PC), polylactic acid (PLA), PC/ABS, cellulose fiber, polyphenylsulfone (PPSU), thermosets, PBI-PEEK, urea, epoxies, cyanate esters, or polyurethanes.

In various embodiments, a polymeric material (e.g., a plastic) includes an additive, such as carbon black (e.g., from about 1% to about 5% (w/w)), graphene (e.g., PLA-Graphene printing filament), graphite, carbon nanotubes, carbon nanofibers, or graphite fibers. Additionally, a polymeric material (e.g., a plastic) of the present disclosure may further include a metal (e.g., Ag, Al, Au, B, Be, Co, Cr, Cu, Fe, Hg, In, Ir, Mg, Mn, Mo, Nb, Nd, Ni, Pd, Pt, Re, Rh, Sb, Sn, Pb, Ta, Ti, W, V, Zn, Zr, or alloys thereof). In such embodiments, a metal added to a polymeric material (e.g., a plastic) may be included in a concentration ranging from about 1% to about 50% (w/w).

A polymeric material (e.g., a plastic) may be formed into a plunger core using any suitable method, such as, for example, casting, injection molding, blow molding, extrusion molding, cutting, machining, milling, grinding, sanding, polishing, abrasive blasting, three-dimensional printing (3D-printing), selective laser sintering (SLS), sintering laser melting (SLM), fused deposition modeling (FDM), stereolithography (SLA), continuous liquid interface printing (CLIP), cutting woven fabric, forming woven fabric, cutting non-woven fabric, forming non-woven fabric, cutting foam sheets, or forming of foam sheets. A method of formation used may confer different properties on the plunger core.

In embodiments, forming the polymeric material (e.g., a plastic) comprises casting, cutting, milling, grinding, sanding, polishing, abrasive blasting, 3D-printing, SLS, SLM, FDM, SLA, CLIP, cutting woven fabric, forming woven fabric, cutting non-woven fabric, forming non-woven fabric, cutting foam sheets, or forming of foam sheets. In some embodiments, forming the polymeric material (e.g., a plastic) comprises cutting, milling, 3D-printing, FDM, SLA, CLIP, cutting woven fabric, forming woven fabric, cutting non-woven fabric, forming non-woven fabric, cutting foam sheets, or forming of foam sheets.

In embodiments, a plunger core of the present disclosure is formed by an additive manufacturing process. In such embodiments, the additive manufacturing process may be the additive manufacturing process comprises 3D-printing, SLS, SLM, FDM, SLA, or CLIP.

In some embodiments, a plunger core is formed by resin infusing or injection molding a thermoset or a thermoplastic material.

In other embodiments, a plunger core is formed by casting, rotational molding, injection molding, blow molding, or extrusion molding. In further embodiments, a plunger core is formed by mechanically removing material. Material may be mechanically removed, for example, by cutting, milling, grinding, sanding, polishing, or abrasive blasting.

In additional embodiments, a plunger core is formed by cutting or shaping of the woven fabric, the non-woven fabric, or the foam sheets. In such embodiments, the woven fabric, non-woven fabric, or foam sheets may comprise the polymeric material. In some embodiments, the shaping of woven fabric, non-woven fabric, or foam sheets comprises forming and layering at least two layers of the woven fabric, the non-woven fabric, or the foam sheets.

A plunger core may further comprise a light-weighting feature. Examples of light-weighting features include a plurality of voids within the plunger core; a microcellular or nanocellular foam; a region devoid of material; or truss-like structures. A density of a light-weighting feature may vary in at least one direction of a plunger core. In embodiments, the light-weighting feature is a porous section.

"Porous," refers to three-dimensional materials comprising at least partially hollow void structures (also referred to as "cells") made of a series of at least partially hollow polyhedrons. Each porous material has a "void volume," which is a measure of the "empty" space in the material. In other words, void volume is the fraction of the volume of the voids over the total volume of the material. A porous material may be closed-cell, in which the individual void structures are fully encased in the material from which the porous material was prepared, or open-cell, in which the individual void structures are connected to each other such that fluid or gas can pass into and/or through the voids in the porous material, or include both open and closed cells. In some embodiments, an open-cell porous material includes some closed cells. In some embodiments, the open-cell porous material includes one or more sections of closed cells. In some embodiments, a porous material is an open-cell foam.

"Foam" as used herein is a material generally formed by trapping pockets of gas in a liquid or solid. By trapping pockets of gas in a liquid under conditions where the liquid solidifies, a network of cells is produced within the resulting solid. A foam may comprise a series of irregular polyhedrons.

Figure 3:
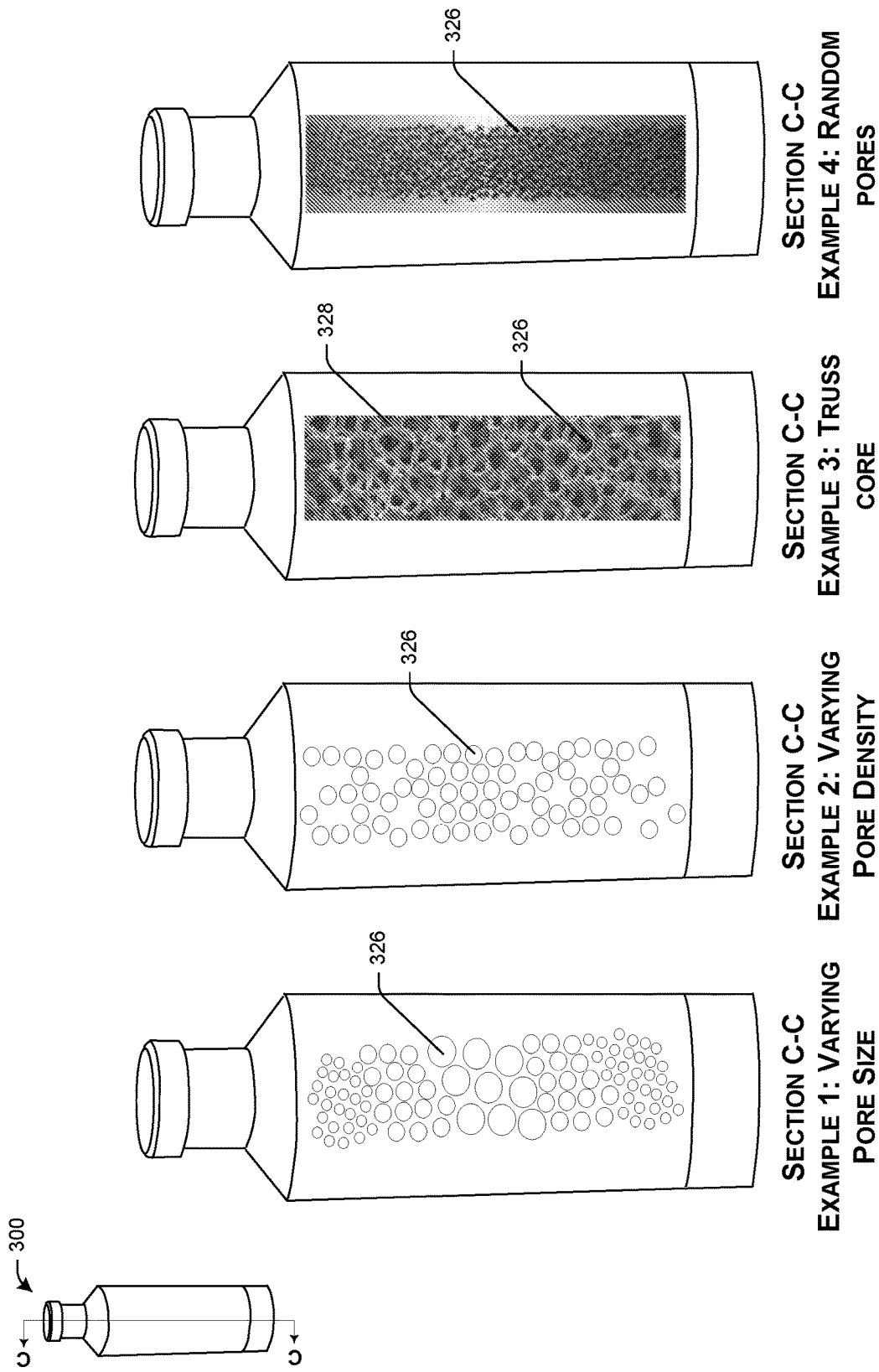
FIG. 3 shows a plunger core and four cross sections of the same, each illustrating an example of a light-weighting feature.

In embodiments, a plurality of voids 326 has different volumes (e.g., two, three, four, five, ten, twenty, or more volumes), as shown in FIG. 3, Example 1. In some embodiments, each void of a plurality of voids within the plunger core independently has a volume. In further embodiments, a plurality of voids 326 per unit volume of the plunger core varies in at least one dimension of the plunger core, as shown in FIG. 3, Example 2. In some such embodiments, the voids may all have substantially the same void volume.

In some embodiments, a light-weighting feature comprises a plurality of struts 328 that define voids 326 within a plunger body, as shown in FIG. 3, Example 3. In some embodiments, a light-weighting feature comprises a plurality of voids 326 that have no pattern with regard to size and position (i.e., are randomly sized and positioned), as shown in FIG. 3, Example 4.

A plunger body may have a void volume of at least 1%. In some embodiments, a plunger body may have a void volume of at least 5%. In some embodiments, a plunger body may have a void volume of at least 10%. In some embodiments, a plunger body may have a void volume of at least 25%. In some embodiments, a plunger body may have a void volume of at least 50%.

In embodiments, a plunger body has a void volume ranging from about 1% to about 99%. In embodiments, a plunger body may have a void volume ranging from about 20% to about 50%, from about 30% to about 60%, from about 40% to about 70%, or from about 50% to about 80%. In embodiments, a plunger body may have a void volume ranging from about 25% to about 75%. In some embodiments, a plunger body may have a void volume ranging from about 1% to about 5%, from about 5% to about 10%, from about 10% to about 15%, from about 15% to about 20%, from about 20% to from about 25%, from about 25% to about 30%, from about 30% to about 35%, from about 35% to about 40%, from about 40% to about 45%, from about 45% to about 50%, from about 50% to about 55%, from about 55% to about 60%, from about 60% to about 65%, from about 65% to about 70%, from about 70% to about 75%, from about 75% to about 80%, from about 80% to about 85%, from about 85% to about 90%, from about 90% to about 95%, or from about 95% to about 99%.

A plurality of voids in a plunger body may be in any suitable shape, such as, for example, circles, squares, rectangles, ovals, triangles, diamonds, hexagons, and the like. In some embodiments, a plurality of holes is one shape. In further embodiments, a plurality of holes in a plunger core includes holes of more than one shape.

In embodiments, a light-weighting feature is a microcellular or nanocellular foam. Microcellular foam contains voids (e.g., bubbles) with a size ranging from about 0.1 μm to about 100 μm. In embodiments, microcellular foam is a form of manufactured plastic that contains bubbles with a size ranging from about 0.1 μm to about 100 μm. In some embodiments, microcellular foam contains bubbles of less than 50 μm in size. Nanocellular foam contains voids (e.g., bubbles) with a size ranging from about 20 nm to about 100 nm. In certain embodiments, nanocellular foam is a form of manufactured plastic that contains bubbles with a size ranging from about 20 nm to about 100 nm.

In embodiments, a light-weighting feature is a region devoid of material. In some embodiments, a light-weighting feature is a hollow core centered about a longitudinal axis and extending through a portion of a plunger body. In further embodiments, a light-weighting feature is a plurality of voids within a plunger body. In such embodiments, a number of voids per unit volume may vary along a longitudinal axis or along a first diameter of the plunger body. In additional embodiments, a density of a plurality of voids is higher between the top end and the bottom end. In further embodiments, a density of the plurality of voids is about zero voids per unit volume at the top end and the bottom end. In some embodiments, individual ones of the plurality of voids are substantially uniform in dimension, and a plurality of voids vary in a number of voids per unit volume throughout a volume of a plunger body.

In some embodiments, a porous section includes truss-like structures with "struts" that extend between vertices of polyhedrons defining open void structures. Such struts are generally on the order of millimeters larger. In some embodiments, such struts are on the order of millimeters or centimeters. Truss-like structures may be comprised of repeating unit cells of regular polyhedrons, irregular polyhedrons, or a combination thereof. Accordingly, in some embodiments, truss-like structures comprise a plurality of interconnected struts forming polyhedrons in a series that extends in three dimensions. In certain embodiments, a truss-like structure is formed from a plurality of polyhedrons in which at least one face of the polyhedrons remain, while the remainder of the faces of the polyhedrons are not present.

A "polygon" is a planar figure with at least three substantially straight sides and at least three angles. A "regular polygon" is a polygon in which all angles are substantially equal in measure and all sides have substantially the same length.

A "polyhedron" is a three-dimensional geometric structure with substantially flat polygonal faces, substantially straight edges, and vertices. A "uniform polyhedron" is a polyhedron which has regular polygons as faces and is vertex-transitive. A "regular polyhedron" is a polyhedron with identical faces that may be in the form of convex regular polyhedrons or star polyhedrons. An "irregular polyhedron" is a polyhedron with at least one face that is not identical to the remaining faces. A "triangulated" polyhedron is a polyhedron in which all faces are formed by triangles.

In embodiments, a light-weighting feature is a truss-like structure. In embodiments, truss-like structures (e.g., substantially triangular units constructed with substantially straight members that are connected at or near the ends) form a network with a density that varies in one or more dimensions of a plunger core. In other embodiments, truss-like structures form a network with a density that does not vary in one or more dimensions of a plunger core.

In some embodiments, a light-weighting feature is optimized based on a property of a petroleum well. Examples of properties of a petroleum well include liquid to gas ratio, casing pressure, tubing pressure, line pressure, plunger fall velocity, or well depth.

In additional embodiments, a light-weighting feature has a secondary function comprising liquid bypass or plunger rotation.

In further embodiments, a plunger core comprises a weighted section that is denser than any other part of a plunger core. A weighted section may increase a weight of a plunger core when compared to a plunger core that has the same volume without a weighted section. In embodiments, a weighted section comprises a metal. In such embodiments, a weighted section may comprise Ti, steel, Al, Cu, carbon-steel, Fe, or stainless steel. In some embodiments, a weighted section includes a magnetic material. In still further embodiments, a magnetic material is used for plunger removal from a petroleum well, capturing the plunger at a top position or bottom position of the petroleum well, or both.

Figure 6A:
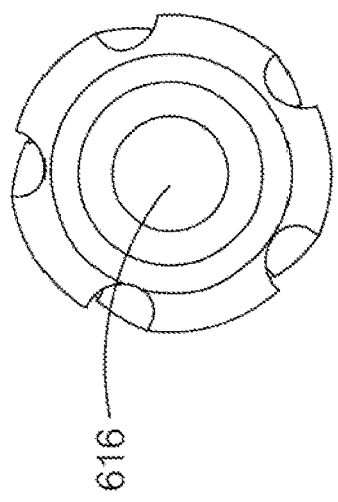
FIGS. 6A and 6B show two views of an illustrative lift plunger of the disclosure.
Figure 6B:
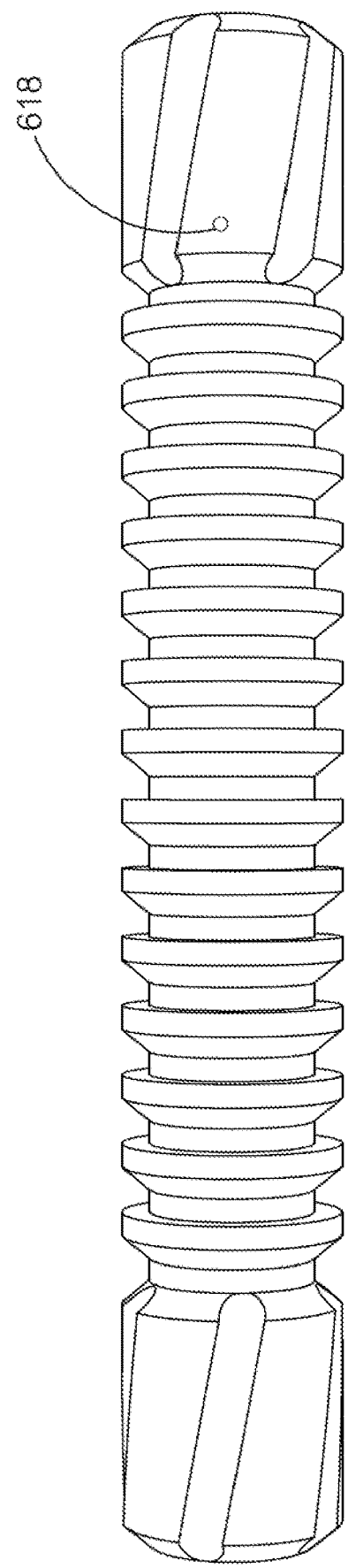

In embodiments, a lift plunger has a recessed cavity 616 in a top surface, as shown in FIG. 6A. In such embodiments, a recessed cavity may be used to retrieve a lift plunger from a petroleum well, dislodge a lift plunger that has been wedged or jammed, or both. In order to prevent sand, debris, liquids, and the like from filling a recessed cavity, a hole 618 may be present that extends through a side wall of the recessed cavity, as shown in FIG. 6B. In some embodiments, the hole is located at or near the deepest portion of the recessed cavity. In embodiments, a recessed cavity extends to a depth of about 5% of the total length of a lift plunger. In some embodiments, a recessed cavity extends to a depth of about 10% of the total length of a lift plunger. In some embodiments, a recessed cavity extends to a depth of about 15% of the total length of a lift plunger. In some embodiments, a recessed cavity extends to a depth of about 20% of the total length of a lift plunger. In some embodiments, a recessed cavity extends to a depth of about 25% of the total length of a lift plunger.

As noted above, a coated lift plunger of the present disclosure comprises a coating. Laminate coatings (e.g., nanolaminate coatings) of the present disclosure include a plurality of layers that, in certain embodiments, repeat in a pattern. In some embodiments, a plurality of layers is made up of two types of layers that alternate. In such embodiments, nanolaminate coatings include a plurality of alternating first and second layers. Alternatively, one or more additional layers may be present in a coating between any first and second layer. In other embodiments, a plurality of layers is made up of more than two layers that repeat in any suitable pattern (e.g., A-B-C-A-B-C-A-B-C or A-B-C-B-A-B-C).

In embodiments, a coating comprises at least two layers. Each layer has a composition and a nanostructure. Composition refers to factors such as which electrodepositable species are included in the layer, and the concentration thereof. Nanostructure refers to factors such as an average grain size, a grain boundary geometry, a crystal orientation, and a defect density. A composition, a nanostructure, or both differs between adjacent layers. In embodiments, adjacent layers differ in composition, grain size, grain structure (e.g., morphology or microstructure), or a combination thereof.

In some embodiments, a coating comprises a plurality of first layers and a plurality of second layers. In some embodiments a coating comprises two, three, four, or five layer types. In such embodiments, each type of layer may have a composition and a nanostructure. A composition or a nanostructure differs between each layer type. In embodiments, different types of layers may differ in composition, grain size, grain structure (e.g., morphology or microstructure), or a combination thereof. In embodiments, a second layer differs from the first layer in composition, grain size, grain structure, or a combination thereof.

Each layer or type of layer of a coating may be made of a metal, a metal alloy, or a ceramic. In embodiments, each of layer or type of layer of a coating includes at least one electrodepositable species independently selected from silver (Ag), Al, gold (Au), boron (B), beryllium (Be), carbon (C), Co, chromium (Cr), Cu, Fe, mercury (Hg), indium (In), iridium (Ir), magnesium (Mg), manganese (Mn), molybdenum (Mo), niobium (Nb), neodymium (Nd), nickel (Ni), phosphorous (P), palladium (Pd), platinum (Pt), rhenium (Re), rhodium (Rh), antimony (Sb), silicon (Si), tin (Sn), lead (Pb), tantalum (Ta), Ti, tungsten (W), vanadium (V), zinc (Zn), and zirconium (Zr). In some embodiments, each layer or type of layer of a coating includes at least 0.01% (w/w) of Ag, Al, Au, B, Be, C, Co, Cr, Cu, Fe, Hg, In, Ir, Mg, Mn, Mo, Nb, Nd, Ni, P, Pd, Pt, Re, Rh, Sb, Si, Sn, Pb, Ta, Ti, W, V, Zn, or Zr. Each electrodepositable species may be present in a layer or type of layer of a coating in a concentration of about 10%, about 5%, about 1%, about 0.1%, about 0.05%, about 0.01%, about 0.005%, or about 0.001% by weight.

In embodiments, a layer comprises chromium. In certain embodiments, a layer or type of layer of a coating is monocrystalline Co. In some embodiments, a layer or type of layer of a coating comprises Al. In further embodiments, a layer or type of layer of a coating comprises Ni or Cr. In particular embodiments, a layer or type of layer of a coating comprises Ni, Fe, and Cr. In some embodiments, a layer or type of layer of a coating comprises Ni, Fe, Cr, and Mo.

In some embodiments, each layer or type of layer of a coating comprises two or more, three or more, four or more, or five or more different electrodepositable species. In some embodiments, one or more layers of a coating comprise an alloy of at least two electrodepositable species. In some embodiments, one or more layers of a coating comprise an alloy of at least three electrodepositable species.

Illustrative alloys that may be used in a layer or type of layer of a coating comprise Zn and Fe; Zn and Ni; Co and Ni; Ni, Co, and Mo; Ni and Fe; Ni and Cr; Cu and Zn; Cu and Sn; Ni, Co, and P; Ni, Co, W, and P; Ni, Co, and W; Ni and W; Ni, W, and P; Ni, Co, and B; Ni, Co, W, and B; or Ni, W, and B.

In embodiments, each of layer or type of layer comprises NiCr, NiFe, NiCo, NiCrCo, NiAl, NiCrAl, NiFeAl, NiCoAl, NiCrCoAl, NiMo, NiCrMo, NiFeMo, NiCoMo, NiCrCoMo, NiW, NiCrW, NiFeW, NiCoW, NiCrCoW, NiMoW, NiNb, NiCrNb, NiFeNb, NiCoNb, NiCrCoNb, NiTi, NiCrTi, NiFeTi, NiCoTi, NiCrCoTi, NiCrP, NiCrAl, NiCoP, NiCoAl, NiFeP, NiFeAl, NiCrSi, NiCrB, NiCoSi, NoCoB, NiFeSi, NiFeB, ZnCr, ZnFe, ZnCo, ZnNi, ZnCrP, ZnCrAl, ZnFeP, ZnFeAl, ZnCoP, ZnCoAl, ZnNiP, ZnNiAl, ZnCrSi, ZnCrB, ZnFeSi, ZnFeB, ZnCoSi, ZnCoB, ZnNiSi, ZnNiB, CoCr, CoFe, CoCrP, CoFeP, CoCrAl, CoFeAl, CoCrSi, CoFeSi, CoCrB, CoFeB, CoAl, CoW, CoCrW, CoFeW, CoTi, CoCrTi, CoFeTi, CoTa, CoCrTa, CoFeTa, CoC, CoCrC, CoFeC, FeCr, FeCrP, FeCrAl, FeCrSi, or FeCrB.

In embodiments, each layer or type of layer comprises Ni and W. In embodiments, each layer or type of layer comprises Ni and Mo. In embodiments, each layer or type of layer comprises Ni, Mo, and W.

In some embodiments, each layer comprises NiCr, NiCo, NiW, or NiCoP. In specific embodiments, an alloy used in a layer or type of layer of a coating includes Ni and Fe; or Ni and Co. In still further embodiments, a layer of a coating comprises three or more, four or more, or five or more of Co, Cr, Mo, W, Fe, Si, Mn, and Ni.

In particular embodiments a first layer of a coating includes Ni in a concentration ranging from about 50% (w/w) to about 99% (w/w). In such embodiments, the first layer of the coatings may include Ni in a concentration greater than about 50% (w/w), about 55% (w/w), about 60% (w/w), about 65% (w/w), about 70% (w/w), about 75% (w/w), about 80% (w/w), about 85% (w/w), about 90% (w/w), about 92% (w/w), about 93% (w/w), about 94% (w/w), about 95% (w/w), about 96% (w/w), about 97% (w/w), about 98% (w/w), or about 99% (w/w). In some embodiments, a first layer of a coatings includes Ni in a concentration less than about 50% (w/w), about 55% (w/w), about 60% (w/w), about 65% (w/w), about 70% (w/w), about 75% (w/w), about 80% (w/w), about 85% (w/w), about 90% (w/w), about 92% (w/w), about 93% (w/w), about 94% (w/w), about 95% (w/w), about 96% (w/w), about 97% (w/w), about 98% (w/w), or about 99% (w/w).

In certain embodiments, a second layer of the coatings includes Co in a concentration ranging from about 5% (w/w) to about 35% (w/w). In such embodiments, the second layer includes Co in a concentration ranging from about 5% (w/w) to about 10% (w/w), about 10% (w/w) to about 15% (w/w), about 15% (w/w) to about 20% (w/w), about 20% (w/w) to about 25% (w/w), about 25% (w/w) to about 30% (w/w), or about 30% (w/w) to about 35% (w/w).

In embodiments, a layer of a coating comprises Cr in a concentration ranging from about 5% (w/w) to about 99% (w/w). In some embodiments, a layer of a coating includes Cr in a concentration greater than about 5% (w/w), about 10% (w/w), about 15% (w/w), about 20% (w/w), about 25% (w/w), about 30% (w/w), about 35% (w/w), about 40% (w/w), about 45% (w/w), about 50% (w/w), about 55% (w/w), about 60% (w/w), about 65% (w/w), about 70% (w/w), about 75% (w/w), about 80% (w/w), about 85% (w/w), about 90% (w/w), about 92% (w/w), about 93% (w/w), about 94% (w/w), about 95% (w/w), about 96% (w/w), about 97% (w/w), about 98% (w/w), or about 99% (w/w). In some embodiments, a layer of a coating includes Cr in a concentration less than about 5% (w/w), about 10% (w/w), about 15% (w/w), about 20% (w/w), about 25% (w/w), about 30% (w/w), about 35% (w/w), about 40% (w/w), about 45% (w/w), about 50% (w/w), about 55% (w/w), about 60% (w/w), about 65% (w/w), about 70% (w/w), about 75% (w/w), about 80% (w/w), about 85% (w/w), about 90% (w/w), about 92% (w/w), about 93% (w/w), about 94% (w/w), about 95% (w/w), about 96% (w/w), about 97% (w/w), about 98% (w/w), or about 99% (w/w).

In embodiments, a layer of a coating comprises Cr in a concentration ranging from about 5% (w/w) to about 35% (w/w), a layer of nanolaminate coating comprises Ni in a concentration of greater than about 90% (w/w), or both. In further embodiments, a layer of a coating comprises Ni in a concentration ranging from about 20% (w/w) to about 50% (w/w), Cr in a concentration ranging from about 20% (w/w) to about 35% (w/w), and Mo in a concentration great than about 1.5% (w/w). In some embodiments, a layer of a coating comprises Cr in a concentration greater than about 7% (w/w), Mo in a concentration ranging from about 5% (w/w) to about 30% (w/w), W in a concentration less than about 3% (w/w), Fe in a concentration ranging from about 1.5% (w/w) to about 15% (w/w), Si in a concentration less than 1% (w/w), Mn in a concentration less than 3% (w/w), and a balance of Ni.

In embodiments, a layer of a coating comprises Ni in a concentration ranging from about 40% (w/w) to about 70% (w/w) and W in a concentration ranging from about 20% (w/w) to about 60% (w/w). In some such embodiments, the layer of the coating may also comprise Mo in a concentration of up to about 40% (w/w).

In embodiments, a layer of a coating comprises Ni in a concentration ranging from about 50% (w/w) to about 70% (w/w) and W in a concentration ranging from about 30% (w/w) to about 50% (w/w). In some such embodiments, the layer of the coating may also comprise Mo in a concentration of up to about 30% (w/w).

In embodiments, a layer of a coating comprises Ni in a concentration of at least about 50% (w/w), and W and Mo in a collective concentration of up to about 50% (w/w). In embodiments, a layer of a coating comprises Ni in a concentration of at least about 60% (w/w), and W and Mo in a collective concentration of up to about 40% (w/w). In particular embodiments, a layer of a coating comprises Ni in a concentration of about 60% (w/w), and W and Mo in a collective concentration of about 40% (w/w). In particular embodiments, a layer of a coating comprises Ni in a concentration of about 60% (w/w), and W in a concentration of about 40% (w/w). In embodiments, each layer or type of layer comprises a fine-grained or ultrafine-grained metal or metal alloy having an average grain size ranging from about 1 nm to about 5,000 nm, based on a measurement of grain size in micrographs. In some embodiments, the average grain size ranges from about, 1 nm to about 20 nm, from about 1 nm to about 100 nm, from about 5 nm to about 50 nm, from about 5 nm to about 100 nm, from about 5 nm to about 200 nm, from about 10 nm to about 100 nm, from about 10 nm to about 200 nm, from about 20 nm to about 200 nm, from about 20 nm to about 250 nm, from about 20 nm to about 500 nm, from about 50 nm to about 250 nm, from about 50 nm to about 500 nm, from about 100 nm to about 500 nm, from about 200 nm to about 1,000 nm, from about 500 nm to about 2,000 nm, or from about 1,000 nm to about 5,000 nm. The fine-grained metal or metal alloy may have a high degree of twinning between metal grains, and remains ductile while having increased hardness, tensile strength, or corrosion resistance relative to an electrodeposited metal or alloy of a same composition with a grain size that is greater than about 5,000 nm. In some embodiments, the fine-grained metal or metal alloy have a high degree of twinning between metal grains, and remains ductile while having increased hardness, tensile strength, or corrosion resistance relative to an electrodeposited metal or alloy of a same composition with a grain size that ranged from about 5,000 nm to about 20,000 nm. In further embodiments, the fine-grained metal or metal alloy have a high degree of twinning between metal grains, and remains ductile while having increased hardness, tensile strength, or corrosion resistance relative to an electrodeposited metal or alloy of a same composition with a grain size that is greater than about 20,000 nm.

In some embodiments, a first layer and a second layer of a coating comprise a first alloy and a second alloy, respectively, which comprise the same first and second metals. In such embodiments, a difference between a concentration of a first metal in a first alloy and a first metal in a second alloy may be no more than 50%. In some embodiments, a difference between a concentration of a first metal in a first alloy and a first metal in a second alloy may be no more than about 30%. In such embodiments, a difference between a concentration of a first metal in a first alloy and a first metal in a second alloy may be no more than about 20%. In such embodiments, a difference between a concentration of a first metal in a first alloy and a first metal in a second alloy may be no more than about 10%. In some embodiments, a difference between a concentration of a first metal in a first alloy and a first metal in a second alloy is at least than about 1%. In some embodiments, a difference between a concentration of a first metal in a first alloy and a first metal in a second alloy is at least than about 2%. In some embodiments, a difference between a concentration of a first metal in a first alloy and a first metal in a second alloy is at least than about 5%. In some embodiments, a difference between a concentration of a first metal in a first alloy and a first metal in a second alloy is at least than about 10%.

Each layer or type of layer has a thickness in a range selected independently from about 5 nm to about 25,000 nm. In embodiments, each layer or type of layer has a thickness ranging from about 150 nm to about 20,000 nm. In some embodiments, a first layer has a thickness at one or more locations on the plunger core independently ranging from about 150 nanometers (nm) to about 20,000 nm, and a second layer has a thickness at one or more locations on the plunger core independently ranging from about 150 nm to about 20,000 nm. In further embodiments, a third metallic layer has a thickness at one or more locations on the plunger core ranging from about 150 nm to about 20,000 nm. In some embodiments, a laminate coating is a nanolaminate coating.

In embodiments, each layer or type of layer has a thickness in a range selected independently from about 5 nm to about 10,000 nm, from about 50 nm to about 15,000 nm, or from about 1,000 nm to about 20,000 nm.

In embodiments, each layer or type of layer has a thickness in a range selected independently from about 50 nm to about 2,000 nm. In embodiments, each layer or type of layer has a thickness in a range selected independently from about 500 nm to about 3,000 nm, from about 1,000 nm to about 4,000 nm, or from about 1,500 nm to about 5,000 nm. In embodiments, each layer or type of layer has a thickness in a range selected independently from about 50 nm to about 1,000 nm, from about 500 nm to about 1,500 nm, from about 1,000 nm to about 2,000 nm, or from about 1,500 nm to about 2,500 nm.

In embodiments, each layer or type of layer has a thickness in a range selected independently from about 2 nm to about 750 nm. In embodiments, each layer or type of layer has a thickness in a range selected independently from about 2 nm to about 500 nm. In embodiments, each layer or type of layer has a thickness in a range selected independently from about 2 nm to about 250 nm. In embodiments, each layer or type of layer has a thickness in a range selected independently from about 2 nm to about 200 nm.

In further embodiments, each layer or type of layer has a thickness in a range selected independently from about 5 nm to about 100 nm, from about 50 nm to about 150 nm, from about 100 nm to about 200 nm, or from about 150 nm to about 250 nm. In further embodiments, each layer or type of layer has a thickness in a range selected independently from about 5 nm to about 25 nm, from about 10 nm to about 30 nm, from about 30 nm to about 60 nm, from about 40 nm to about 80 nm, from about 75 nm to about 100 nm, from about 100 nm to about 120 nm, from about 120 nm to about 140 nm, from about 140 nm to about 180 nm, from about 180 nm to about 200 nm, from about 200 nm to about 225 nm, from about 200 nm to about 250 nm, from about 220 nm to about 250 nm, or from about 150 nm to about 250 nm.

In embodiments, a coating has a substantially uniform thickness at two or more locations. In some embodiments, a coating has a substantially uniform thickness at three or more locations. In some embodiments, a coating has a substantially uniform thickness at four or more locations. In some embodiments, a coating has a substantially uniform thickness at five or more locations. In some embodiments, a coating has a substantially uniform thickness at six or more locations.

An interface between individual layers may be discrete or diffuse. An interface between the neighboring layers is considered to be "discrete" if the composition shifts between a first layer and a second layer over a distance that is less than about 20% of a thickness of the thinner of the two layers. In embodiments, an interface between neighboring layers is considered to be discrete if the composition shifts between a first layer and a second layer over a distance that is less than about 15% of a thickness of the thinner of the layers. In some embodiments, an interface between neighboring layers is considered to be discrete if the composition shifts between a first layer and a second layer over a distance that is less than about 10% of a thickness of the thinner of the layers. In some embodiments, an interface between neighboring layers is considered to be discrete if the composition shifts between a first layer and a second layer over a distance that is less than about 8% of a thickness of the thinner of the layers. In some embodiments, an interface between neighboring layers is considered to be discrete if the composition shifts between a first layer and a second layer over a distance that is less than about 5% of a thickness of the thinner of the layers. In some embodiments, an interface between neighboring layers is considered to be discrete if the composition shifts between a first layer and a second layer over a distance that is less than about 4% of a thickness of the thinner of the layers. In some embodiments, an interface between neighboring layers is considered to be discrete if the composition shifts between a first layer and a second layer over a distance that is less than about 2% of a thickness of the thinner of the layers.

In embodiments, an interface is "diffuse" if the composition shift between a first layer and a second layer occurs over more than about 20% of the thickness of a thinner of the two layers. In embodiments, an interface between neighboring layers is considered to be diffuse if the composition shifts between a first layer and a second layer over a distance that is more than about 15% of a thickness of the thinner of the layers. In some embodiments, an interface between neighboring layers is considered to be diffuse if the composition shifts between a first layer and a second layer over a distance that is more than about 10% of a thickness of the thinner of the layers. In some embodiments, an interface between neighboring layers is considered to be diffuse if the composition shifts between a first layer and a second layer over a distance that is more than about 8% of a thickness of the thinner of the layers. In some embodiments, an interface between neighboring layers is considered to be diffuse if the composition shifts between a first layer and a second layer over a distance that is more than about 5% of a thickness of the thinner of the layers. In some embodiments, an interface between neighboring layers is considered to be diffuse if the composition shifts between a first layer and a second layer over a distance that is more than about 4% of a thickness of the thinner of the layers. In some embodiments, an interface between neighboring layers is considered to be diffuse if the composition shifts between a first layer and a second layer over a distance that is more than about 2% of a thickness of the thinner of the layers. In embodiments, a diffuse interface has a composition shift between a first layer and a second layer over a thickness in a range of about 0.5 nm to about 5 nm. In some embodiments, a diffuse interface has a thickness in a range of about 0.5 nm to about 3 nm. In some embodiments, a diffuse interface has a thickness in a range of about 1 nm to about 4 nm. In some embodiments, a diffuse interface has a thickness in a range of about 2 nm to about 5 nm. In further embodiments, a diffuse interface has a thickness in a range of about 0.5 nm to about 1 nm, about 1 nm to about 2 nm, about 2 nm to 3 nm, from about 3 nm to about 4 nm, or from about 4 nm to about 5 nm.

An overall thickness of each coating present on different portions of a lift plunger may vary widely depending on an application of the coatings. In embodiments, a coating is substantially continuous over the entire lift plunger. In embodiments, a coating is continuous over the entire lift plunger. In some embodiments, a coating that is present on a particular portion of the lift plunger is uniform or substantially uniform in thickness. In certain embodiments, a coating has two or more thicknesses across a length of a portion of the lift plunger.

In embodiments, a coating has a thickness ranging from about 5 nm to about 5 cm. In some embodiments, a coating has a thickness ranging from about 1 μm to about 75 μm. In some embodiments, a coating has a thickness ranging from about 3 μm to about 50 μm. In some embodiments, a coating has a thickness ranging from about 5 μm to about 35 μm. In some embodiments, a coating has a thickness ranging from about 5 nm to about 200 nm, from about 5 nm to about 25 nm, from about 10 nm to about 30 nm, from about 30 nm to about 60 nm, from about 40 nm to about 80 nm, from about 75 nm to about 100 nm, from about 100 nm to about 120 nm, from about 120 nm to about 140 nm, from about 140 nm to about 180 nm, from about 180 nm to about 200 nm, from about 200 to about 250 nm, from about 1 μm to about 5 centimeters (cm), from about 1 μm to about 50 μm, from about 50 μm to about 100 μm, from about 100 μm to about 200 μm, from about 200 μm to about 500 μm, from about 500 μm to about 800 μm, from about 800 μm to about 1.2 millimeters (mm), from about 500 μm to about 1 mm, from about 1 mm to about 1.5 mm, from about 1.2 mm to about 2 mm, from about 1.8 mm to about 2.5 mm, from about 2 mm to about 3 mm, from about 2.5 mm to about 5 mm, from about 1 mm to about 5 mm, from about 5 mm to about 1 cm, from about 1 cm to about 2 cm, or from about 2 cm to about 5 cm.

In particular embodiments, a coating has a thickness ranging from about 5 μm to about 3,500 μm. In further embodiments, a coating has a thickness in a range of about 25 μm to about 2,250 μm, from about 125 μm to about 2,050 μm, from about 125 μm to about 1,750 μm, from about 200 μm to about 1,500 μm, from about 250 μm to about 1,250 μm, from about 250 μm to about 1,000 μm, from about 250 μm to about 750 μm, from about 500 μm to about 1,000 μm. In yet further embodiments, a coating has a thickness in a range selected independently from about 25 μm to about 125 μm, from about 50 μm to about 150 μm, about 125 μm to about 250 μm, about 250 μm to about 375 μm, about 375 μm to about 500 μm, about 500 μm to about 750 μm, about 750 μm to about 1,000 μm, about 1,000 μm to about 1,250 μm, about 1,250 μm to about 1,500 μm, about 1,500 μm to about 1,750 μm, about 1,750 μm to about 2,000 μm, about 2,000 μm to about 2,250 μm, about 2,250 μm to about 2,500 μm, about 2,500 μm to about 2,750 μm, and about 2,750 μm to about 3,000 μm.

Coatings as described herein may include a large number of layers. Coatings may include at least two layers, at least three layers, at least four layers, at least six layers, at least eight layers, at least ten layers, at least 20 layers, at least 30 layers, at least 50 layers, at least 100 layers, at least 200 layers, at least 500 layers, at least 1,000 layers, at least 1,500 layers, at least 2,000 layers, at least 2,500 layers, at least 3,000 layers, at least 3,500 layers, at least 4,000 layers, at least 5,000 layers, at least 6,000 layers, at least 7,000 layers, or at least 8,000 layers. In some embodiments, a coating includes at least 50 layers. In some embodiments, a coating includes at least 100 layers. In embodiments, a number of layers in a coating is in a range from about 50 layers to about 8,000 layers. In some embodiments, the number of layers in a coating is in the range of about 100 layers to about 8,000 layers. In further embodiments, the number of layers in a coating is in the range of about 50 layers to about 100 layers, from about 100 layers to about 1,000 layers, from about 1,000 layers to about 2,000 layers, from about 2,000 layers to about 4,000 layers, from about 4,000 layers to about 8,000 layers, or greater than about 8,000 layers.

Embodiments of the present disclosure include a coated lift plunger comprising a plunger core that is substantially symmetrical about a longitudinal axis and has a first diameter and a plunger body; and a laminate coating having a thickness, the laminate coating comprising a first and a second layer, the first layer having a first composition and a first nanostructure, and the second layer having a second composition and a second nanostructure.

Generally, in order to apply a coating onto a plunger core made of polymeric material (e.g., a plastic), a strike layer is first coated onto the polymeric material of the plunger core. In embodiments, a strike layer is sufficient to render a surface of a non-conductive or semi-conductive plunger core sufficiently conductive to permit electrodeposition of at least one layer onto the plunger core. A strike layer is generally a very thin layer that is deposited on a plunger core using a high current density and an electrolyte solution with a low ion concentration. In embodiments, autocatalytic plating (i.e., an electrolyte solution contains reducing agents ready to react with the polymeric material (e.g., a plastic), and the catalyst is the metal to be deposited on the surface of a plunger core) is used.

In embodiments, the strike layer utilized is Ag, Al, Au, B, Be, C, Co, Cr, Cu, Fe, Hg, In, Ir, Mg, Mn, Mo, Nb, Nd, Ni, P, Pd, Pt, Re, Rh, Sb, Si, Sn, Pb, Ta, Ti, W, V, Zn, Zr, or alloys thereof.

Specific properties conferred by coatings of the present disclosure provide for improved hardness, durability, and corrosion and heat resistance properties. Accordingly, in embodiments, a plunger core is chosen to be coated in order to be used in highly corrosive service environments.

In embodiments, a coated lift plunger has a Vickers microhardness of at least about 75 without heat treatment. In some embodiments, a coated lift plunger has a Vickers microhardness of at least about 100, at least about 150, at least about 200, at least about 500, or at least about 1200 without heat treatment.

In some embodiments, a coated lift plunger has a Vickers microhardness as measured by ASTM E384-11e1 ranging from about 75 to about 200, from about 100 to about 300, from about 300 to about 600, from about 550 to about 750, from about 600 to about 900, from about 750 to about 1000, from about 1000 to about 1200, without heat treatment. In further embodiments, a coated lift plunger has a Vickers microhardness as measured by ASTM E384-11e1 ranging from about 100 to about 150, from about 150 to about 250, from about 250 to about 350, from about 350 to about 550, from about 550 to about 600, from about 600 to about 650, from about 650 to about 700, from about 700 to about 750, from about 750 to about 800, from about 800 to about 850, from about 850 to about 900, from about 900 to about 1000, from about 1000 to about 1100, from about 1100 to about 1200 without heat treatment.

In some embodiments, a coated lift plunger is resistant to $H_2S$-induced sulfide stress cracking under sour service environments having a $H_2S$ partial pressure greater than 0.05 psi (0.3 kPa). In further embodiments, a coating does not lose more than 25% of its mass when subjected to National Association of Corrosion Engineers (NACE) TM0193-2016 standardized testing with 15% HCl at 75 degrees Celsius for 6 hours. In additional embodiments a coated lift plunger is resistant to cracking of the nanolaminate coating when exposed to autoclave environments per NACE standard TM0175 or American Society for Testing and Materials (ASTM) E399 standardized testing for high sour gas conditions. In still further embodiments, a coated lift plunger is resistance to pitting wherein individual pits are not deeper than 10% of the nanolaminate coating when tested according to ASTM G48 testing standards. In yet further embodiments, a coated lift plunger is resistance to pitting wherein individual pits are not deeper than 10% of the nanolaminate coating in a service environment with a pH ranging from about 3 to about 7. In additional embodiments, a coated lift plunger is resistance to pitting wherein individual pits are not deeper than 10% of the nanolaminate coating in a service environment with a pH ranging from about 7 to about 6.5, about 6.5 to about 6, about 6 to about 5.5, about 5.5 to about 5, about 5 to about 4.5, about 4.5 to about 4, about 4 to about 3.5, or about 3.5 to about 3.

In embodiments, a coated lift plunger is resistant to cracking when subjected to tensile load of 80% of the yield strength of the coated lift plunger in sulfide stress cracking environment for 720 hours according to NACE TM0177 standardized testing in a service environment with a pH ranging from about 3 to about 7. In certain embodiments, a tub coated lift plunger is resistant to cracking when subjected to tensile load of 80% of the yield strength of the coated lift plunger in sulfide stress cracking environment for 720 hours according to NACE TM0177 standardized testing in a service environment with a pH ranging from about 7 to about 6.5, about 6.5 to about 6, about 6 to about 5.5, about 5.5 to about 5, about 5 to about 4.5, about 4.5 to about 4, about 4 to about 3.5, or about 3.5 to about 3. Coated lift plunger of the present disclosure include those produced by any method described herein.

In embodiments, a lift plunger of the present disclosure further comprises an impact plate. An impact plate may comprise Ti, steel, Al, Cu, carbon-steel, Fe, stainless steel, or a combination thereof.

In particular embodiments, a coated lift plunger is a ball and sleeve plunger, and a sleeve, a ball, or both are coated with a laminate coating.

Coated lift plungers of the present disclosure include those produced by any method described herein.

Methods for Depositing Coatings on Lift Plungers

Figure 4:
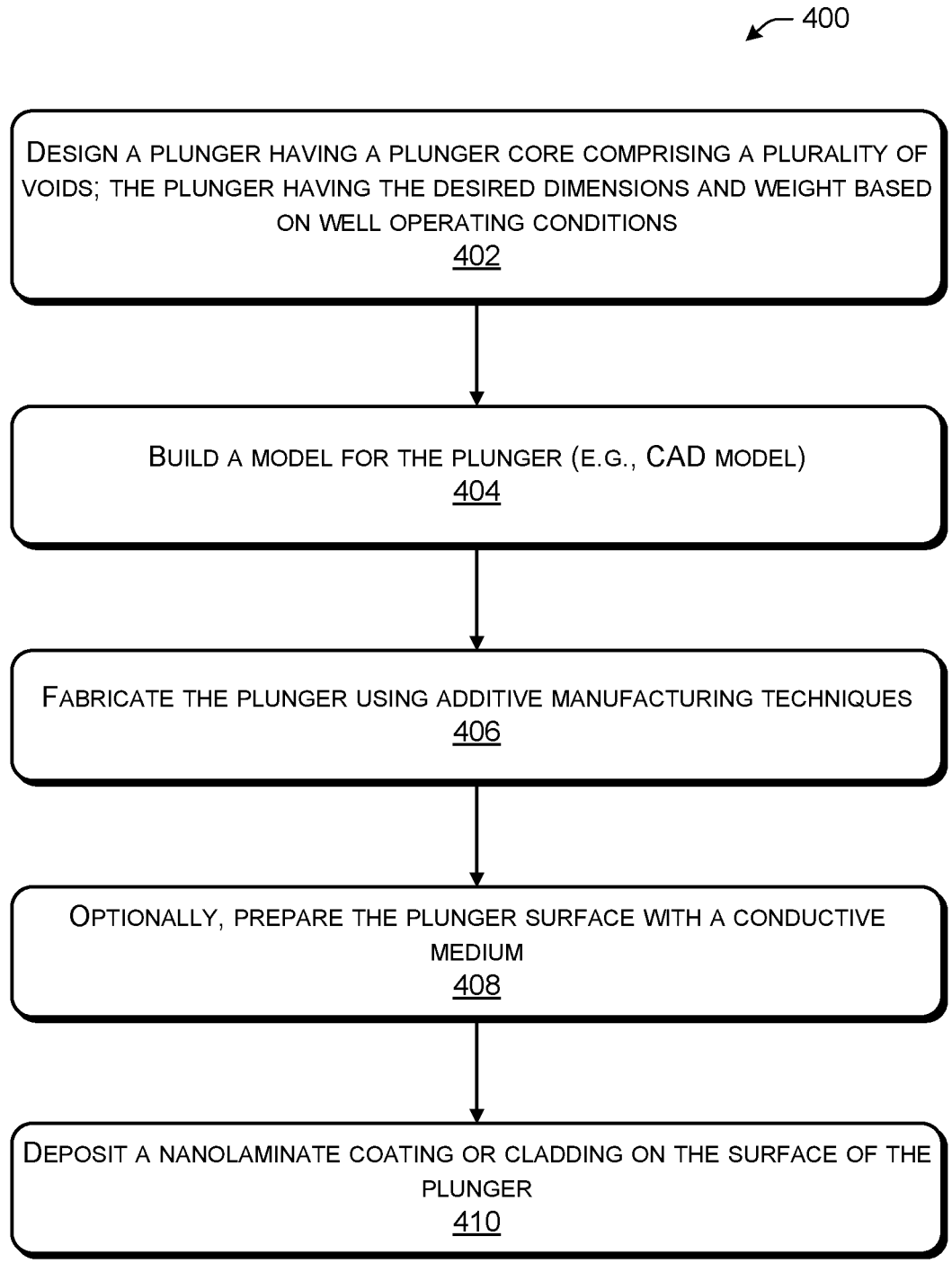
FIG. 4 shows a flow chart of an illustrative method of the disclosure.
Figure 5:
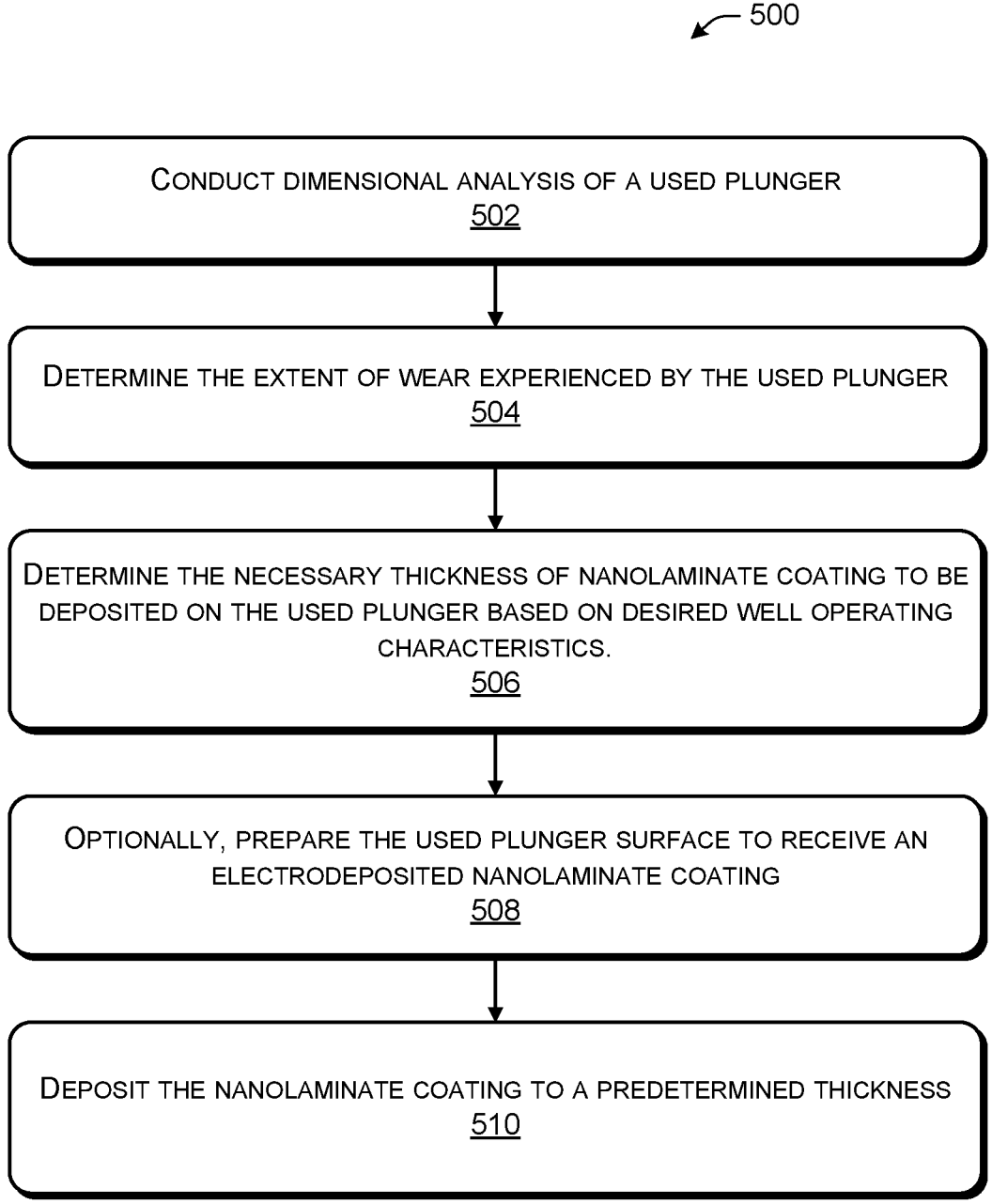
FIG. 5 shows a flow chart of an illustrative method of the disclosure.

Method for electrodepositing coatings on a plunger core to produce a coated lift plunger are provided herein. Accordingly, methods of the present disclosure generally produce a coated lift plunger as described herein. In embodiments, a coated lift plunger is a conventional, continuous flow, shifting ring, pad, brush, solid-ring, sleeve and ball, or snake plunger. A flow chart showing an illustrative method is shown in FIG. 4.

Methods of the present disclosure comprise applying a laminate coating on a surface of a plunger core that is substantially symmetrical about a longitudinal axis and has a first diameter and a plunger body, thereby forming the coated lift plunger. In some embodiments, methods of the present disclosure further comprise forming the plunger core from a polymeric material (e.g., a plastic).

A plunger core employed in embodiments of the present disclosure may be any suitable plunger core. In embodiments, a plunger core is made of a metal or metal alloy. In some embodiments, a plunger core comprises Ti, steel, Al, Cu, carbon-steel, Fe, stainless steel, or a combination thereof. In some embodiments, a plunger core is made of a steel alloy. In certain embodiments, a steel alloy includes: C and Fe; C, Fe, and Mo; or C, Fe, Mo, and Co. In embodiments, a metal is formed into a plunger core using any suitable method. In embodiments, a plunger core of the present disclosure is formed by an additive manufacturing process. In some embodiments, a plunger core of the present disclosure is formed by a process comprising mechanically removing material, for example by cutting, machining, grinding, polishing, or a combination thereof.

In embodiments, a plunger core of the present disclosure is formed of a polymeric material (e.g., a plastic). In embodiments, a plunger core comprises a thermoset or a thermoplastic material. In various embodiments, a plunger core comprises a plastic material. In some embodiments, a plunger core comprises one or more arylamides, acrylamides, PBI, polyetherimide, PEKK, PEEK, polyamide, polyimide, polyamide-imides, PPO, PS, PPO and PS, PPA, PVA, ABS, PC, PLA, PC/ABS, cellulose fiber, PPSU, thermosets, PBI-PEEK, urea, epoxies, cyanate esters, or polyurethanes.

In various embodiments, a polymeric material (e.g., a plastic) includes an additive, such as carbon black (e.g., from about 1% to about 5% (w/w)), graphene (e.g., PLA-Graphene printing filament), graphite, carbon nanotubes, carbon nanofibers, or graphite fibers. Additionally, a polymeric material (e.g., a plastic) of the present disclosure may further include a metal (e.g., Ag, Al, Au, B, Be, C, Co, Cr, Cu, Fe, Hg, In, Ir, Mg, Mn, Mo, Nb, Nd, Ni, P, Pd, Pt, Re, Rh, Sb, Si, Sn, Pb, Ta, Ti, W, V, Zn, Zr, or alloys thereof). In such embodiments, a metal added to a polymeric material (e.g., a plastic) may be included in a concentration ranging from about 1% to about 20% (w/w).

A polymeric material (e.g., a plastic) may be formed into a plunger core using any suitable method, such as, for example, casting, injection molding, blow molding, extrusion molding, cutting, machining, milling, grinding, sanding, polishing, abrasive blasting, 3D-printing, SLS, SLM, FDM, SLA, CLIP, cutting woven fabric, forming woven fabric, cutting non-woven fabric, forming non-woven fabric, cutting foam sheets, or forming of foam sheets. A method of formation used may confer different properties on the plunger core.

In embodiments, forming the polymeric material (e.g., a plastic) comprises casting, cutting, milling, grinding, sanding, polishing, abrasive blasting, 3D-printing, SLS, SLM, FDM, SLA, CLIP, cutting woven fabric, forming woven fabric, cutting non-woven fabric, forming non-woven fabric, cutting foam sheets, or forming of foam sheets. In some embodiments, forming the polymeric material (e.g., a plastic) comprises cutting, milling, 3D-printing, FDM, SLA, CLIP, cutting woven fabric, forming woven fabric, cutting non-woven fabric, forming non-woven fabric, cutting foam sheets, or forming of foam sheets.

In embodiments, a plunger core of the present disclosure is formed by an additive manufacturing process. In such embodiments, the additive manufacturing process may be the additive manufacturing process comprises 3D-printing, SLS, SLM, FDM, SLA, or CLIP. In embodiments, a plunger core can be formed by direct digital manufacturing.

In embodiments, forming the polymeric material (e.g., a plastic) comprises a resin infusing or injection molding a thermoset or a thermoplastic material.

In other embodiments, a plunger core is formed by casting, rotational molding, injection molding, blow molding, or extrusion molding. In further embodiments, a plunger core is formed by mechanically removing material. Material may be mechanically removed, for example, by cutting, milling, grinding, sanding, polishing, or abrasive blasting.

In additional embodiments, a plunger core is formed by cutting or shaping of the woven fabric, the non-woven fabric, or the foam sheets. In such embodiments, the woven fabric, non-woven fabric, or foam sheets may comprise the polymeric material. In some embodiments, the shaping of woven fabric, non-woven fabric, or foam sheets comprises forming and layering at least two layers of the woven fabric, the non-woven fabric, or the foam sheets.

A plunger core may further comprise a light-weighting feature. Examples of light-weighting features include a plurality of voids within the plunger core; a microcellular or nanocellular foam; a region devoid of material; or truss-like structures. A density of a light-weighting feature may vary in at least one direction of a plunger core. In embodiments, the light-weighting feature is a porous section.

In embodiments, a plurality of voids has different volumes (e.g., two, three, four, five, ten, twenty, or more volumes). In further embodiments, a plurality of voids per unit volume of the plunger core varies in at least one dimension of the plunger core. In some embodiments, a light-weighting feature comprises a plurality of struts that define voids within a plunger body.

A plunger body may have a void volume of at least 1%. In some embodiments, a plunger body may have a void volume of at least 5%. In some embodiments, a plunger body may have a void volume of at least 10%. In some embodiments, a plunger body may have a void volume of at least 25%. In some embodiments, a plunger body may have a void volume of at least 50%.

In embodiments, a plunger body has a void volume ranging from about 1% to about 99%. In embodiments, a plunger body may have a void volume ranging from about 20% to about 50%, from about 30% to about 60%, from about 40% to about 70%, or from about 50% to about 80%. In embodiments, a plunger body may have a void volume ranging from about 25% to about 75%. In some embodiments, a plunger body may have a void volume ranging from about 1% to about 5%, from about 5% to about 10%, from about 10% to about 15%, from about 15% to about 20%, from about 20% to from about 25%, from about 25% to about 30%, from about 30% to about 35%, from about 35% to about 40%, from about 40% to about 45%, from about 45% to about 50%, from about 50% to about 55%, from about 55% to about 60%, from about 60% to about 65%, from about 65% to about 70%, from about 70% to about 75%, from about 75% to about 80%, from about 80% to about 85%, from about 85% to about 90%, from about 90% to about 95%, and from about 95% to about 99%.

In embodiments a light-weighting feature is a microcellular or nanocellular foam. In some embodiments, microcellular foam is a form of manufactured plastic that contains bubbles with a size ranging from about 0.1 µm to about 100 µm. In some embodiments, microcellular foam contains bubbles of less than 50 µm in size. In some embodiments, nanocellular foam is a form of manufactured plastic that contains bubbles with a size ranging from about 20 nm to about 100 nm.

In some embodiments, a light-weighting feature is a hollow core centered about a longitudinal axis and extending through a portion of a plunger body. In further embodiments, a light-weighting feature is a plurality of voids within a plunger body. In such embodiments, a number of voids per unit volume may vary along a longitudinal axis or along a first diameter of the plunger body. In additional embodiments, a density of a plurality of voids is higher between the top end and the bottom end. In further embodiments, a density of the plurality of voids is about zero voids per unit volume at the top end and the bottom end. In some embodiments, individual ones of the plurality of voids is substantially uniform in dimension, and a plurality of voids vary in a number of voids per unit volume throughout a volume of a plunger body.

In embodiments, truss-like structures form a network with a density that varies in one or more dimensions of a plunger core. In other embodiments, truss-like structures form a network with a density that does not vary in one or more dimensions of a plunger core.

A light-weighting feature may be a result of an additive manufacturing process.

In some embodiments, a light-weighting feature is chosen based on a property of a petroleum well. In some embodiments, length or a weight of a plunger core is chosen based at least on a property of a petroleum well. Examples of properties of a petroleum well include liquid to gas ratio, casing pressure, tubing pressure, line pressure, plunger fall velocity, or well depth.

In further embodiments, a plunger core comprises a weighted section that is denser than any other part of a plunger core. A weighted section may increase a weight of a plunger core when compared to a plunger core that has the same volume without a weighted section. In embodiments, a weighted section comprises a metal. In such embodiments, a weighted section may comprise Ti, steel, Al, Cu, carbon-steel, Fe, or stainless steel. In some embodiments, a weighted section includes a magnetic material. In still further embodiments, a magnetic material is used for plunger removal from a petroleum well, capturing the plunger at a top position or bottom position of the petroleum well, or both.

In embodiments, a recessed cavity 616 is formed in a top surface of a lift plunger, as shown in FIG. 6A. In such embodiments, a recessed cavity may be used to retrieve a lift plunger from a petroleum well, dislodge a lift plunger that has been wedged or jammed, or both. In order to prevent sand, debris, liquids, and the like from filling a recessed cavity, a hole 618 may be present that extends through a side wall of the recessed cavity, as shown in FIG. 6B. In some embodiments, the hole is located at or near the deepest portion of the recessed cavity. In embodiments, a recessed cavity extends to a depth of about 5% of the total length of a lift plunger. In some embodiments, a recessed cavity extends to a depth of about 10% of the total length of a lift plunger. In some embodiments, a recessed cavity extends to a depth of about 15% of the total length of a lift plunger. In some embodiments, a recessed cavity extends to a depth of about 20% of the total length of a lift plunger. In some embodiments, a recessed cavity extends to a depth of about 25% of the total length of a lift plunger.

Electrodepositing at least one electrodepositable species onto a plunger core may comprise contacting a plunger core with an electrolyte solution by submerging a plunger core in an electrolyte bath, partially submerging a plunger core in an electrolyte bath, or applying an electrolyte solution using other suitable means.

An electrolyte solution includes a liquid and one or more electrodepositable species, such as Ag, Al, Au, B, Be, C, Co, Cr, Cu, Fe, Hg, In, Ir, Mg, Mn, Mo, Nb, Nd, Ni, P, Pd, Pt, Re, Rh, Sb, Si, Sn, Pb, Ta, Ti, W, V, Zn, and Zr. In some embodiments, the liquid is an ionic liquid. In some embodiments, an electrolyte solution includes one or more additives. Examples of additives include brightening agents, leveling agents, surfactants, and the like.

A current density applied to a portion of a plunger core may be reduced in order to achieve a nanolaminate coating that is thinner than a nanolaminate coating over other portions of the plunger core. A current density may be reduced by positioning shielding or thieving adjacent to a portion of a plunger core.

In order to electrodeposit an electrodepositable species onto a plunger core, a voltage or a current is applied to a plunger core or a conductive article that is in contact with a plunger core. In some embodiments, a voltage or current applied varies over time. Varying a voltage or current applied to a plunger core may comprise changing a voltage or current from a first voltage or current to a voltage or current for a period of time, and changing a second voltage or current to a first voltage or current for a period of time. In some embodiments, a first or a second voltage or current is changed to a third voltage or current for a period of time, and a third voltage or current is changed to a first voltage or current, a second voltage or current, or a fourth voltage or current. In some embodiments, methods further comprise applying a third electric current to the electrodeposition bath, thereby causing a third layer to be electrodeposited onto the plunger core. In some such embodiments, the third metallic layer comprises a first metal or a second metal.

A plunger core may undergo pre-processing steps. For example, a plunger core may be washed, etched, etc. before receiving an electrodeposited coating. Such pre-processing steps may improve adhesion of a nanolaminate coating, among other benefits.

In embodiments, a strike layer is first coated onto the polymeric material (e.g., a plastic). In embodiments, a strike layer is sufficient to render a surface of a non-conductive or semi-conductive plunger core sufficiently conductive to permit electrodeposition of at least one layer onto the plunger core. A strike layer is generally a very thin layer that is deposited on a plunger core using a high current density and an electrolyte solution with a low ion concentration. In embodiments, the strike layer comprises Ag, Al, Au, B, Be, Co, Cr, Cu, Fe, Hg, In, Mg, Mn, Mo, Nb, Nd, Ni, Pd, Pt, Re, Rh, Sb, Sn, Mn, Pb, Ta, Ti, W, V, Zn, Zr, or alloys thereof.

In additional embodiments, methods of the disclosure further comprise activating the surface of the plunger core by chemical etch, in-situ etch, mechanical abrasion, or removal of material. In some embodiments, activating the surface comprises plasma etching, mechanical etching, sanding, roughening, or grit blasting.

Accordingly, in some embodiments, methods of the present disclosure include preparing, prior to applying the laminate coating, a surface of the plunger core to increase a surface energy of the surface of the plunger core; contacting at least a portion of the plunger core with an electrodeposition bath comprising electrodepositable ions; applying a first electric current for a first amount of time to the electrodeposition bath, thereby causing a first layer to be electrodeposited onto the plunger core, the first layer comprising at least a first metal and a second metal; and applying a second electric current for a second amount of time to the electrodeposition bath, thereby causing a second layer to be electrodeposited onto the plunger core, the second layer comprising the first metal or the second metal.

As noted above, methods of the present disclosure further comprise coating a plunger core. Coatings of the present disclosure include a plurality of layers that repeat in a pattern. In some embodiments, a plurality of layers is made up of two types of layers that alternate. In such embodiments, nanolaminate coatings include a plurality of alternating first and second layers. Alternatively, one or more additional layers may be present in a coating between any first and second layer. In other embodiments, a plurality of layers is made up of more than two layers that repeat in any suitable pattern (e.g., A-B-C-A-B-C-A-B-C or A-B-C-B-A-B-C).

In embodiments, a coating comprises at least two layers. Each layer has a composition and a nanostructure. Composition refers to factors such as which electrodepositable species are included in the layer, and the concentration thereof. Nanostructure refers to factors such as an average grain size, a grain boundary geometry, a crystal orientation, and a defect density. A composition or a nanostructure differs between adjacent layers. In embodiments, adjacent layers differ in composition, grain size, grain structure (e.g., morphology or microstructure), or a combination thereof.

In some embodiments, a coating comprises a plurality of first layers and a plurality of second layers. In some embodiments a coating comprises two, three, four, or five layer types. In such embodiments, each type of layer may have a composition and a nanostructure. A composition or a nanostructure differs between each layer type. In embodiments, different types of layers differ in composition, grain size, grain structure (e.g., morphology or microstructure), or a combination thereof. In embodiments, a second layer differs from the first layer in composition, grain size, grain structure, or a combination thereof. In further embodiments, a third layer differs from a first layer or a second layer in composition, grain size, grain structure, or a combination thereof.

Each layer or type of layer of a coating may be made of a metal, a metal alloy, or a ceramic. In some embodiments, methods of the present disclosure produce coatings comprising at least one of Ag, Al, Au, B, Be, C, Co, Cr, Cu, Fe, Hg, In, Ir, Mg, Mn, Mo, Nb, Nd, Ni, P, Pd, Pt, Re, Rh, Sb, Si, Sn, Pb, Ta, Ti, W, V, Zn, and Zr in an amount of at least 0.01% (w/w). In embodiments, each of layer or type of layer of a coating includes at least one electrodepositable species independently selected from Ag, Al, Au, B, Be, C, Co, Cr, Cu, Fe, Hg, In, Ir, Mg, Mn, Mo, Nb, Nd, Ni, P, Pd, Pt, Re, Rh, Sb, Si, Sn, Pb, Ta, Ti, W, V, Zn, and Zr. In some embodiments, each layer or type of layer of a coating includes at least 0.01% (w/w) of Ag, Al, Au, B, Be, C, Co, Cr, Cu, Fe, Hg, In, Ir, Mg, Mn, Mo, Nb, Nd, Ni, P, Pd, Pt, Re, Rh, Sb, Si, Sn, Pb, Ta, Ti, W, V, Zn, or Zr. Each electrodepositable species is present in a layer or type of layer of a coating in a concentration of about 10%, about 5%, about 1%, about 0.1%, about 0.05%, about 0.01%, about 0.005%, or about 0.001% by weight.

In embodiments, a layer comprises chromium. In certain embodiments, a layer or type of layer of a coating is monocrystalline Co. In some embodiments, a layer of a coating comprises Al. In further embodiments, a layer of a coating comprises Ni or Cr. In particular embodiments, a layer of a coating comprises Ni, Fe, and Cr. In some embodiments, a layer of a coating comprises Ni, Fe, Cr, and Mo. In some embodiments, each layer or type of layer of a coating comprises two or more, three or more, four or more, or five or more different electrodepositable species. In some embodiments, one or more layers of a coating comprise an alloy of at least two electrodepositable species. In some embodiments, one or more layers of a coating comprise an alloy of at least three electrodepositable species.

Illustrative alloys that may be used in a layer or type of layer of a coating comprise Zn and Fe; Zn and Ni; Co and Ni; Ni, Co, and Mo; Ni and Fe; Ni and Cr; Cu and Zn; Cu and Sn; Ni, Co, and P; Ni, Co, W, and P; Ni, Co, and W; Ni and W; Ni, W, and P; Ni, Co, and B; Ni, Co, W, and B; or Ni, W, and B.

In embodiments, each of layer or type of layer comprises NiCr, NiFe, NiCo, NiCrCo, NiAl, NiCrAl, NiFeAl, NiCoAl, NiCrCoAl, NiMo, NiCrMo, NiFeMo, NiCoMo, NiCrCoMo, NiW, NiCrW, NiFeW, NiCoW, NiCrCoW, NiMoW, NiNb, NiCrNb, NiFeNb, NiCoNb, NiCrCoNb, NiTi, NiCrTi, NiFeTi, NiCoTi, NiCrCoTi, NiCrP, NiCrAl, NiCoP, NiCoAl, NiFeP, NiFeAl, NiCrSi, NiCrB, NiCoSi, NoCoB, NiFeSi, NiFeB, ZnCr, ZnFe, ZnCo, ZnNi, ZnCrP, ZnCrAl, ZnFeP, ZnFeAl, ZnCoP, ZnCoAl, ZnNiP, ZnNiAl, ZnCrSi, ZnCrB, ZnFeSi, ZnFeB, ZnCoSi, ZnCoB, ZnNiSi, ZnNiB, CoCr, CoFe, CoCrP, CoFeP, CoCrAl, CoFeAl, CoCrSi, CoFeSi, CoCrB, CoFeB, CoAl, CoW, CoCrW, CoFeW, CoTi, CoCrTi, CoFeTi, CoTa, CoCrTa, CoFeTa, CoC, CoCrC, CoFeC, FeCr, FeCrP, FeCrAl, FeCrSi, or FeCrB.

In embodiments, each layer or type of layer comprises Ni and W. In embodiments, each layer or type of layer comprises Ni and Mo. In embodiments, each layer or type of layer comprises Ni, Mo, and W.

In some embodiments, each layer comprises NiCr, NiCo, NiW, or NiCoP. In specific embodiments, an alloy used in a layer of a coating includes Ni and Fe; or Ni and Co. In still further embodiments, a layer of a coating comprises three or more, four or more, or five or more of Co, Cr, Mo, W, Fe, Si, Mn, and Ni.

In particular embodiments a first layer of a coating includes Ni in a concentration ranging from about 50% (w/w) to about 99% (w/w). In such embodiments, the first layer of the coatings may include Ni in a concentration greater than about 50% (w/w), about 55% (w/w), about 60% (w/w), about 65% (w/w), about 70% (w/w), about 75% (w/w), about 80% (w/w), about 85% (w/w), about 90% (w/w), about 92% (w/w), about 93% (w/w), about 94% (w/w), about 95% (w/w), about 96% (w/w), about 97% (w/w), about 98% (w/w), or about 99% (w/w). In some embodiments, a first layer of a coatings includes Ni in a concentration less than about 50% (w/w), about 55% (w/w), about 60% (w/w), about 65% (w/w), about 70% (w/w), about 75% (w/w), about 80% (w/w), about 85% (w/w), about 90% (w/w), about 92% (w/w), about 93% (w/w), about 94% (w/w), about 95% (w/w), about 96% (w/w), about 97% (w/w), about 98% (w/w), or about 99% (w/w).

In certain embodiments, a second layer of the coatings includes Co in a concentration ranging from about 5% (w/w) to about 35% (w/w). In such embodiments, the second layer includes Co in a concentration ranging from about 5% (w/w) to about 10% (w/w), about 10% (w/w) to about 15% (w/w), about 15% (w/w) to about 20% (w/w), about 20% (w/w) to about 25% (w/w), about 25% (w/w) to about 30% (w/w), or about 30% (w/w) to about 35% (w/w).

In embodiments, a layer of a coating comprises Cr in a concentration ranging from about 5% (w/w) to about 99% (w/w). In some embodiments, a layer of a coating includes Cr in a concentration greater than about 5% (w/w), about 10% (w/w), about 15% (w/w), about 20% (w/w), about 25% (w/w), about 30% (w/w), about 35% (w/w), about 40% (w/w), about 45% (w/w), about 50% (w/w), about 55% (w/w), about 60% (w/w), about 65% (w/w), about 70% (w/w), about 75% (w/w), about 80% (w/w), about 85% (w/w), about 90% (w/w), about 92% (w/w), about 93% (w/w), about 94% (w/w), about 95% (w/w), about 96% (w/w), about 97% (w/w), about 98% (w/w), or about 99% (w/w). In some embodiments, a layer of a coating includes Cr in a concentration less than about 5% (w/w), about 10% (w/w), about 15% (w/w), about 20% (w/w), about 25% (w/w), about 30% (w/w), about 35% (w/w), about 40% (w/w), about 45% (w/w), about 50% (w/w), about 55% (w/w), about 60% (w/w), about 65% (w/w), about 70% (w/w), about 75% (w/w), about 80% (w/w), about 85% (w/w), about 90% (w/w), about 92% (w/w), about 93%

(w/w), about 94% (w/w), about 95% (w/w), about 96% (w/w), about 97% (w/w), about 98% (w/w), or about 99% (w/w).

In embodiments, a layer of coating comprises Cr in a concentration ranging from about 5% (w/w) to about 35% (w/w), a layer of coating comprises Ni in a concentration of greater than about 90% (w/w), or both. In further embodiments, a layer of coating comprises Ni in a concentration ranging from about 20% (w/w) to about 50% (w/w), Cr in a concentration ranging from about 20% (w/w) to about 35% (w/w), and Mo in a concentration great than about 1.5% (w/w). In some embodiments, a layer of a coating comprises Cr in a concentration greater than about 7% (w/w), Mo in a concentration ranging from about 5% (w/w) to about 30% (w/w), W in a concentration less than about 3% (w/w), Fe in a concentration ranging from about 1.5% (w/w) to about 15% (w/w), Si in a concentration less than 1% (w/w), Mn in a concentration less than 3% (w/w), and a balance of Ni.

In embodiments, a layer of a coating comprises Ni in a concentration ranging from about 40% (w/w) to about 70% (w/w) and W in a concentration ranging from about 20% (w/w) to about 60% (w/w). In some such embodiments, the layer of the coating may also comprise Mo in a concentration of up to about 40% (w/w).

In embodiments, a layer of a coating comprises Ni in a concentration ranging from about 50% (w/w) to about 70% (w/w) and W in a concentration ranging from about 30% (w/w) to about 50% (w/w). In some such embodiments, the layer of the coating may also comprise Mo in a concentration of up to about 30% (w/w).

In embodiments, a layer of a coating comprises Ni in a concentration of at least about 50% (w/w), and W and Mo in a collective concentration of up to about 50% (w/w). In embodiments, a layer of a coating comprises Ni in a concentration of at least about 60% (w/w), and W and Mo in a collective concentration of up to about 40% (w/w). In particular embodiments, a layer of a coating comprises Ni in a concentration of about 60% (w/w), and W and Mo in a collective concentration of about 40% (w/w). In particular embodiments, a layer of a coating comprises Ni in a concentration of about 60% (w/w), and W in a concentration of about 40% (w/w).

In embodiments, each layer or type of layer comprises a fine-grained or ultrafine-grained metal or metal alloy having an average grain size ranging from about 1 nm to about 5,000 nm, based on a measurement of grain size in micrographs. In some embodiments, the average grain size ranges from about, 1 nm to about 20 nm, from about 1 nm to about 100 nm, from about 5 nm to about 50 nm, from about 5 nm to about 100 nm, from about 5 nm to about 200 nm, from about 10 nm to about 100 nm, from about 10 nm to about 200 nm, from about 20 nm to about 200 nm, from about 20 nm to about 250 nm, from about 20 nm to about 500 nm, from about 50 nm to about 250 nm, from about 50 nm to about 500 nm, from about 100 nm to about 500 nm, from about 200 nm to about 1,000 nm, from about 500 nm to about 2,000 nm, or from about 1,000 nm to about 5,000 nm.

A fine-grained metal or metal alloy may have a high degree of twinning between metal grains, and remains ductile while having increased hardness, tensile strength, or corrosion resistance relative to an electrodeposited metal or alloy of a same composition with a grain size that is greater than about 5,000 nm. In some embodiments, the fine-grained metal or metal alloy has a high degree of twinning between metal grains, and remains ductile while having increased hardness, tensile strength, or corrosion resistance relative to an electrodeposited metal or alloy of a same composition with a grain size that ranged from about 5,000 nm to about 20,000 nm. In further embodiments, the fine-grained metal or metal alloy has a high degree of twinning between metal grains, and remains ductile while having increased hardness, tensile strength, or corrosion resistance relative to an electrodeposited metal or alloy of a same composition with a grain size that is greater than about 20,000 nm.

In some embodiments, a first layer and a second layer of a coating comprise a first alloy and a second alloy, respectively, which comprise the same first and second metals. In such embodiments, a difference between a concentration of a first metal in a first alloy and a first metal in a second alloy may be no more than about 50%. In some embodiments, a difference between a concentration of a first metal in a first alloy and a first metal in a second alloy may be no more than about 30%. In such embodiments, a difference between a concentration of a first metal in a first alloy and a first metal in a second alloy may be no more than about 20%. In such embodiments, a difference between a concentration of a first metal in a first alloy and a first metal in a second alloy may be no more than about 10%. In some embodiments, a difference between a concentration of a first metal in a first alloy and a first metal in a second alloy is at least about 1%. In some embodiments, a difference between a concentration of a first metal in a first alloy and a first metal in a second alloy is at least than about 2%. In some embodiments, a difference between a concentration of a first metal in a first alloy and a first metal in a second alloy is at least than about 5%. In some embodiments, a difference between a concentration of a first metal in a first alloy and a first metal in a second alloy is at least than about 10%. In particular embodiments a first layer of the coatings includes Ni in a concentration ranging from about 50% (w/w) to about 99% (w/w). In such embodiments, the first layer of the coatings may include Ni in a concentration greater than about 50% (w/w), about 55% (w/w), about 60% (w/w), about 65% (w/w), about 70% (w/w), about 75% (w/w), about 80% (w/w), about 85% (w/w), about 90% (w/w), about 92% (w/w), about 93% (w/w), about 94% (w/w), about 95% (w/w), about 96% (w/w), about 97% (w/w), about 98% (w/w), or about 99% (w/w). In some embodiments, a first layer of a coatings includes Ni in a concentration less than about 50% (w/w), about 55% (w/w), about 60% (w/w), about 65% (w/w), about 70% (w/w), about 75% (w/w), about 80% (w/w), about 85% (w/w), about 90% (w/w), about 92% (w/w), about 93% (w/w), about 94% (w/w), about 95% (w/w), about 96% (w/w), about 97% (w/w), about 98% (w/w), or about 99% (w/w).

In certain embodiments, a second layer of the coatings includes Co in a concentration ranging from about 5% (w/w) to about 35% (w/w). In such embodiments, the second layer includes Co in a concentration ranging from about 5% (w/w) to about 10% (w/w), about 10% (w/w) to about 15% (w/w), about 15% (w/w) to about 20% (w/w), about 20% (w/w) to about 25% (w/w), about 25% (w/w) to about 30% (w/w), or about 30% (w/w) to about 35% (w/w).

In embodiments, a layer of a coating comprises Cr in a concentration ranging from about 5% (w/w) to about 99% (w/w). In some embodiments, a layer of a coating includes Cr in a concentration greater than about 5% (w/w), about 10% (w/w), about 15% (w/w), about 20% (w/w), about 25% (w/w), about 30% (w/w), about 35% (w/w), about 40% (w/w), about 45% (w/w), about 50% (w/w), about 55% (w/w), about 60% (w/w), about 65% (w/w), about 70% (w/w), about 75% (w/w), about 80% (w/w), about 85% (w/w), about 90% (w/w), about 92% (w/w), about 93% (w/w), about 94% (w/w), about 95% (w/w), about 96%

(w/w), about 97% (w/w), about 98% (w/w), or about 99% (w/w). In some embodiments, a layer of a coating includes Cr in a concentration less than about 5% (w/w), about 10% (w/w), about 15% (w/w), about 20% (w/w), about 25% (w/w), about 30% (w/w), about 35% (w/w), about 40% (w/w), about 45% (w/w), about 50% (w/w), about 55% (w/w), about 60% (w/w), about 65% (w/w), about 70% (w/w), about 75% (w/w), about 80% (w/w), about 85% (w/w), about 90% (w/w), about 92% (w/w), about 93% (w/w), about 94% (w/w), about 95% (w/w), about 96% (w/w), about 97% (w/w), about 98% (w/w), or about 99% (w/w).

In embodiments, a layer of coating comprises Cr in a concentration ranging from about 5% (w/w) to about 35% (w/w), a layer of coating comprises Ni in a concentration of greater than about 90% (w/w), or both. In further embodiments, a layer of nanolaminate coating comprises Ni in a concentration ranging from about 20% (w/w) to about 50% (w/w), Cr in a concentration ranging from about 20% (w/w) to about 35% (w/w), and Mo in a concentration great than about 1.5% (w/w). In some embodiments, a layer of a coating comprises Cr in a concentration greater than about 7% (w/w), Mo in a concentration ranging from about 5% (w/w) to about 30% (w/w), W in a concentration less than about 3% (w/w), Fe in a concentration ranging from about 1.5% (w/w) to about 15% (w/w), Si in a concentration less than 1% (w/w), Mn in a concentration less than 3% (w/w), and a balance of Ni.

In embodiments, a layer of a coating comprises Ni in a concentration ranging from about 40% (w/w) to about 70% (w/w) and W in a concentration ranging from about 20% (w/w) to about 60% (w/w). In some such embodiments, the layer of the coating may also comprise Mo in a concentration of up to about 40% (w/w).

In embodiments, a layer of a coating comprises Ni in a concentration ranging from about 50% (w/w) to about 70% (w/w) and W in a concentration ranging from about 30% (w/w) to about 50% (w/w). In some such embodiments, the layer of the coating may also comprise Mo in a concentration of up to about 30% (w/w).

In embodiments, a layer of a coating comprises Ni in a concentration of at least about 50% (w/w), and W and Mo in a collective concentration of up to about 50% (w/w). In embodiments, a layer of a coating comprises Ni in a concentration of at least about 60% (w/w), and W and Mo in a collective concentration of up to about 40% (w/w). In particular embodiments, a layer of a coating comprises Ni in a concentration of about 60% (w/w), and W and Mo in a collective concentration of about 40% (w/w). In particular embodiments, a layer of a coating comprises Ni in a concentration of about 60% (w/w), and W in a concentration of about 40% (w/w).

Each layer or type of layer has a thickness in a range selected independently from about 5 nm to about 25,000 nm. In embodiments, each layer or type of layer has a thickness ranging from about 150 nm to about 20,000 nm. In some embodiments, a first layer has a thickness at one or more locations on the plunger core independently ranging from about 150 nanometers (nm) to about 20,000 nm, and a second layer has a thickness at one or more locations on the plunger core independently ranging from about 150 nm to about 20,000 nm. In further embodiments, a third metallic layer has a thickness at one or more locations on the plunger core ranging from about 150 nm to about 20,000 nm. In some embodiments, a laminate coating is a nanolaminate coating.

In embodiments, each layer or type of layer has a thickness in a range selected independently from about 5 nm to about 10,000 nm, from about 50 nm to about 15,000 nm, or from about 1,000 nm to about 20,000 nm. In embodiments, each layer or type of layer has a thickness in a range selected independently from about 50 nm to about 2,000 nm, from about 500 nm to about 3,000 nm, from about 1,000 nm to about 4,000 nm, or from about 1,500 nm to about 5,000 nm. In embodiments, each layer or type of layer has a thickness in a range selected independently from about 50 nm to about 1,000 nm, from about 500 nm to about 1,500 nm, from about 1,000 nm to about 2,000 nm, or from about 1,500 nm to about 2,500 nm.

In embodiments, each layer or type of layer has a thickness in a range selected independently from about 2 nm to about 750 nm. In embodiments, each layer or type of layer has a thickness in a range selected independently from about 2 nm to about 500 nm. In embodiments, each layer or type of layer has a thickness in a range selected independently from about 2 nm to about 250 nm. In embodiments, each layer or type of layer has a thickness in a range selected independently from about 2 nm to about 200 nm.

In further embodiments, each layer or type of layer has a thickness in a range selected independently from about 5 nm to about 100 nm, from about 50 nm to about 150 nm, from about 100 nm to about 200 nm, or from about 150 nm to about 250 nm. In further embodiments, each layer or type of layer has a thickness in a range selected independently from about 5 nm to about 25 nm, from about 10 nm to about 30 nm, from about 30 nm to about 60 nm, from about 40 nm to about 80 nm, from about 75 nm to about 100 nm, from about 100 nm to about 120 nm, from about 120 nm to about 140 nm, from about 140 nm to about 180 nm, from about 180 nm to about 200 nm, from about 200 nm to about 225 nm, from about 200 nm to about 250 nm, from about 220 nm to about 250 nm, or from about 150 nm to about 250 nm.

In embodiments, a coating has a substantially uniform thickness at two or more locations. In some embodiments, a coating has a substantially uniform thickness at three or more locations. In some embodiments, a coating has a substantially uniform thickness at four or more locations. In some embodiments, a coating has a substantially uniform thickness at five or more locations. In some embodiments, a coating has a substantially uniform thickness at six or more locations.

An interface between individual layers may be discrete or diffuse. An interface between the neighboring layers is considered to be "discrete" if the composition shifts between a first layer and a second layer over a distance that is less than about 20% of a thickness of the thinner of the two layers. In embodiments, an interface between neighboring layers is considered to be discrete if the composition shifts between a first layer and a second layer over a distance that is less than about 15% of a thickness of the thinner of the layers. In some embodiments, an interface between neighboring layers is considered to be discrete if the composition shifts between a first layer and a second layer over a distance that is less than about 10% of a thickness of the thinner of the layers. In some embodiments, an interface between neighboring layers is considered to be discrete if the composition shifts between a first layer and a second layer over a distance that is less than about 8% of a thickness of the thinner of the layers. In some embodiments, an interface between neighboring layers is considered to be discrete if the composition shifts between a first layer and a second layer over a distance that is less than about 5% of a thickness of the thinner of the layers. In some embodiments, an interface between neighboring layers is considered to be discrete if the composition shifts between a first layer and a second layer over a distance that is less than about 4% of a thickness of the thinner of the layers. In some embodiments, an interface between neighboring layers is considered to be discrete if the composition shifts between a first layer and a second layer over a distance that is less than about 2% of a thickness of the thinner of the layers.

In embodiments, an interface is "diffuse" if the composition shift between a first layer and a second layer over a more than about 20% of the thickness of a thinner of the two layers. In embodiments, an interface between neighboring layers is considered to be diffuse if the composition shifts between a first layer and a second layer over a distance that is more than about 15% of a thickness of the thinner of the layers. In some embodiments, an interface between neighboring layers is considered to be diffuse if the composition shifts between a first layer and a second layer over a distance that is more than about 10% of a thickness of the thinner of the layers. In some embodiments, an interface between neighboring layers is considered to be diffuse if the composition shifts between a first layer and a second layer over a distance that is more than about 8% of a thickness of the thinner of the layers. In some embodiments, an interface between neighboring layers is considered to be diffuse if the composition shifts between a first layer and a second layer over a distance that is more than about 5% of a thickness of the thinner of the layers. In some embodiments, an interface between neighboring layers is considered to be diffuse if the composition shifts between a first layer and a second layer over a distance that is more than about 4% of a thickness of the thinner of the layers. In some embodiments, an interface between neighboring layers is considered to be diffuse if the composition shifts between a first layer and a second layer over a distance that is more than about 2% of a thickness of the thinner of the layers.

In embodiments, a diffuse interface has a composition shift between a first layer and a second layer over a thickness in a range of about 0.5 nm to about 5 nm. In some embodiments, a diffuse interface has a thickness in a range of about 0.5 nm to about 3 nm. In some embodiments, a diffuse interface has a thickness in a range of about 1 nm to about 4 nm. In some embodiments, a diffuse interface has a thickness in a range of about 2 nm to about 5 nm. In further embodiments, a diffuse interface has a thickness in a range of about 0.5 nm to about 1 nm, about 1 nm to about 2 nm, about 2 nm to 3 nm, from about 3 nm to about 4 nm, or from about 4 nm to about 5 nm.

An overall thickness of each coating present on different portions of a lift plunger may vary widely depending on an application of the coatings. In embodiments, a coating is continuous over the entire lift plunger. In some embodiments, a coating that is present on a particular portion of the lift plunger is uniform or substantially uniform in thickness. In certain embodiments, a coating has two or more thicknesses across a length of a portion of the lift plunger.

In embodiments, a coating has a thickness ranging from about 5 nm to about 5 cm. In some embodiments, a coating has a thickness ranging from about 1 μm to about 75 μm. In some embodiments, a coating has a thickness ranging from about 3 μm to about 50 μm. In some embodiments, a coating has a thickness ranging from about 5 μm to about 35 μm. In some embodiments, a coating has a thickness in a range selected independently from about 5 nm to about 200 nm, from about 5 nm to about 25 nm, from about 10 nm to about 30 nm, from about 30 nm to about 60 nm, from about 40 nm to about 80 nm, from about 75 nm to about 100 nm, from about 100 nm to about 120 nm, from about 120 nm to about 140 nm, from about 140 nm to about 180 nm, from about 180 nm to about 200 nm, from about 200 to about 250 nm, from about 1 μm to about 5 cm, from about 1 μm to about 50 μm, from about 50 μm to about 100 μm, from about 100 μm to about 200 μm, from about 200 μm to about 500 μm, from about 500 μm to about 800 μm, from about 800 μm to about 1.2 mm, from about 500 μm to about 1 mm, from about 1 mm to about 1.5 mm, from about 1.2 mm to about 2 mm, from about 1.8 mm to about 2.5 mm, from about 2 mm to about 3 mm, from about 2.5 mm to about 5 mm, from about 1 mm to about 5 mm, from about 5 mm to about 1 cm, from about 1 cm to about 2 cm, or from about 2 cm to about 5 cm.

In particular embodiments, a coating has a thickness ranging from about 5 μm to about 3,500 μm. In further embodiments, a coating has a thickness in a range of about 25 μm to about 2,250 μm, from about 125 μm to about 2,050 μm, from about 125 μm to about 1,750 μm, from about 200 μm to about 1,500 μm, from about 250 μm to about 1,250 μm, from about 250 μm to about 1,000 μm, from about 250 μm to about 750 μm, from about 500 μm to about 1,000 μm. In yet further embodiments, the coatings have a thickness in a range selected independently from about 25 μm to about 125 μm, from about 50 μm to about 150 μm, about 125 μm to about 250 μm, about 250 μm to about 375 μm, about 375 μm to about 500 μm, about 500 μm to about 750 μm, about 750 μm to about 1,000 μm, about 1,000 μm to about 1,250 μm, about 1,250 μm to about 1,500 μm, about 1,500 μm to about 1,750 μm, about 1,750 μm to about 2,000 μm, about 2,000 μm to about 2,250 μm, about 2,250 μm to about 2,500 μm, about 2,500 μm to about 2,750 μm, and about 2,750 μm to about 3,000 μm.

Coatings as described herein may include a large number of layers. Coatings may include at least two layers, at least three layers, at least four layers, at least six layers, at least eight layers, at least ten layers, at least 20 layers, at least 30 layers, at least 50 layers, at least 100 layers, at least 200 layers, at least 500 layers, at least 1,000 layers, at least 1,500 layers, at least 2,000 layers, at least 2,500 layers, at least 3,000 layers, at least 3,500 layers, at least 4,000 layers, at least 5,000 layers, at least 6,000 layers, at least 7,000 layers, or at least 8,000 layers. In some embodiments, a coating includes at least 50 layers. In some embodiments, a coating includes at least 100 layers. In embodiments, a number of layers in a coating is in a range from about 50 layers to about 8,000 layers. In some embodiments, the number of layers in a coating is in the range of about 100 layers to about 8,000 layers. In further embodiments, the number of layers in a coating is in the range of about 50 layers to about 100 layers, from about 100 layers to about 1,000 layers, from about 1,000 layers to about 2,000 layers, from about 2,000 layers to about 4,000 layers, from about 4,000 layers to about 8,000 layers, or greater than about 8,000 layers.

Each layer deposited onto a plunger core may have a thickness ranging from about 5 nm to about 250 nm. Individual layers deposited may have a thickness in a range selected independently from about 5 nm to about 200 nm, from about 5 nm to about 25 nm, from about 10 nm to about 30 nm, from about 30 nm to about 60 nm, from about 40 nm to about 80 nm, from about 75 nm to about 100 nm, from about 100 nm to about 120 nm, from about 120 nm to about 140 nm, from about 140 nm to about 180 nm, from about 180 nm to about 200 nm, or from about 200 to about 250 nm.

In some embodiments, methods of the present disclosure produce a coated lift plunger with a coating having an overall thickness ranging from about 5 nm to about 200 nm, from about 5 nm to about 25 nm, from about 10 nm to about 30 nm, from about 30 nm to about 60 nm, from about 40 nm to about 80 nm, from about 75 nm to about 100 nm, from about 100 nm to about 120 nm, from about 120 nm to about 140 nm, from about 140 nm to about 180 nm, from about 180 nm to about 200 nm, from about 200 to about 250 nm, from about 1 µm to about 5 cm, from about 1 µm to about 50 µm, from about 50 µm to about 100 µm, from about 100 µm to about 200 µm, from about 200 µm to about 500 µm, from about 500 µm to about 800 µm, from about 800 µm to about 1.2 mm, from about 500 µm to about 1 mm, from about 1 mm to about 1.5 mm, from about 1.2 mm to about 2 mm, from about 1.8 mm to about 2.5 mm, from about 2 mm to about 3 mm, from about 2.5 mm to about 5 mm, from about 1 mm to about 5 mm, from about 5 mm to about 1 cm, from about 1 cm to about 2 cm, or from about 2 cm to about 5 cm.

In particular embodiments, a lift plunger is a ball and sleeve plunger, and the sleeve, the ball, or both are coated with the laminate coating.

Specific properties conferred by coatings of the present disclosure provide for improved hardness, corrosion, and heat resistance properties. Accordingly, in embodiments, a coated lift plunger has a Vickers microhardness of at least about 75 without heat treatment. In some embodiments, a coated lift plunger has a Vickers microhardness of at least about 100, at least about 150, at least about 200, at least about 500, or at least about 1200 without heat treatment.

In some embodiments, a coated lift plunger has a Vickers microhardness as measured by ASTM E384-11e1 ranging from about 75 to about 200, from about 100 to about 300, from about 300 to about 600, from about 550 to about 750, from about 600 to about 900, from about 750 to about 1000, from about 1000 to about 1200, without heat treatment. In further embodiments, a coated lift plunger has a Vickers microhardness as measured by ASTM E384-11e1 ranging from about 100 to about 150, from about 150 to about 250, from about 250 to about 350, from about 350 to about 550, from about 550 to about 600, from about 600 to about 650, from about 650 to about 700, from about 700 to about 750, from about 750 to about 800, from about 800 to about 850, from about 850 to about 900, from about 900 to about 1000, from about 1000 to about 1100, from about 1100 to about 1200 without heat treatment.

In some embodiments, a coated lift plunger is resistant to $H_2S$-induced sulfide stress cracking under sour service environments having a $H_2S$ partial pressure greater than 0.05 psi (0.3 kPa). In further embodiments, a coating does not lose more than 25% of its mass when subjected to National Association of Corrosion Engineers (NACE) TM0193-2016 standardized testing with 15% HCl at 75 degrees Celsius for 6 hours. In additional embodiments a coated lift plunger is resistant to cracking of the nanolaminate coating when exposed to autoclave environments per NACE standard TM0175 or American Society for Testing and Materials (ASTM) E399 standardized testing for high sour gas conditions. In still further embodiments, a coated lift plunger is resistance to pitting wherein individual pits are not deeper than 10% of the nanolaminate coating when tested according to ASTM G48 testing standards. In yet further embodiments, a coated lift plunger is resistance to pitting wherein individual pits are not deeper than 10% of the nanolaminate coating in a service environment with a pH ranging from about 3 to about 7. In additional embodiments, a coated lift plunger is resistance to pitting wherein individual pits are not deeper than 10% of the nanolaminate coating in a service environment with a pH ranging from about 7 to about 6.5, about 6.5 to about 6, about 6 to about 5.5, about 5.5 to about 5, about 5 to about 4.5, about 4.5 to about 4, about 4 to about 3.5, or about 3.5 to about 3.

In embodiments, a coated lift plunger is resistant to cracking when subjected to tensile load of 80% of the yield strength of the coated lift plunger in sulfide stress cracking environment for 720 hours according to NACE TM0177 standardized testing in a service environment with a pH ranging from about 3 to about 7. In certain embodiments, a tub coated lift plunger is resistant to cracking when subjected to tensile load of 80% of the yield strength of the coated lift plunger in sulfide stress cracking environment for 720 hours according to NACE TM0177 standardized testing in a service environment with a pH ranging from about 7 to about 6.5, about 6.5 to about 6, about 6 to about 5.5, about 5.5 to about 5, about 5 to about 4.5, about 4.5 to about 4, about 4 to about 3.5, or about 3.5 to about 3. Coated lift plunger of the present disclosure include those produced by any method described herein.

In embodiments, a lift plunger of the present disclosure further comprises an impact plate. An impact plate may comprise Ti, steel, Al, Cu, carbon-steel, Fe, stainless steel, or a combination thereof.

Also provided herein are methods of reworking a lift plunger having mechanical wear. Such methods comprise determining, based on a measured dimensional characteristic of the lift plunger, an amount of mechanical wear; identifying a wear surface based on a comparison of the measured dimensional characteristic and an original dimensional characteristic of the lift plunger before use or wear; determining an electroplating rework process to deposit a laminate coating onto the wear surface; and executing the electroplating rework process. A flow chart showing an illustrative method is shown in FIG. 4.

In embodiments, determining an electroplating rework process comprises modelling the electroplating rework process to identify one or more electroplating process features necessary to deposit the nanolaminate metal alloy onto the wear surface. In such embodiments, the one or more electroplating process features may include thieve configuration, shield configuration, current density, or waveform. In some embodiments, a lift plunger to be reworked includes a laminate coating. In some embodiments, the laminate coating is a nanolaminate coating.

An electroplating rework process may be an electroplating process described herein or may comprise steps of an electroplating process described herein. In some embodiments, executing an electroplating rework process comprises contacting at least a portion of the lift plunger with an electrolyte solution comprising one or more electrodepositable species. In some embodiments, an electroplating rework process comprises applying a waveform to electrodeposit the laminate coating on the plunger using potentiometric (i.e., potentiostatic), amperometric (i.e., galvanostatic), pulse current, pulse reverse current, modulated current, modulated frequency, or continuous transitioned current electroplating.

In some embodiments, executing an electroplating rework process further comprises: measuring a second dimensional characteristic of the lift plunger; comparing the second dimensional characteristic of the lift plunger to the original dimensional characteristic of the lift plunger; and determining, based on a predetermined tolerance, a further electroplating rework process.

In embodiments, methods of the disclosure further comprise leveling a surface of the lift plunger (e.g., removing pits, gauges, or irregular wear) or activating a surface of a lift plunger using a chemical etch, in-situ etch, mechanical abrasion, or removal of material. In such embodiments, an in-situ etch comprises contacting a lift plunger with an electrolyte solution configured to etch the lift plunger surface.

Methods for Clearing Downhole Accumulations from a Petroleum Well

Disclosed herein are methods for clearing downhole accumulations from a well. Embodiments of the present disclosure include a method for clearing downhole accumulations from a well comprising: positioning a lift plunger described herein in a petroleum well tube; and releasing the lift plunger into the petroleum well tube, thereby allowing the lift plunger to travel in the petroleum well tube carrying liquids and downhole accumulations from a bottom position of a petroleum well to a top position of the petroleum well, and allowing a downhole gas to travel from the bottom position of the petroleum well to the top position of the petroleum well.

Embodiments

The following embodiments are included within the scope of this disclosure.

1. A method for preparing a coated lift plunger, the method comprising:
applying a laminate coating on a surface of a plunger core that is substantially symmetrical about a longitudinal axis and has a first diameter and a plunger body, thereby forming the coated lift plunger.

2. The method of embodiment 1, wherein the plunger core includes a light-weighting feature.

3. The method of embodiment 2, wherein the light-weighting feature comprises:
a first plurality of voids within the plunger core wherein each void independently has a volume;
a second plurality of voids wherein a number of voids per unit volume of the plunger core varies in at least one dimension of the plunger core;
a microcellular or nanocellular foam;
a region devoid of material;
a truss-like structure; or
a combination thereof.

4. The method of embodiment 3, wherein the truss-like structure forms a network with a density that varies in one or more dimensions of the plunger core.

5. The method of embodiment 3, wherein the truss-like structure forms a network with a density that does not vary in one or more dimensions of the plunger core.

6. The method of any one of embodiments 2-5, wherein the light-weighting feature has a void volume ranging from about 1% to about 99%.

7. The method of any one of embodiments 2-6, wherein the light-weighting feature has a void volume ranging from about 1% to about 5%, about 5% to about 10%, about 10% to about 15%, about 15% to about 20%, about 20% to about 25%, about 25% to about 30%, about 30% to about 35%, about 35% to about 40%, about 40% to about 45%, about 45% to about 50%, about 50% to about 55%, about 55% to about 60%, about 60% to about 65%, about 65% to about 70%, about 70% to about 75%, about 75% to about 80%, about 80% to about 85%, about 85% to about 90%, about 90% to about 95%, or about 95% to about 99%.

8. The method of any one of embodiments 2-7, wherein the light-weighting feature is chosen based on a property of a petroleum well.

9. The method of any one of embodiments 1-7, wherein a length or a weight, or both, of the plunger core is chosen based at least on a property of a petroleum well.

10. The method of embodiment 8 or 9, wherein the property of the petroleum well is liquid to gas ratio, casing pressure, tubing pressure, line pressure, plunger fall velocity, or well depth.

11. The method of any one of embodiments 2-10, wherein the light-weighting feature has a secondary function comprising liquid bypass or plunger rotation.

12. The method of any one of embodiments 2-11, wherein the light-weighting feature has been formed by an additive manufacturing process.

13. The method of any one of embodiments 3-12, wherein the density of the light-weighting feature varies in at least one direction of the plunger core.

14. The method of any of embodiments 1-13, wherein at least a portion of the plunger core comprises a weighted section that is denser than any other part of the plunger core.

15. The method of embodiment 14, wherein the weighted section increases a weight of the plunger core when compared to a plunger core that has the same volume without the weighted section.

16. The method of embodiment 14 or 15, wherein the weighted section comprises a metal.

17. The method of any one of embodiments 14-16, wherein the weighted section comprises titanium (Ti), steel, aluminum (Al), copper (Cu), carbon-steel, iron (Fe), stainless steel, or a combination thereof.

18. The method of any one of embodiments 15-17, wherein the weighted section comprises a magnetic material.

19. The method of any one of embodiments 1-18, wherein the laminate coating comprises a first layer and a second layer, the first layer having a first composition and a first nanostructure, and the second layer having a second composition and a second nanostructure.

20. The method of embodiment 19, wherein applying the laminate coating comprises:
contacting at least a portion of the plunger core with an electrodeposition bath comprising electrodepositable ions;
applying a first electric current for a first amount of time to the electrodeposition bath, thereby causing a first layer to be electrodeposited onto the plunger core, the first layer comprising at least a first metal and a second metal; and
applying a second electric current for a second amount of time to the electrodeposition bath, thereby causing a second layer to be electrodeposited onto the plunger core, the second layer comprising the first metal or the second metal.

21. The method of embodiment 19, further comprising:
preparing, prior to applying the laminate coating, the surface of the plunger core to increase a surface energy of the surface of the plunger core.

22. The method of any one of embodiments 19-21, wherein the second layer differs from the first layer in composition, grain size, grain structure, or a combination thereof.

23. The method of any one of embodiments 19-22, wherein the surface of the plunger core is a non-conductive or semi-conductive surface.

24. The method of embodiment 23, further comprising depositing a conductive strike layer onto the surface of the plunger core, the conductive strike layer being sufficient to render the non-conductive or semi-conductive surface of the plunger core sufficiently conductive to permit electrodeposition of the first layer or the second layer onto the plunger core.

25. The method of any one of embodiments 19-24, wherein the first layer has a thickness at one or more locations on the plunger core independently ranging from about 5 nanometers (nm) to about 20,000 nm; and the second layer has a thickness at one or more locations on the plunger core independently ranging from about 5 nm to about 20,000 nm.

26. The method of any one of embodiments 20-25, further comprising applying a third electric current to the electrodeposition bath, thereby causing a third layer to be electrodeposited onto the plunger core, the third layer comprising the first metal or the second metal.

27. The method of embodiment 26, wherein the third layer has a thickness at one or more locations on the plunger core ranging from about 5 nm to about 20,000 nm.

28. The method of embodiment 26 or 27, wherein the third layer differs from the first layer or the second layer in composition, grain size, grain structure, or a combination thereof.

29. The method of any one of embodiments 1-28, wherein the plunger core comprises a metal or a metal alloy.

30. The method of embodiment 29, wherein the plunger core comprises Ti, steel, Al, Cu, carbon-steel, Fe, stainless steel, or a combination thereof.

31. The method of embodiment 29 or 30, wherein the plunger core is made of a steel alloy.

32. The method of embodiment 31, wherein the steel alloy comprises carbon (C) and Fe; C, Fe, and molybdenum (Mo); or C, Fe, Mo, and cobalt (Co).

33. The method of any one of embodiments 1-30, wherein the plunger core comprises a polymeric material.

34. The method of embodiment 33, wherein the polymeric material comprises a plastic.

35. The method of embodiment 33 or 34, wherein the polymeric material comprises arylamides, acrylamides, polybenzimidazole (PBI), polyetherimide, polyetherketoneketone (PEKK), polyether ether ketone (PEEK), polyamide, polyimide, polyamide-imides, polyphenylene oxide (PPO), polystyrene (PS), PPO and PS, polyphthalamide (PPA), polyvinyl alcohol (PVA), acrylonitrile butadiene styrene (ABS), polycarbonate (PC), polylactic acid (PLA), PC/ABS, cellulose fiber, polyphenylsulfone (PPSU), thermosets, PBI-PEEK, urea, epoxies, cyanate esters, polyurethanes, or a combination thereof.

36. The method of any one of embodiments 33-35, further comprising forming the plunger core from the polymeric material.

37. The method of any one of embodiments 1-36, wherein forming the polymeric material comprises casting, injection molding, blow molding, extrusion molding, cutting, machining, milling, grinding, sanding, polishing, abrasive blasting, three-dimensional printing (3D-printing), selective laser sintering (SLS), sintering laser melting (SLM), fused deposition modeling (FDM), stereolithography (SLA), continuous liquid interface printing (CLIP), cutting woven fabric, forming woven fabric, cutting non-woven fabric, forming non-woven fabric, cutting foam sheets, forming of foam sheets, or a combination thereof.

38. The method of embodiment 36 or 37, wherein the forming the plunger core comprises an additive manufacturing process.

39. The method of embodiment 38, wherein the additive manufacturing process comprises 3D-printing, SLS, SLM, FDM, SLA, or CLIP.

40. The method of any one of embodiments 36-39, wherein the forming the plunger core comprises casting, rotational molding, injection molding, blow molding, extrusion molding, or a combination thereof.

41. The method of any one of embodiments 36-40, wherein the forming the plunger core comprises mechanically removing material.

42. The method of embodiment 41, wherein the mechanically removing material comprises cutting, milling, grinding, sanding, polishing, abrasive blasting, or a combination thereof.

43. The method of any one of embodiments 36-42, wherein the forming the plunger core comprises cutting or shaping of the woven fabric, the non-woven fabric, or the foam sheets.

44. The method of any one of embodiments 37-43, wherein the woven fabric, non-woven fabric, or foam sheets comprise the polymeric material.

45. The method of one of embodiments 37-44, wherein the shaping of woven fabric, non-woven fabric, or foam sheets comprise forming and layering at least two layers of the woven fabric, the non-woven fabric, or the foam sheets.

46. The method of any one of embodiments 36-45, wherein the forming the plunger core comprises casting, cutting, milling, grinding, sanding, polishing, abrasive blasting, 3D-printing, SLS, SLM, FDM, SLA, CLIP, cutting woven fabric, forming woven fabric, cutting non-woven fabric, forming non-woven fabric, cutting foam sheets, forming of foam sheets, or a combination thereof.

47. The method of any one of embodiments 36-46, wherein the forming the plunger core comprises cutting, milling, 3D-printing, FDM, SLA, CLIP, cutting woven fabric, forming woven fabric, cutting non-woven fabric, forming non-woven fabric, cutting foam sheets, forming of foam sheets, or a combination thereof.

48. The method of any one of embodiments 1-47, further comprising activating the surface of the plunger core by chemical etch, in-situ etch, mechanical abrasion, removal of material, or a combination thereof.

49. The method of embodiment 48, wherein the activating the surface comprises plasma etching, mechanical etching, sanding, roughening, grit blasting, or a combination thereof.

50. The method of any one of embodiments 36-49, wherein the forming the plunger core comprises a resin infusing or injection molding a thermoset or a thermoplastic material.

51. The method of any one of embodiments 19-50, wherein the first layer or the second layer comprises a fine-grained or an ultrafine-grained metal or metal alloy having an average grain size ranging from about 1 nm to about 5,000 nm, based on a measurement of grain size in micrographs.

52. The method of embodiment 51, wherein the average grain size ranges from about 1 nm to about 20 nm, from about 1 nm to about 100 nm, from about 5 nm to about 50 nm, from about 5 nm to about 100 nm, from about 5 nm to about 200 nm, from about 10 nm to about 100 nm, from about 10 nm to about 200 nm, from about 20 nm to about 200 nm, from about 20 nm to about 250 nm, from about 20 nm to about 500 nm, from about 50 nm to about 250 nm, from about 50 nm to about 500 nm, from about 100 nm to about 500 nm, from about 200 nm to about 1,000 nm, from about 500 nm to about 2,000 nm, or from about 1,000 nm to about 5,000 nm.

53. The method of embodiment 51 or 52, wherein the fine-grained metal or metal alloy has a high degree of twinning between metal grains, and remains ductile while having increased hardness, tensile strength, or corrosion resistance relative to an electrodeposited metal or alloy of a same composition with a grain size that is greater than about 5,000 nm.

54. The method of any one of embodiments 19-53, wherein the first layer comprises silver (Ag), Al, gold (Au), boron (B), beryllium (Be), carbon (C), cobalt (Co), chromium (Cr), Cu, Fe, mercury (Hg), indium (In), iridium (Ir), magnesium (Mg), manganese (Mn), molybdenum (Mo), niobium (Nb), neodymium (Nd), nickel (Ni), phosphorous (P), palladium (Pd), platinum (Pt), rhenium (Re), rhodium (Rh), antimony (Sb), silicon (Si), tin (Sn), lead (Pb), tantalum (Ta), Ti, tungsten (W), vanadium (V), zinc (Zn), zirconium (Zr), or a combination thereof; and the second layer comprises Ag, Al, Au, B, Be, C, Co, Cr, Cu, Fe, Hg, In, Ir, Mg, Mn, Mo, Nb, Nd, Ni, P, Pd, Pt, Re, Rh, Sb, Si, Sn, Pb, Ta, Ti, W, V, Zn, Zr, or a combination thereof.

55. The method of any one of embodiments 19-54, wherein the first layer independently comprises two or more of Ag, Al, Au, B, Be, C, Co, Cr, Cu, Fe, Hg, In, Ir, Mg, Mn, Mo, Nb, Nd, Ni, P, Pd, Pt, Re, Rh, Sb, Si, Sn, Pb, Ta, Ti, W, V, Zn, and Zr; and the second layer independently comprises two or more of Ag, Al, Au, B, Be, C, Co, Cr, Cu, Fe, Hg, In, Ir, Mg, Mn, Mo, Nb, Nd, Ni, P, Pd, Pt, Re, Rh, Sb, Si, Sn, Pb, Ta, Ti, W, V, Zn, and Zr.

56. The method of any one of embodiments 19-55, wherein the first layer independently comprises NiCr, NiFe, NiCo, NiCrCo, NiAl, NiCrAl, NiFeAl, NiCoAl, NiCrCoAl, NiMo, NiCrMo, NiFeMo, NiCoMo, NiCrCoMo, NiW, NiCrW, NiFeW, NiCoW, NiCrCoW, NiMoW, NiNb, NiCrNb, NiFeNb, NiCoNb, NiCrCoNb, NiTi, NiCrTi, NiFeTi, NiCoTi, NiCrCoTi, NiCrP, NiCrAl, NiCoP, NiCoAl, NiFeP, NiFeAl, NiCrSi, NiCrB, NiCoSi, NoCoB, NiFeSi, NiFeB, ZnCr, ZnFe, ZnCo, ZnNi, ZnCrP, ZnCrAl, ZnFeP, ZnFeAl, ZnCoP, ZnCoAl, ZnNiP, ZnNiAl, ZnCrSi, ZnCrB, ZnFeSi, ZnFeB, ZnCoSi, ZnCoB, ZnNiSi, ZnNiB, CoCr, CoFe, CoCrP, CoFeP, CoCrAl, CoFeAl, CoCrSi, CoFeSi, CoCrB, CoFeB, CoAl, CoW, CoCrW, CoFeW, CoTi, CoCrTi, CoFeTi, CoTa, CoCrTa, CoFeTa, CoC, CoCrC, CoFeC, FeCr, FeCrP, FeCrAl, FeCrSi, or FeCrB; and the second layer independently comprises NiCr, NiFe, NiCo, NiCrCo, NiAl, NiCrAl, NiFeAl, NiCoAl, NiCrCoAl, NiMo, NiCrMo, NiFeMo, NiCoMo, NiCrCoMo, NiW, NiCrW, NiFeW, NiCoW, NiCrCoW, NiMoW, NiNb, NiCrNb, NiFeNb, NiCoNb, NiCrCoNb, NiTi, NiCrTi, NiFeTi, NiCoTi, NiCrCoTi, NiCrP, NiCrAl, NiCoP, NiCoAl, NiFeP, NiFeAl, NiCrSi, NiCrB, NiCoSi, NoCoB, NiFeSi, NiFeB, ZnCr, ZnFe, ZnCo, ZnNi, ZnCrP, ZnCrAl, ZnFeP, ZnFeAl, ZnCoP, ZnCoAl, ZnNiP, ZnNiAl, ZnCrSi, ZnCrB, ZnFeSi, ZnFeB, ZnCoSi, ZnCoB, ZnNiSi, ZnNiB, CoCr, CoFe, CoCrP, CoFeP, CoCrAl, CoFeAl, CoCrSi, CoFeSi, CoCrB, CoFeB, CoAl, CoW, CoCrW, CoFeW, CoTi, CoCrTi, CoFeTi, CoTa, CoCrTa, CoFeTa, CoC, CoCrC, CoFeC, FeCr, FeCrP, FeCrAl, FeCrSi, or FeCrB.

57. The method of any one of embodiments 19-56, wherein the first layer and the second layer comprise Ni and W.

58. The method of embodiment 57, wherein the first layer and the second layer further comprise Mo.

59. The method of embodiment 57 or 58, wherein the first layer, the second, layer, or both, independently comprise Ni in a concentration ranging from about 40% (w/w) to about 70% (w/w).

60. The method of any one of embodiments 57-59, wherein the first layer, the second layer, or both, independently comprise W in a concentration ranging from about 30% (w/w) to about 50% (w/w).

61. The method of embodiment 60, wherein the first layer, the second layer, or both, independently comprise Mo in a concentration of up to about 40% (w/w).

62. The method of any one of embodiments 57-60, wherein the first layer, the second layer, or both, independently comprise Ni in a concentration of about 60% (w/w), and W in a concentration of about 40% (w/w).

63. The method of any one of embodiments 1-62, wherein the coated lift plunger is a conventional, continuous flow, shifting ring, pad, brush, solid-ring, sleeve and ball, or snake plunger.

64. The method of any one of embodiments 1-63, wherein the coated lift plunger is a ball and sleeve plunger, and the sleeve, the ball, or both are coated with the laminate coating.

65. The method of any one of embodiments 1-64, wherein the laminate coating has a Vickers microhardness as measured by ASTM E384-11e1 of at least about 75 without heat treatment.

66. The method of embodiment 65, wherein the Vickers microhardness as measured by ASTM E384-11e1 is at least about 100 without heat treatment.

67. The method of embodiment 66, wherein the Vickers microhardness as measured by ASTM E384-11e1 is at least about 150 without heat treatment.

68. The method of embodiment 67, wherein the Vickers microhardness as measured by ASTM E384-11e1 is at least about 200 without heat treatment.

69. The method of embodiment 68, wherein the Vickers microhardness as measured by ASTM E384-11e1 is at least about 500 without heat treatment.

70. The method of embodiment 69, wherein the Vickers microhardness as measured by ASTM E384-11e1 is at least about 1200 without heat treatment.

71. The method of embodiment 65, wherein the Vickers microhardness as measured by ASTM E384-11e1 ranges from about 75 to about 200, from about 100 to about 300, from about 300 to about 600, from about 550 to about 750, from about 600 to about 900, from about 750 to about 1000, from about 1000 to about 1200, without heat treatment.

72. The method of embodiment 65, wherein the Vickers microhardness as measured by ASTM E384-11e1 ranges from about 100 to about 150, from about 150 to about 250, from about 250 to about 350, from about 350 to about 550, from about 550 to about 600, from about 600 to about 650, from about 650 to about 700, from about 700 to about 750, from about 750 to about 800, from about 800 to about 850, from about 850 to about 900, from about 900 to about 1000, from about 1000 to about 1100, from about 1100 to about 1200 without heat treatment.

73. The method of any one of embodiments 1-72, wherein the laminate coating is a nanolaminate coating.

74. The method of any one of embodiments 1-73, wherein the laminate coating has a substantially uniform thickness at two or more, three or more, four or more, or five or more locations.

75. A coated lift plunger produced by the method of any one of embodiments 1-74.

76. A coated lift plunger comprising:
a plunger core that is substantially symmetrical about a longitudinal axis and has a first diameter and a plunger body; and
a laminate coating on a surface of the plunger core, the laminate coating having a thickness, the laminate coating comprising a first and a second layer, the first layer having a first composition and a first nanostructure, and the second layer having a second composition and a second nanostructure.

77. The coated lift plunger of embodiment 76, wherein the first nanostructure has a first average grain size, a first grain boundary geometry, a first crystal orientation, or a first defect density; and the second nanostructure has a second average grain size, a second grain boundary geometry, a second crystal orientation, and a second defect density, wherein the first average grain size is different from the second average grain size, the first grain boundary geometry is different from the second grain boundary geometry, the first crystal orientation is different from the second crystal orientation, the first defect density is different from the second defect density, or a combination thereof.

78. The coated lift plunger of embodiment 76 or 77, wherein the plunger body comprises a light-weighting feature.

79. The coated lift plunger of embodiment 78, wherein the light-weighting feature is optimized based on a property of a petroleum well.

80. The coated lift plunger of any one of embodiments 76-79, wherein the property of the petroleum well is liquid to gas ratio, casing pressure, tubing pressure, line pressure, plunger fall velocity, or well depth.

81. The coated lift plunger of any one of embodiments 78-80, wherein the light-weighting feature has a secondary function comprising liquid bypass or plunger rotation.

82. The coated lift plunger of any one of embodiments 78-81, wherein the light-weighting feature comprises:

a first plurality of voids within the plunger core wherein each void independently has a volume;

a second plurality of voids wherein a number of voids per unit volume of the plunger core varies in at least one dimension of the plunger core;

a microcellular or nanocellular foam;

a region devoid of material;

a truss-like structure; or a combination thereof.

83. The coated lift plunger of any one of embodiments 76-82, wherein the plunger body further comprises:

a top end;

a bottom end;

a lubricator catch portion at the top end of the plunger body; and a bumper portion at the bottom end of the plunger body.

84. The coated lift plunger of any one of embodiments 78-83, wherein the light-weighting feature is a hollow core centered about the longitudinal axis and extending through a portion of the plunger body.

85. The coated lift plunger of any one of embodiments 78-83, wherein the light-weighting feature is a plurality of voids within the plunger body, and wherein a number of the voids per unit volume varies along the longitudinal axis or along the first diameter of the plunger body.

86. The coated lift plunger of embodiment 85, wherein a density of the plurality of voids is higher between the top end and the bottom end.

87. The coated lift plunger of embodiment 85 or 86, wherein a density of the plurality of voids is about zero voids per unit volume at the top end and the bottom end.

88. The coated lift plunger of any one of embodiments 78-87, wherein the light weighting feature has a void volume ranging from about 1% to about 5%, from about 5% to about 10%, from about 10% to about 15%, from about 15% to about 20%, from about 20% to from about 25%, from about 25% to about 30%, from about 30% to about 35%, from about 35% to about 40%, from about 40% to about 45%, from about 45% to about 50%, from about 50% to about 55%, from about 55% to about 60%, from about 60% to about 65%, from about 65% to about 70%, from about 70% to about 75%, from about 75% to about 80%, from about 80% to about 85%, from about 85% to about 90%, from about 90% to about 95%, or from about 95% to about 99%.

89. The coated lift plunger of any one of embodiments 76-88, wherein the coated lift plunger is one of a conventional, continuous flow, shifting ring, pad, brush, solid-ring, sleeve and ball, or snake plunger.

90. The coated lift plunger of any one of embodiments 78-89, wherein the light-weighting feature comprises a plurality of voids, individual ones of the plurality of voids is substantially uniform in dimension, and the plurality of voids vary in the number of voids per unit volume throughout a volume of the plunger body.

91. The coated lift plunger of any one of embodiments 78-90, wherein the light-weighting feature comprises a plurality of struts that define voids within the plunger body.

92. The coated lift plunger of any one of embodiments 76-91, wherein the plunger body comprises a polymeric material produced by casting, rotational molding, injection molding, blow molding, extrusion molding, or a combination thereof.

93. The coated lift plunger of embodiment 92, wherein the polymeric material comprises woven fabrics, non-woven fabric, foam sheets, or a combination thereof.

94. The coated lift plunger of embodiment 92 or 93, wherein the polymeric material comprises at least two layers of woven fabrics, non-woven fabric, foam sheets, or a combination thereof.

95. The coated lift plunger of any one of embodiments 76-94, wherein the polymeric material comprises a thermoset or a thermoplastic material.

96. The coated lift plunger of any one of embodiments 76 to 95, wherein the first layer or the second layer comprises a fine-grained or ultrafine-grained metal or metal alloy having an average grain size ranging from about 1 nm to about 5,000 nm, based on a measurement of grain size in micrographs.

97. The coated lift plunger of embodiment 96, wherein the average grain size ranges from about, 1 nm to about 20 nm, from about 1 nm to about 100 nm, from about 5 nm to about 50 nm, from about 5 nm to about 100 nm, from about 5 nm to about 200 nm, from about 10 nm to about 100 nm, from about 10 nm to about 200 nm, from about 20 nm to about 200 nm, from about 20 nm to about 250 nm, from about 20 nm to about 500 nm, from about 50 nm to about 250 nm, from about 50 nm to about 500 nm, from about 100 nm to about 500 nm, from about 200 nm to about 1,000 nm, from about 500 nm to about 2,000 nm, or from about 1,000 nm to about 5,000 nm.

98. The coated lift plunger of embodiment 96 or 97, wherein the fine-grained metal or metal alloy has a high degree of twinning between metal grains, and remains ductile while having increased hardness, tensile strength, or corrosion resistance relative to an electrodeposited metal or alloy of a same composition with a grain size that is greater than about 5,000 nm.

99. The coated lift plunger of any one of embodiments 76-98, wherein the first layer independently comprises Ag, Al, Au, B, Be, C, Co, Cr, Cu, Fe, Hg, In, Ir, Mg, Mn, Mo, Nb, Nd, Ni, P, Pd, Pt, Re, Rh, Sb, Si, Sn, Pb, Ta, Ti, W, V, Zn, Zr, or a combination thereof; and the second layer independently comprises Ag, Al, Au, B, Be, C, Co, Cr, Cu, Fe, Hg, In, Ir, Mg, Mn, Mo, Nb, Nd, Ni, P, Pd, Pt, Re, Rh, Sb, Si, Sn, Pb, Ta, Ti, W, V, Zn, Zr, or a combination thereof.

100. The coated lift plunger of any one of embodiments 76-99, wherein the first layer independently comprises two or more of Ag, Al, Au, B, Be, C, Co, Cr, Cu, Fe, Hg, In, Ir, Mg, Mn, Mo, Nb, Nd, Ni, P, Pd, Pt, Re, Rh, Sb, Si, Sn, Pb, Ta, Ti, W, V, Zn, and Zr; and the second layer independently comprises two or more of Ag, Al, Au, B, Be, C, Co, Cr, Cu, Fe, Hg, In, Ir, Mg, Mn, Mo, Nb, Nd, Ni, P, Pd, Pt, Re, Rh, Sb, Si, Sn, Pb, Ta, Ti, W, V, Zn, and Zr.

101. The coated lift plunger of any of embodiments 76-100, wherein the first layer independently comprises NiCr, NiFe, NiCo, NiCrCo, NiAl, NiCrAl, NiFeAl, NiCoAl, NiCrCoAl, NiMo, NiCrMo, NiFeMo, NiCoMo, NiCrCoMo, NiW, NiCrW, NiFeW, NiCoW, NiCrCoW, NiMoW, NiNb, NiCrNb, NiFeNb, NiCoNb, NiCrCoNb, NiTi, NiCrTi, NiFeTi, NiCoTi, NiCrCoTi, NiCrP, NiCrAl, NiCoP, NiCoAl, NiFeP, NiFeAl, NiCrSi, NiCrB, NiCoSi, NoCoB, NiFeSi, NiFeB, ZnCr, ZnFe, ZnCo, ZnNi, ZnCrP, ZnCrAl, ZnFeP, ZnFeAl, ZnCoP, ZnCoAl, ZnNiP, ZnNiAl, ZnCrSi, ZnCrB, ZnFeSi, ZnFeB, ZnCoSi, ZnCoB, ZnNiSi, ZnNiB, CoCr, CoFe, CoCrP, CoFeP, CoCrAl, CoFeAl, CoCrSi, CoFeSi, CoCrB, CoFeB, CoAl, CoW, CoCrW, CoFeW, CoTi, CoCrTi, CoFeTi, CoTa, CoCrTa, CoFeTa, CoC, CoCrC, CoFeC, FeCr, FeCrP, FeCrAl, FeCrSi, or FeCrB; and the second layer independently comprises NiCr, NiFe, NiCo, NiCrCo, NiAl, NiCrAl, NiFeAl, NiCoAl, NiCrCoAl, NiMo, NiCrMo, NiFeMo, NiCoMo, NiCrCoMo, NiW, NiCrW, NiFeW, NiCoW, NiCrCoW, NiMoW, NiNb, NiCrNb, NiFeNb, NiCoNb, NiCrCoNb, NiTi, NiCrTi, NiFeTi, NiCoTi, NiCrCoTi, NiCrP, NiCrAl, NiCoP, NiCoAl, NiFeP, NiFeAl, NiCrSi, NiCrB, NiCoSi, NoCoB, NiFeSi, NiFeB, ZnCr, ZnFe, ZnCo, ZnNi, ZnCrP, ZnCrAl, ZnFeP, ZnFeAl, ZnCoP, ZnCoAl, ZnNiP, ZnNiAl, ZnCrSi, ZnCrB, ZnFeSi, ZnFeB, ZnCoSi, ZnCoB, ZnNiSi, ZnNiB, CoCr, CoFe, CoCrP, CoFeP, CoCrAl, CoFeAl, CoCrSi, CoFeSi, CoCrB, CoFeB, CoAl, CoW, CoCrW, CoFeW, CoTi, CoCrTi, CoFeTi, CoTa, CoCrTa, CoFeTa, CoC, CoCrC, CoFeC, FeCr, FeCrP, FeCrAl, FeCrSi, or FeCrB.

102. The coated lift plunger of any of embodiments 76-100, wherein the first layer and the second layer comprise Ni and W.

103. The coated lift plunger of embodiment 102, wherein the first layer and the second layer further comprise Mo.

104. The coated lift plunger of embodiment 102 or 103, wherein the first layer, the second, layer, or both, independently comprise Ni in a concentration ranging from about 40% (w/w) to about 70% (w/w).

105. The coated lift plunger of any one of embodiments 102-104, wherein the first layer, the second layer, or both, independently comprise W in a concentration ranging from about 30% (w/w) to about 50% (w/w).

106. The coated lift plunger of embodiment 104 or 105, wherein the first layer, the second layer, or both, independently comprise Mo in a concentration of up to about 40% (w/w).

107. The coated lift plunger of any one of embodiments 102-106, wherein the first layer, the second layer, or both, independently comprise Ni in a concentration of about 60% (w/w), and W in a concentration of about 40% (w/w).

108. The coated lift plunger of any one of embodiments 76-107, wherein the laminate coating has a Vickers microhardness as measured by ASTM E384-11e1 of at least about 75 without heat treatment.

109. The coated lift plunger of embodiment 108, wherein the Vickers microhardness as measured by ASTM E384-11e1 is at least about 100 without heat treatment.

110. The coated lift plunger of embodiment 109, wherein the Vickers microhardness as measured by ASTM E384-11e1 is at least about 150 without heat treatment.

111. The coated lift plunger of embodiment 110, wherein the Vickers microhardness as measured by ASTM E384-11e1 is at least about 200 without heat treatment.

112. The coated lift plunger of embodiment 111, wherein the Vickers microhardness as measured by ASTM E384-11e1 is at least about 500 without heat treatment.

113. The coated lift plunger of embodiment 112, wherein the Vickers microhardness as measured by ASTM E384-11e1 is at least about 1200 without heat treatment.

114. The coated lift plunger of embodiment 108, wherein the Vickers microhardness as measured by ASTM E384-11e1 ranges from about 75 to about 200, from about 100 to about 300, from about 300 to about 600, from about 550 to about 750, from about 600 to about 900, from about 750 to about 1000, from about 1000 to about 1200, without heat treatment.

115. The coated lift plunger of embodiment 108, wherein the Vickers microhardness as measured by ASTM E384-11e1 ranges from about 100 to about 150, from about 150 to about 250, from about 250 to about 350, from about 350 to about 550, from about 550 to about 600, from about 600 to about 650, from about 650 to about 700, from about 700 to about 750, from about 750 to about 800, from about 800 to about 850, from about 850 to about 900, from about 900 to about 1000, from about 1000 to about 1100, from about 1100 to about 1200 without heat treatment.

116. The coated lift plunger of any one of embodiments 76-115, wherein the plunger core further comprises an impact plate.

117. The coated lift plunger of embodiment 116, wherein the impact plate comprises titanium (Ti), steel, aluminum (Al), copper (Cu), carbon-steel, iron (Fe), stainless steel, or a combination thereof.

118. The coated lift plunger of any one of embodiments 76-117, wherein the coated lift plunger is a ball and sleeve plunger, and the sleeve, the ball, or both are coated with the laminate coating.

119. The coated lift plunger of any one of embodiments 78-118, wherein the density of the light-weighting feature varies in at least one direction of the plunger core.

120. The coated lift plunger of any one of embodiments 76-119, wherein at least a portion of the plunger core comprises a weighted section that is denser than any other part of the plunger core.

121. The coated lift plunger of embodiment 120, wherein the weighted section increases a weight of the plunger core when compared to a plunger core that has the same volume without the weighted section.

122. The coated lift plunger of embodiment 120 or 121, wherein the weighted section comprises a metal.

123. The coated lift plunger of any one of embodiments 120-122, wherein the weighted section comprises Ti, steel, Al, Cu, carbon-steel, Fe, stainless steel, or a combination thereof.

124. The coated lift plunger of any one of embodiments 120-123, wherein the weighted section comprises a magnetic material.

125. The coated lift plunger of any one of embodiments 82-124, wherein the truss-like structures form a network with a density that varies in one or more dimensions of the plunger core.

126. The coated lift plunger of any one of embodiments 82-125, wherein the truss-like structures form a network with a density that does not vary in one or more dimensions of the plunger core.

127. The coated lift plunger of any one of embodiments 76-126, wherein the surface of the plunger core is a non-conductive or semi-conductive surface.

128. The coated lift plunger of embodiment 127, further comprising a conductive strike layer on the surface of the plunger core, the conductive strike layer being sufficient to render the non-conductive or semi-conductive surface of the plunger core sufficiently conductive to permit electrodeposition of the first metallic layer or the second metallic layer onto the plunger core.

129. The coated lift plunger of any one of embodiments 76-128, wherein the first layer has a thickness at one or more locations on the plunger core ranging from about 5 nm to about 20,000 nm; and
wherein the second layer has a thickness at one or more locations on the plunger core ranging from about 5 nm to about 20,000 nm.

130. The coated lift plunger of any one of embodiments 76-129, wherein the laminate coating further comprises a third metallic layer having a third composition and a third nanostructure.

131. The coated lift plunger of embodiment 130, wherein the third metallic layer has a thickness at one or more locations on the plunger core ranging from about 5 nm to about 20,000 nm.

132. The coated lift plunger of any one of embodiments 76-131, wherein the plunger core comprises a metal or a metal alloy.

133. The coated lift plunger of embodiment 132, wherein the plunger core comprises Ti, steel, Al, Cu, carbon-steel, Fe, stainless steel, or a combination thereof.

134. The coated lift plunger of embodiment 132 or 133, wherein the plunger core is made of a steel alloy.

135. The coated lift plunger of embodiment 134, wherein the steel alloy comprises C and Fe; C, Fe, and Mo; or C, Fe, Mo, and Co.

136. The coated lift plunger of any one of embodiments 76-133, wherein the plunger core comprises a polymeric material.

137. The coated lift plunger of embodiment 136, wherein the polymeric material comprises a plastic.

138. The coated lift plunger of embodiment 136 or 137, wherein the polymeric material comprises arylamides, acrylamides, polybenzimidazole (PBI), polyetherimide, polyetherketoneketone (PEKK), polyether ether ketone (PEEK), polyamide, polyimide, polyamide-imides, polyphenylene oxide (PPO), polystyrene (PS), polyphenylene oxide (PPO) and polystyrene (PS), polyphthalamide (PPA), polyvinyl alcohol (PVA), acrylonitrile butadiene styrene (ABS), polycarbonate (PC), polylactic acid (PLA), PC/ABS, cellulose fiber, polyphenylsulfone (PPSU), thermosets, PBI-PEEK, urea, epoxies, cyanate esters, polyurethanes, or a combination thereof.

139. The coated lift plunger of any one of embodiments 76-138, wherein the laminate coating is a nanolaminate coating.

140. The coated lift plunger of any one of embodiments 76-139, wherein the laminate coating has a substantially uniform thickness at two or more, three or more, four or more, or five or more locations.

141. The coated lift plunger of any one of embodiments 75-140, wherein a recess is formed in a top surface of the of the coated lift plunger.

142. The coated lift plunger of embodiment 141, wherein the coated lift plunger has a length along the longitudinal axis and the recess extends into the coated lift plunger at least about 5% of the length.

143. The coated lift plunger of embodiment 142, wherein the coated lift plunger has a length along the longitudinal axis and the recess extends into the coated lift plunger at least about 10% of the length.

144. The coated lift plunger of embodiment 143, wherein the coated lift plunger has a length along the longitudinal axis and the recess extends into the coated lift plunger at least about 15% of the length.

145. The coated lift plunger of embodiment 144, wherein the coated lift plunger has a length along the longitudinal axis and the recess extends into the coated lift plunger at least about 20% of the length.

146. The coated lift plunger of embodiment 145, wherein the coated lift plunger has a length along the longitudinal axis and the recess extends into the coated lift plunger at least about 25% of the length.

147. The coated lift plunger of any one of embodiments 141-146, further comprising an aperture that extends from the recess through a sidewall of the coated lift plunger.

148. The coated lift plunger of any one of embodiments 75-147, wherein the laminate coating is substantially continuous on the surface of the plunger core.

149. A method for clearing downhole accumulations from a well comprising:
positioning the coated lift plunger of any one of embodiments 76-148 in a petroleum well tube; and
releasing the coated lift plunger into the petroleum well tube, thereby allowing the coated lift plunger to travel in the petroleum well tube carrying liquids and downhole accumulations from a bottom position of the petroleum well to a top position of the petroleum well, and allowing a downhole gas to travel from the bottom position of the petroleum well to the top position of the petroleum well.

150. A method for reworking a lift plunger having mechanical wear, the method comprising:
determining, based on a measured dimensional characteristic of the lift plunger, an amount of mechanical wear;
identifying a wear surface based on a comparison of the measured dimensional characteristic and an original dimensional characteristic of the lift plunger before use or wear;
determining an electroplating rework process to deposit a laminate coating onto the wear surface; and
executing the electroplating rework process.

151. The method of embodiment 150, wherein the determining the electroplating rework process comprises modelling the electroplating rework process to identify one or more electroplating process features necessary to deposit the laminate metal alloy onto the wear surface.

152. The method of embodiment 151, wherein the one or more electroplating process features comprise thieve configuration, shield configuration, current density, waveform, or a combination thereof.

153. The method of any one of embodiments 150-152, wherein the laminate coating is a nanolaminate coating.

154. The method of any one of embodiments 150-152, wherein the lift plunger comprises a laminate coating.

155. The method of any one of embodiments 150-154, wherein the executing the electroplating rework process comprises contacting at least a portion of the lift plunger with an electrolyte solution comprising one or more electrodepositable species.

156. The method of any one of embodiments 150-155, wherein the executing the electroplating rework process comprises applying a waveform to electrodeposit the laminate coating on the plunger using potentiometric, amperometric, pulse current, pulse reverse current, modulated current, modulated frequency, continuous transitioned current electroplating, or a combination thereof.

157. The method of any one of embodiments 150-156, further comprising activating the surface of the lift plunger using a chemical etch, in-situ etch, mechanical abrasion, removal of material, or a combination thereof.

158. The method of embodiment 157, wherein the electrolyte solution is configured to etch the lift plunger surface and the in-situ etch further comprises contacting the lift plunger with the electrolyte solution.

159. The method of any one of embodiments 150-158, wherein the executing the electroplating rework process further comprises:
measuring a second dimensional characteristic of the lift plunger;
comparing the second dimensional characteristic of the lift plunger to the original dimensional characteristic of the lift plunger; and
determining, based on a predetermined tolerance, a further electroplating rework process.

160. The method of any one of embodiments 150-159, wherein the laminate coating further comprises a first type of layers or second type of layers that comprises a fine-grained or an ultrafine-grained metal or metal alloy having an average grain size selected independently from a range of about 1 nm to about 5,000 nm, based on a measurement of grain size in micrographs.

161. The method of embodiment 160, wherein the average grain size ranges from about 1 nm to about 20 nm, from about 1 nm to about 100 nm, from about 5 nm to about 50 nm, from about 5 nm to about 100 nm, from about 5 nm to about 200 nm, from about 10 nm to about 100 nm, from about 10 nm to about 200 nm, from about 20 nm to about 200 nm, from about 20 nm to about 250 nm, from about 20 nm to about 500 nm, from about 50 nm to about 250 nm, from about 50 nm to about 500 nm, from about 100 nm to about 500 nm, from about 200 nm to about 1,000 nm, from about 500 nm to about 2,000 nm, or from about 1,000 nm to about 5,000 nm.

162. The method of embodiment 160 or 161, wherein the fine-grained metal or metal alloy has a high degree of twinning between metal grains, and remains ductile while having increased hardness, tensile strength, or corrosion resistance relative to an electrodeposited metal or alloy of a same composition with a grain size that is greater than about 5,000 nm.

163. The method of any one of embodiments 160-162, wherein the first type of layers comprise Ag, Al, Au, B, Be, C, Co, Cr, Cu, Fe, Hg, In, Ir, Mg, Mn, Mo, Nb, Nd, Ni, P, Pd, Pt, Re, Rh, Sb, Si, Sn, Pb, Ta, Ti, W, V, Zn, Zr, or a combination thereof; and
the second type of layers comprise Ag, Al, Au, B, Be, C, Co, Cr, Cu, Fe, Hg, In, Ir, Mg, Mn, Mo, Nb, Nd, Ni, P, Pd, Pt, Re, Rh, Sb, Si, Sn, Pb, Ta, Ti, W, V, Zn, Zr, or a combination thereof.

164. The method of any one of embodiments 160-163, wherein the first type of layers comprise two or more of Ag, Al, Au, B, Be, C, Co, Cr, Cu, Fe, Hg, In, Ir, Mg, Mn, Mo, Nb, Nd, Ni, P, Pd, Pt, Re, Rh, Sb, Si, Sn, Pb, Ta, Ti, W, V, Zn, and Zr; and
the second type of layers comprise two or more of Ag, Al, Au, B, Be, C, Co, Cr, Cu, Fe, Hg, In, Ir, Mg, Mn, Mo, Nb, Nd, Ni, P, Pd, Pt, Re, Rh, Sb, Si, Sn, Pb, Ta, Ti, W, V, Zn, and Zr.

165. The method of any one of embodiments 160-164, wherein the first type of layers comprise NiCr, NiFe, NiCo, NiCrCo, NiAl, NiCrAl, NiFeAl, NiCoAl, NiCrCoAl, NiMo, NiCrMo, NiFeMo, NiCoMo, NiCrCoMo, NiW, NiCrW, NiFeW, NiCoW, NiCrCoW, NiMoW, NiNb, NiCrNb, NiFeNb, NiCoNb, NiCrCoNb, NiTi, NiCrTi, NiFeTi, NiCoTi, NiCrCoTi, NiCrP, NiCrAl, NiCoP, NiCoAl, NiFeP, NiFeAl, NiCrSi, NiCrB, NiCoSi, NoCoB, NiFeSi, NiFeB, ZnCr, ZnFe, ZnCo, ZnNi, ZnCrP, ZnCrAl, ZnFeP, ZnFeAl, ZnCoP, ZnCoAl, ZnNiP, ZnNiAl, ZnCrSi, ZnCrB, ZnFeSi, ZnFeB, ZnCoSi, ZnCoB, ZnNiSi, ZnNiB, CoCr, CoFe, CoCrP, CoFeP, CoCrAl, CoFeAl, CoCrSi, CoFeSi, CoCrB, CoFeB, CoAl, CoW, CoCrW, CoFeW, CoTi, CoCrTi, CoFeTi, CoTa, CoCrTa, CoFeTa, CoC, CoCrC, CoFeC, FeCr, FeCrP, FeCrAl, FeCrSi, or FeCrB; and
the second type of layers comprise NiCr, NiFe, NiCo, NiCrCo, NiAl, NiCrAl, NiFeAl, NiCoAl, NiCrCoAl, NiMo, NiCrMo, NiFeMo, NiCoMo, NiCrCoMo, NiW, NiCrW, NiFeW, NiCoW, NiCrCoW, NiMoW, NiNb, NiCrNb, NiFeNb, NiCoNb, NiCrCoNb, NiTi, NiCrTi, NiFeTi, NiCoTi, NiCrCoTi, NiCrP, NiCrAl, NiCoP, NiCoAl, NiFeP, NiFeAl, NiCrSi, NiCrB, NiCoSi, NoCoB, NiFeSi, NiFeB, ZnCr, ZnFe, ZnCo, ZnNi, ZnCrP, ZnCrAl, ZnFeP, ZnFeAl.

166. The method of embodiment 165, wherein the first type of layers, the second type of layers, or both comprise Ni and W.

167. The method of embodiment 166, wherein the first type of layers, the second type of layers, or both comprise NiMoW.

168. The method of any one of embodiments 149 to 167, wherein the laminate coating has a Vickers microhardness as measured by ASTM E384-11e1 of at least about 75 without heat treatment.

169. The method of embodiment 168, wherein the Vickers microhardness as measured by ASTM E384-11e1 is at least about 100 without heat treatment.

170. The method of embodiment 169, wherein the Vickers microhardness as measured by ASTM E384-11e1 is at least about 150 without heat treatment.

171. The method of embodiment 170, wherein the Vickers microhardness as measured by ASTM E384-11e1 is at least about 200 without heat treatment.

172. The method of embodiment 171, wherein the Vickers microhardness as measured by ASTM E384-11e1 is at least about 500 without heat treatment.

173. The method of embodiment 172, wherein the Vickers microhardness as measured by ASTM E384-11e1 is at least about 1200 without heat treatment.

174. The method of embodiment 168, wherein the Vickers microhardness as measured by ASTM E384-11e1 ranges from about 75 to about 200, from about 100 to about 300, from about 300 to about 600, from about 550 to about 750, from about 600 to about 900, from about 750 to about 1000, from about 1000 to about 1200, without heat treatment.

175. The method of embodiment 168, wherein the Vickers microhardness as measured by ASTM E384-11e1 ranges from about 100 to about 150, from about 150 to about 250, from about 250 to about 350, from about 350 to about 550, from about 550 to about 600, from about 600 to about 650, from about 650 to about 700, from about 700 to about 750, from about 750 to about 800, from about 800 to about 850, from about 850 to about 900, from about 900 to about 1000, from about 1000 to about 1100, from about 1100 to about 1200 without heat treatment.

176. The method of any one of embodiments 1-74 or 149-175, wherein a recess is formed in a top surface of the of the coated lift plunger.

177. The method of embodiment 176, wherein the coated lift plunger has a length along the longitudinal axis and the recess extends into the coated lift plunger at least about 5% of the length.

178. The method of embodiment 177, wherein the coated lift plunger has a length along the longitudinal axis and the recess extends into the coated lift plunger at least about 10% of the length.

179. The method of embodiment 178, wherein the coated lift plunger has a length along the longitudinal axis and the recess extends into the coated lift plunger at least about 15% of the length.

180. The method of embodiment 179, wherein the coated lift plunger has a length along the longitudinal axis and the recess extends into the coated lift plunger at least about 20% of the length.

181. The method of embodiment 180, wherein the coated lift plunger has a length along the longitudinal axis and the recess extends into the coated lift plunger at least about 25% of the length.

182. The method of any one of embodiments 176-181, further comprising an aperture that extends from the recess through a sidewall of the coated lift plunger.

183. The method of any one of embodiments 1-74 or 149-182, wherein the laminate coating is substantially continuous on the surface of the plunger core.

The particulars described herein are by way of example and are only for purposes of illustrative discussion of embodiments of the present disclosure. The use of any and all examples, or exemplary language (e.g., "such as") provided herein is merely intended to better illuminate the disclosure and does not pose a limitation on the scope of the disclosure as claimed. No language in the specification should be construed as indicating any non-claimed element is essential to the practice of the disclosure. Further, all methods described herein can be performed in any suitable order unless otherwise indicated herein or otherwise clearly contradicted by context.

The various embodiments described above can be combined to provide further embodiments. All of the U.S. patents, U.S. patent application publications, U.S. patent applications, foreign patents, foreign patent applications and non-patent publications referred to in this specification and/or listed in the Application Data Sheet, including U.S. Patent Application No. 62/476,621 and U.S. Patent Application No. 62/640,525, are incorporated herein by reference, in their entirety. Aspects of the embodiments can be modified, if necessary to employ concepts of the various patents, applications and publications to provide yet further embodiments.

These and other changes can be made to the embodiments in light of the above-detailed description. In general, in the following claims, the terms used should not be construed to limit the claims to the specific embodiments disclosed in the specification and the claims, but should be construed to include all possible embodiments along with the full scope of equivalents to which such claims are entitled. Accordingly, the claims are not limited by the disclosure.

Definitions used in the present disclosure are meant and intended to be controlling in any future construction unless clearly and unambiguously modified in the examples or when application of the meaning renders any construction meaningless or essentially meaningless. In cases where the construction of the term would render it meaningless or essentially meaningless, the definition should be taken from Webster's Dictionary, 3rd Edition or a dictionary known to those of ordinary skill in the art.

Although the subject matter has been described in language specific to structural features or methodological acts, it is to be understood that the subject matter defined in the appended claims is not necessarily limited to the specific features or acts described. Rather, the specific features and acts are disclosed as illustrative forms of implementing the claims.

The invention claimed is:

1. A method for preparing a coated lift plunger, the method comprising:
   applying a laminate coating on a surface of a plunger core that is substantially symmetrical about a longitudinal axis and has a first diameter and a plunger body, thereby forming the coated lift plunger,
   wherein the plunger core comprises a light-weighting feature comprising a plurality of voids, and
   wherein applying the laminate coating comprises:
      contacting at least a portion of the plunger core with an electrodeposition bath comprising electrodepositable ions;
      applying a first electric current for a first amount of time to the electrodeposition bath, thereby causing a first layer to be electrodeposited onto the plunger core, the first layer comprising at least a first metal and a second metal; and
      applying a second electric current for a second amount of time to the electrodeposition bath, thereby causing a second layer to be electrodeposited onto the plunger core, the second layer comprising the first metal and the second metal.

2. The method of claim 1, further comprising applying a third electric current to the electrodeposition bath, thereby causing a third layer to be electrodeposited onto the plunger core, the third layer comprising the first metal and the second metal.

3. A coated lift plunger comprising:
   a plunger core that is substantially symmetrical about a longitudinal axis and has a first diameter and a plunger body, wherein the plunger body comprises a light-weighting feature comprising a plurality of voids, wherein a density of the light-weighting feature varies in at least one direction of the plunger core; and
   a laminate coating on a surface of the plunger core, the laminate coating having a thickness, the laminate coating comprising a first and a second layer, the first layer having a first composition and a first nanostructure, and the second layer having a second composition and a second nanostructure.

4. The coated lift plunger of claim 3, wherein the first nanostructure has a first average grain size, a first grain boundary geometry, a first crystal orientation, and a first defect density; and
   the second nanostructure has a second average grain size, a second grain boundary geometry, a second crystal orientation, and a second defect density,
   wherein the first average grain size is different from the second average grain size, the first grain boundary geometry is different from the second grain boundary geometry, the first crystal orientation is different from the second crystal orientation, the first defect density is different from the second defect density, or a combination thereof.

5. The coated lift plunger of claim 3, wherein a number of the voids per unit volume varies along the longitudinal axis or along the first diameter of the plunger body.

6. The coated lift plunger of claim 3, wherein a density of the plurality of voids is higher between the top end and the bottom end of the plunger body.

7. The coated lift plunger of claim 3, wherein the lightweighting feature has a void volume ranging from about 1% to about 99%.

8. The coated lift plunger of claim 3, wherein the first layer or the second layer comprises a fine-grained or ultra-fine-grained metal or metal alloy having an average grain size ranging from about 1 nm to about 5,000 nm, based on a measurement of grain size in micrographs.

9. The coated lift plunger of claim 3, wherein a recess is formed in a top surface of the of the coated lift plunger.

10. The coated lift plunger of claim 9, further comprising an aperture that extends from the recess through a sidewall of the coated lift plunger.

11. The coated lift plunger of claim 3, wherein the laminate coating is substantially continuous on the surface of the plunger core.

12. The coated lift plunger of claim 3, wherein the first layer independently comprises Ag, Al, Au, B, Be, C, Co, Cr, Cu, Fe, Hg, In, Ir, Mg, Mn, Mo, Nb, Nd, Ni, P, Pd, Pt, Re, Rh, Sb, Si, Sn, Pb, Ta, Ti, W, V, Zn, Zr, or a combination thereof; and the second layer independently comprises Ag, Al, Au, B, Be, C, Co, Cr, Cu, Fe, Hg, In, Ir, Mg, Mn, Mo, Nb, Nd, Ni, P, Pd, Pt, Re, Rh, Sb, Si, Sn, Pb, Ta, Ti, W, V, Zn, Zr, or a combination thereof.

13. The coated lift plunger of claim 3, wherein the first layer independently comprises NiCr, NiFe, NiCo, NiCrCo, NiAl, NiCrAl, NiFeAl, NiCoAl, NiCrCoAl, NiMo, NiCrMo, NiFeMo, NiCoMo, NiCrCoMo, NiW, NiCrW, NiFeW, NiCoW, NiCrCoW, NiMoW, NiNb, NiCrNb, NiFeNb, NiCoNb, NiCrCoNb, NiTi, NiCrTi, NiFeTi, NiCoTi, NiCrCoTi, NiCrP, NiCrAl, NiCoP, NiCoAl, NiFeP, NiFeAl, NiCrSi, NiCrB, NiCoSi, NoCoB, NiFeSi, NiFeB, ZnCr, ZnFe, ZnCo, ZnNi, ZnCrP, ZnCrAl, ZnFeP, ZnFeAl, ZnCoP, ZnCoAl, ZnNiP, ZnNiAl, ZnCrSi, ZnCrB, ZnFeSi, ZnFeB, ZnCoSi, ZnCoB, ZnNiSi, ZnNiB, CoCr, CoFe, CoCrP, CoFeP, CoCrAl, CoFeAl, CoCrSi, CoFeSi, CoCrB, CoFeB, CoAl, CoW, CoCrW, CoFeW, CoTi, CoCrTi, CoFeTi, CoTa, CoCrTa, CoFeTa, CoC, CoCrC, CoFeC, FeCr, FeCrP, FeCrAl, FeCrSi, or FeCrB; and the second layer independently comprises NiCr, NiFe, NiCo, NiCrCo, NiAl, NiCrAl, NiFeAl, NiCoAl, NiCrCoAl, NiMo, NiCrMo, NiFeMo, NiCoMo, NiCrCoMo, NiW, NiCrW, NiFeW, NiCoW, NiCrCoW, NiMoW, NiNb, NiCrNb, NiFeNb, NiCoNb, NiCrCoNb, NiTi, NiCrTi, NiFeTi, NiCoTi, NiCrCoTi, NiCrP, NiCrAl, NiCoP, NiCoAl, NiFeP, NiFeAl, NiCrSi, NiCrB, NiCoSi, NoCoB, NiFeSi, NiFeB, ZnCr, ZnFe, ZnCo, ZnNi, ZnCrP, ZnCrAl, ZnFeP, ZnFeAl, ZnCoP, ZnCoAl, ZnNiP, ZnNiAl, ZnCrSi, ZnCrB, ZnFeSi, ZnFeB, ZnCoSi, ZnCoB, ZnNiSi, ZnNiB, CoCr, CoFe, CoCrP, CoFeP, CoCrAl, CoFeAl, CoCrSi, CoFeSi, CoCrB, CoFeB, CoAl, CoW, CoCrW, CoFeW, CoTi, CoCrTi, CoFeTi, CoTa, CoCrTa, CoFeTa, CoC, CoCrC, CoFeC, FeCr, FeCrP, FeCrAl, FeCrSi, or FeCrB.

14. The coated lift plunger of claim 3, wherein the first layer and the second layer comprise Ni and W.

15. The coated lift plunger of claim 14, wherein the first layer and the second layer further comprise Mo.

16. The coated lift plunger of claim 3, wherein the first layer, the second, layer, or both, independently comprise Ni in a concentration ranging from about 40% (w/w) to about 70% (w/w); and wherein the first layer, the second layer, or both, independently comprise W in a concentration ranging from about 30% (w/w) to about 50% (w/w).

17. The coated lift plunger of claim 16, wherein the first layer, the second layer, or both, independently comprise Mo in a concentration of up to about 40% (w/w).

18. The coated lift plunger of claim 3, wherein the first layer, the second layer, or both, independently comprise Ni in a concentration of about 60% (w/w), and W in a concentration of about 40% (w/w).

19. The coated lift plunger of claim 3, wherein at least a portion of the plunger core comprises a weighted section that is denser than any other part of the plunger core.

20. The coated lift plunger of claim 19, wherein the weighted section comprises a metal or a magnetic material.

21. The coated lift plunger of claim 3, further comprising a conductive strike layer on the surface of the plunger core, the conductive strike layer being sufficient to render a non-conductive or semi-conductive surface of the plunger core sufficiently conductive to permit electrodeposition of the first layer or the second layer onto the plunger core.

22. The coated lift plunger of claim 3, wherein the laminate coating further comprises a third layer having a third composition and a third nanostructure.

23. A method for clearing downhole accumulations from a well comprising:

positioning the coated lift plunger of claim 3 in a petroleum well tube; and releasing the coated lift plunger into the petroleum well tube, thereby allowing the coated lift plunger to travel in the petroleum well tube carrying liquids and downhole accumulations from a bottom position of the petroleum well to a top position of the petroleum well, and allowing a downhole gas to travel from the bottom position of the petroleum well to the top position of the petroleum well.

* * * * *